United States Patent
Lin et al.

(10) Patent No.: US 10,282,465 B2
(45) Date of Patent: May 7, 2019

(54) SYSTEMS, APPARATUSES, AND METHODS FOR DEEP LEARNING OF FEATURE DETECTORS WITH SPARSE CODING

(71) Applicant: Intel Corporation, Santa Clara, CA (US)

(72) Inventors: Tsung-Han Lin, Santa Clara, CA (US); Hsiang-Tsung Kung, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 285 days.

(21) Appl. No.: 14/311,122

(22) Filed: Jun. 20, 2014

(65) Prior Publication Data

US 2015/0242463 A1    Aug. 27, 2015

Related U.S. Application Data

(63) Continuation-in-part of application No. 14/257,822, filed on Apr. 21, 2014.

(60) Provisional application No. 61/944,519, filed on Feb. 25, 2014.

(51) Int. Cl.
- *G06F 17/00* (2006.01)
- *G06F 17/30* (2006.01)
- *G06K 9/62* (2006.01)

(52) U.S. Cl.
CPC ....... *G06F 17/3069* (2013.01); *G06K 9/6228* (2013.01); *G06K 9/6276* (2013.01)

(58) Field of Classification Search
CPC ............. G06F 17/30289; G06F 3/0481; G06F 17/30286; G06F 17/30442; G06F 17/30864
See application file for complete search history.

(56) References Cited

U.S. PATENT DOCUMENTS

| 7,539,750 B1* | 5/2009 | Parker ..................... G06F 15/16 709/224 |
| 2009/0037228 A1 | 2/2009 | Engel |
| 2009/0037448 A1* | 2/2009 | Thomas .............. H03M 7/3084 |
| 2013/0216206 A1* | 8/2013 | Dubin .................... H04N 7/155 386/282 |

FOREIGN PATENT DOCUMENTS

| CN | 101075251 A | 11/2007 |
| CN | 102314876 B | 4/2013 |

OTHER PUBLICATIONS

Decision of Rejection from foreign counterpart Taiwan Patent Application No. 104105834, dated Jun. 20, 2016, 6 pages.
Final Office Action from U.S. Appl. No. 14/257,822, dated Apr. 10, 2017, 19 pages.
Final Office Action from U.S. Appl. No. 14/257,822 dated May 17, 2016, 19 pages.

(Continued)

*Primary Examiner* — Truong Vo
(74) *Attorney, Agent, or Firm* — Nicholson De Vos Webster & Elliott LLP

(57) ABSTRACT

Detailed herein are embodiments of systems, methods, and apparatuses to be used for feature searching using an entry-based searching structure.

15 Claims, 62 Drawing Sheets

(56) References Cited

OTHER PUBLICATIONS

Kung H.T., et al., "PNNU: Parallel Nearest-Neighbor Units for Learned Dictionaries," Published 2015 in LCPC, 2015, Harvard University, Cambridge, 15 pages.
Non-Final Office Action from U.S. Appl. No. 14/257,822 dated Jan. 25, 2016, 16 pages.
Non-Final Office Action from U.S. Appl. No. 14/257,822 dated Sep. 14, 2016, 21 pages.
Notice of Allowance from U.S. Appl. No. 14/257,822, dated Nov. 16, 2017, 11 pages.
Office Action from foreign counterpart Taiwan Patent Application No. 104105834, dated Feb. 23, 2016, 14 pages.

* cited by examiner $$D = \begin{bmatrix} \_ & \_ & \_ & \_ & \_ \\ \_ & A & B & C & \_ \\ \_ & \_ & \_ & \_ & \_ \end{bmatrix}$$

(b)

$$x = \begin{bmatrix} x_1 & x_2 & x_3 & \cdots & x_6 \end{bmatrix} = \overbrace{\begin{bmatrix} \underbrace{100}_{} & 001 & 110 & \cdots & 001 \end{bmatrix}}^{m}$$

All Instances of Input $x$

Bit 1   Bit 2   Bit 3

0   0   0   ⎱ F1 1601
0   0   1   ⎰
0   1   0   ⎱
0   1   1   ⎰ F2 1603
1   0   0   ⎱
1   0   1   ⎰
1   1   0   ⎱ F3 1605
1   1   1   ⎰

(a)

All Instances of Input $x$

Bit 1   Bit 2   Bit 3

| 0   0 |  0   ⎱ F1 1607
|       |  1   ⎰
| 0   1 |  0   ⎱
|       |  1   ⎰ F2 1609
| 1   0 |  0
          1
| 1   1 |  0   ⎱ F3 1611
           1   ⎰

|  | iCAM |  |  |  |  |  |  | RAM |
|---|---|---|---|---|---|---|---|---|
| Cell Bank for F1 | 0 | 0 | 0 | 1 | 0 | 1 | → | F1 |
|  | 0 | 0 | 0 | 0 | 1 | 1 | → | F1 |
|  | 0 | 1 | 0 | 1 | * | * | → | F1 |
|  | 0 | 0 | 1 | 0 | 0 | 0 | → | F1 |
| Cell Bank for F2 | 0 | 1 | 0 | 1 | 0 | 1 | → | F2 |
|  | 0 | 1 | 0 | 1 | 1 | * | → | F2 |
|  | 0 | 1 | 1 | * | * | * | → | F2 |
|  | 1 | 0 | 0 | * | * | * | → | F2 |
| Cell Bank for F3 | 1 | 0 | 1 | 1 | * | * | → | F3 |
|  | 1 | 1 | 0 | * | * | * | → | F3 |
|  | 0 | 1 | 0 | 1 | 1 | 0 | → | F3 |
| Cell Bank for F4 | 1 | 1 | 0 | 1 | 1 | 1 | → | F4 |
|  | 1 | 1 | 1 | 0 | * | * | → | F4 |
|  | 1 | 1 | 1 | 1 | 0 | * | → | F4 |
|  | 1 | 1 | 1 | 1 | 1 | 0 | → | F4 |
| Cell Bank for F5 | 1 | 1 | 1 | 1 | 1 | 1 | → | F5 |

FIG. 22

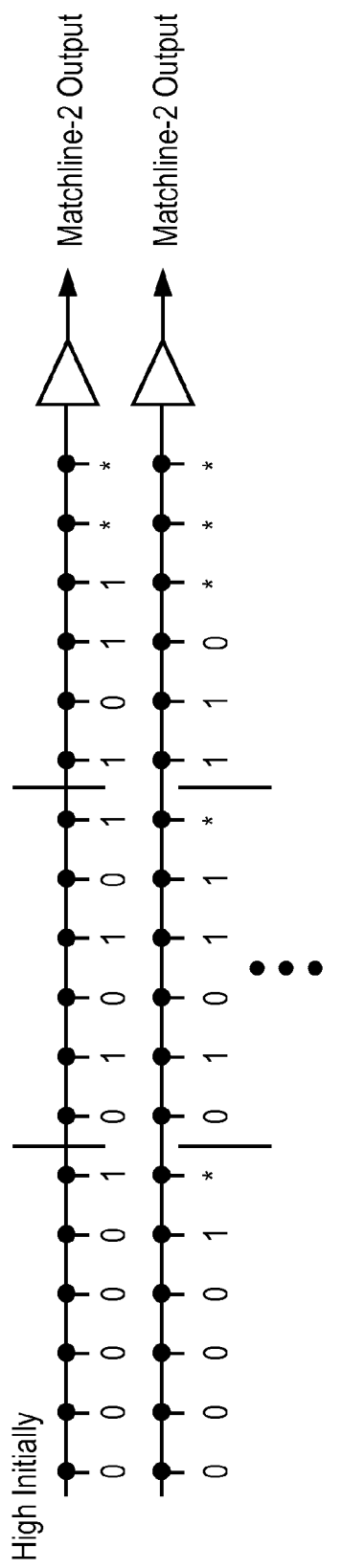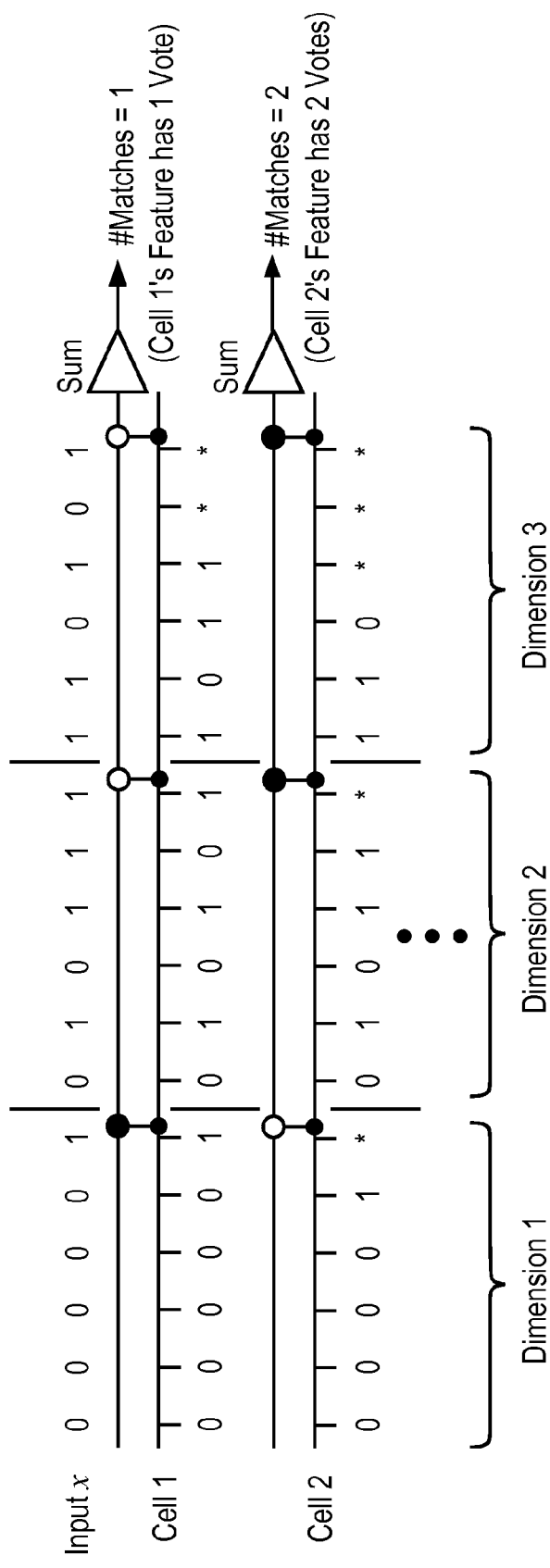
FIG. 26

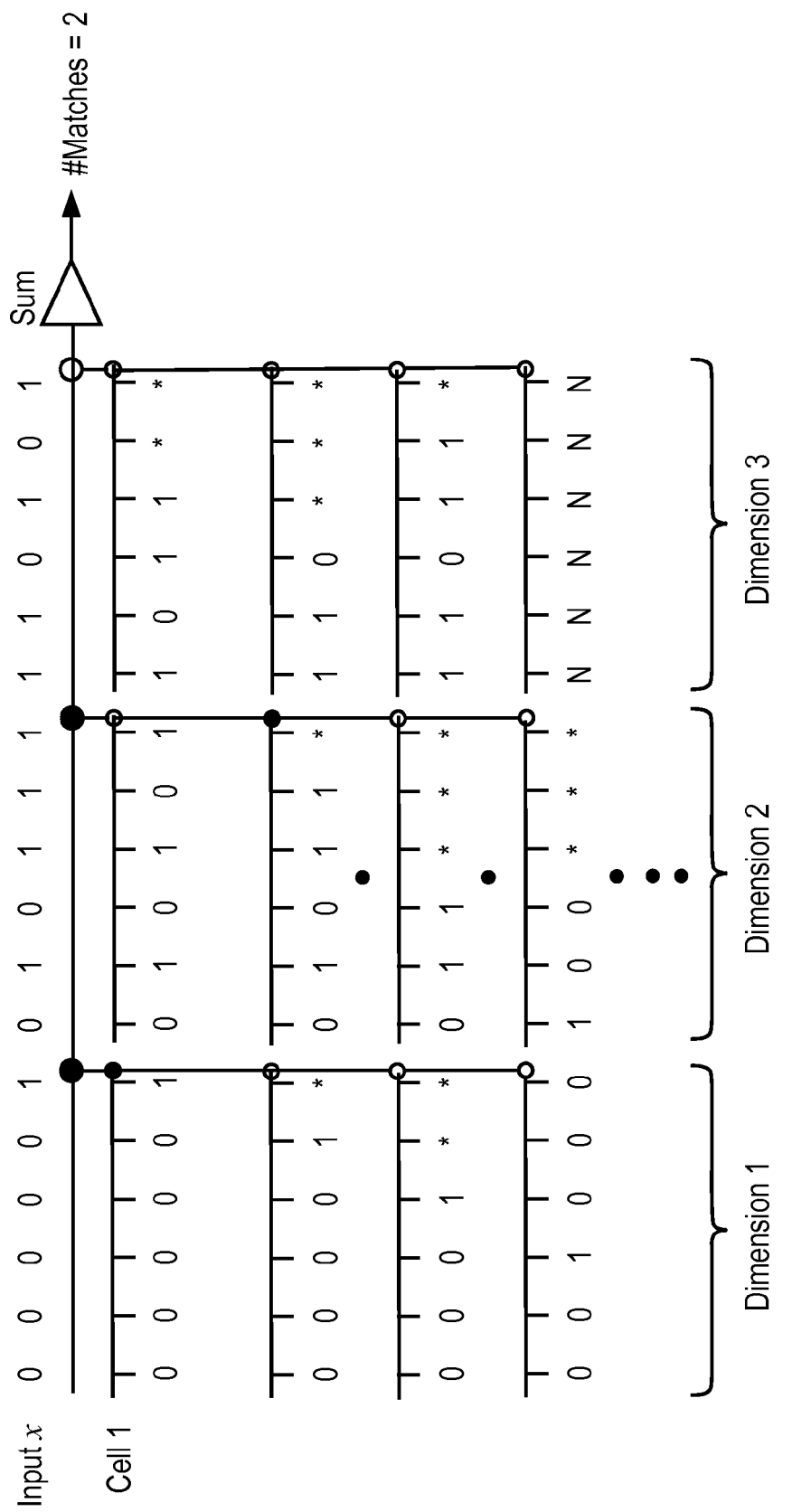
FIG. 26 (CON'T)

| TAM Words | | | | | | iRAM Addresses | | | | | Content |
|---|---|---|---|---|---|---|---|---|---|---|---|
| | 0 | 0 | 0 | 0 | 0 | 0 | 0 | 0 | 0 | 0 | b |
| | 0 | 0 | 0 | 0 | 1 | 0 | 0 | 0 | 0 | 1 | b |
| | 0 | 0 | 0 | 1 | 0 | 0 | 0 | 0 | 1 | 0 | b |
| | 0 | 0 | 0 | 1 | 1 | 0 | 0 | 0 | 1 | 1 | b |
| | 0 | 0 | 1 | 0 | 0 | 0 | 0 | 1 | 0 | 0 | b |
| | 0 | 0 | 1 | 0 | 1 | 0 | 0 | 1 | 0 | 1 | b |
| | 0 | 0 | 1 | 1 | 0 | 0 | 0 | 1 | 1 | 0 | b |
| 7 | 0 | 0 | 1 | 1 | 1 | 0 | 0 | 1 | 1 | 1 | b |
| | 0 | 1 | 0 | 0 | 0 | 0 | 1 | 0 | 0 | 0 | b |
| | 0 | 1 | 0 | 0 | 1 | 0 | 1 | 0 | 0 | 1 | b |
| | 0 | 1 | 0 | 1 | 0 | 0 | 1 | 0 | 1 | 0 | b |
| | 0 | 1 | 0 | 1 | 1 | 0 | 1 | 0 | 1 | 1 | b |
| 12 | 0 | 1 | 1 | 0 | 0 | → 0 | 1 | 1 | 0 | 0 | b |
| → | 0 | 1 | 1 | 0 | 1 | 0 | 1 | 1 | 0 | 1 | b |
| | 0 | 1 | 1 | 1 | 0 | 0 | 1 | 1 | 1 | 0 | b |
| | 0 | 1 | 1 | 1 | 1 | 0 | 1 | 1 | 1 | 1 | c |
| | 1 | 0 | 0 | 0 | 0 | 1 | 0 | 0 | 0 | 0 | c |
| | 1 | 0 | 0 | 0 | 1 | 1 | 0 | 0 | 0 | 1 | c |
| | 1 | 0 | 0 | 1 | 0 | 1 | 0 | 0 | 1 | 0 | c |
| | 1 | 0 | 0 | 1 | 1 | 1 | 0 | 0 | 1 | 1 | c |
| | 1 | 0 | 1 | 0 | 0 | 1 | 0 | 1 | 0 | 0 | c |
| | 1 | 0 | 1 | 0 | 1 | 1 | 0 | 1 | 0 | 1 | c |
| | 1 | 0 | 1 | 1 | 0 | 1 | 0 | 1 | 1 | 0 | c |
| 23 | 1 | 0 | 1 | 1 | 1 | 1 | 0 | 1 | 1 | 1 | c |
| | 1 | 1 | 0 | 0 | 0 | 1 | 1 | 0 | 0 | 0 | c |
| | 1 | 1 | 0 | 0 | 1 | 1 | 1 | 0 | 0 | 1 | c |
| | 1 | 1 | 0 | 1 | 0 | 1 | 1 | 0 | 1 | 0 | c |
| | 1 | 1 | 0 | 1 | 1 | 1 | 1 | 0 | 1 | 1 | c |
| | 1 | 1 | 1 | 0 | 0 | 1 | 1 | 1 | 0 | 0 | c |
| | 1 | 1 | 1 | 0 | 1 | 1 | 1 | 1 | 0 | 1 | c |
| | 1 | 1 | 1 | 1 | 0 | 1 | 1 | 1 | 1 | 0 | c |
| | 1 | 1 | 1 | 1 | 1 | 1 | 1 | 1 | 1 | 1 | c |

FIG. 27

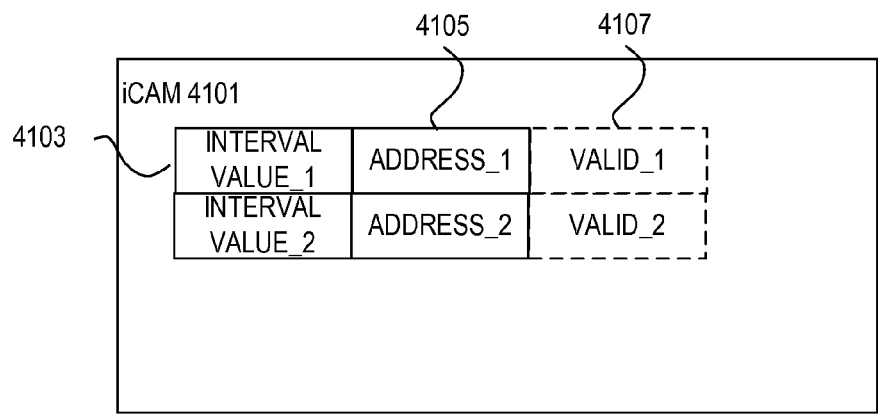
(A)
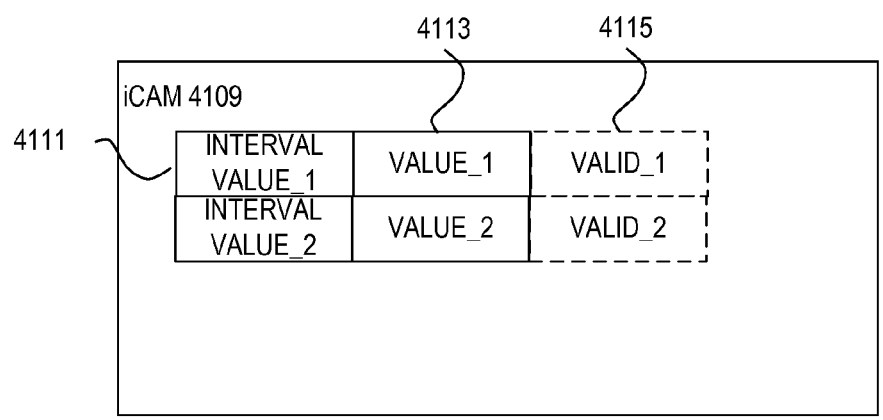
(B)
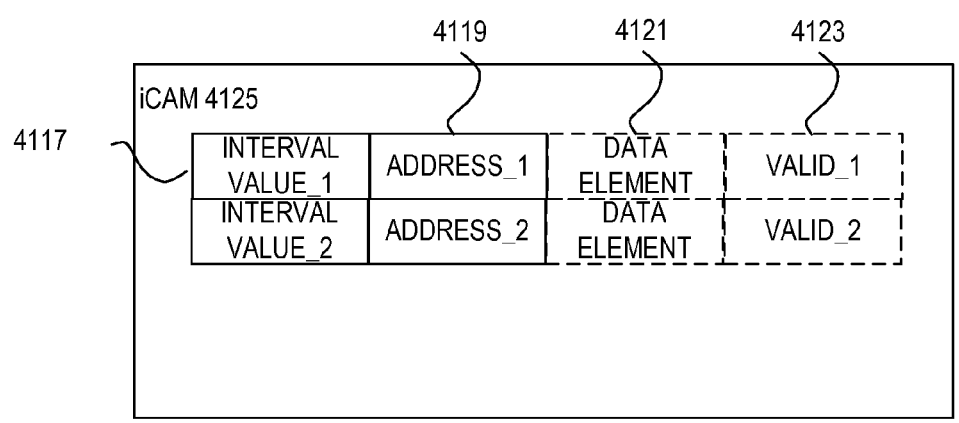
(C)
FIG. 41

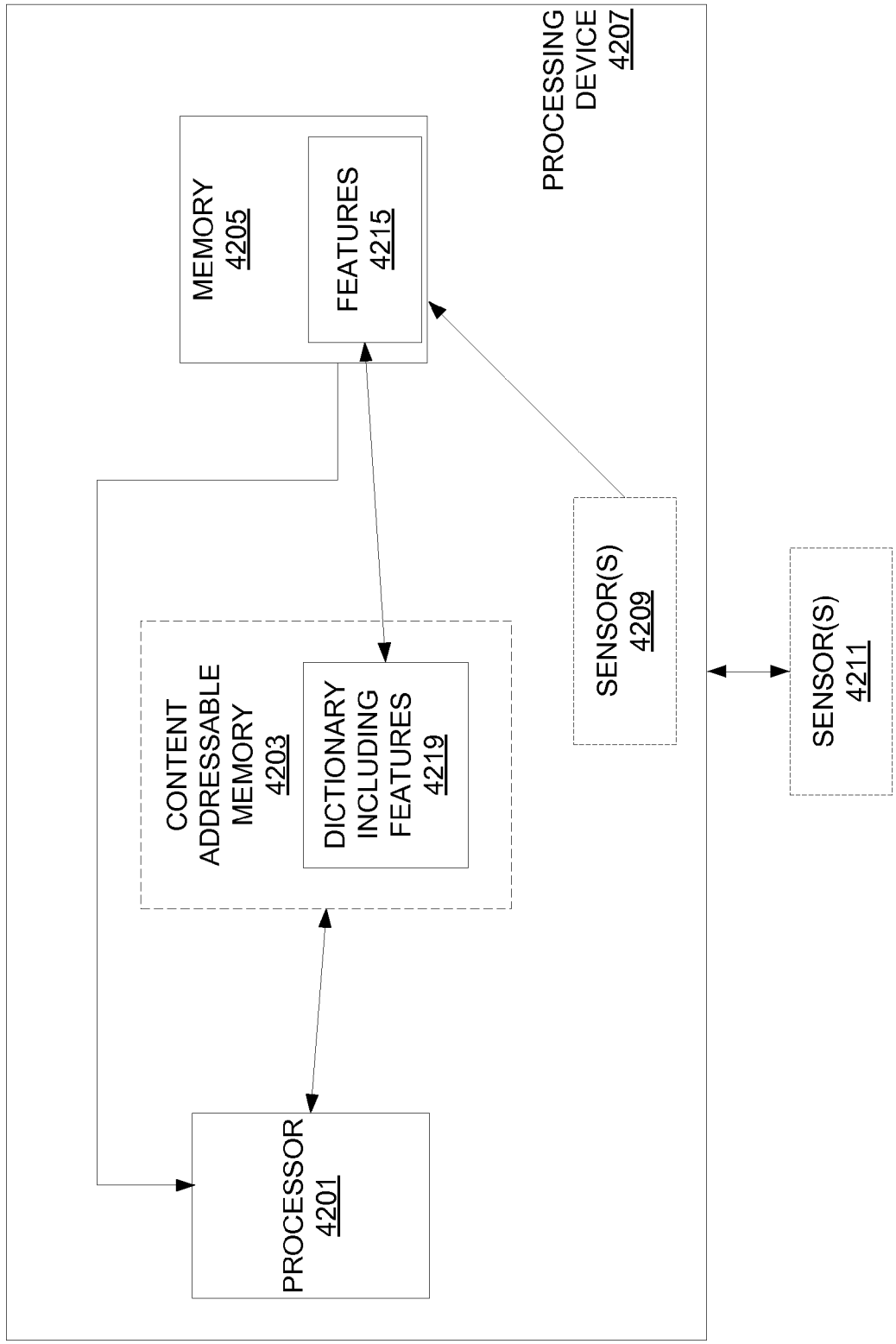

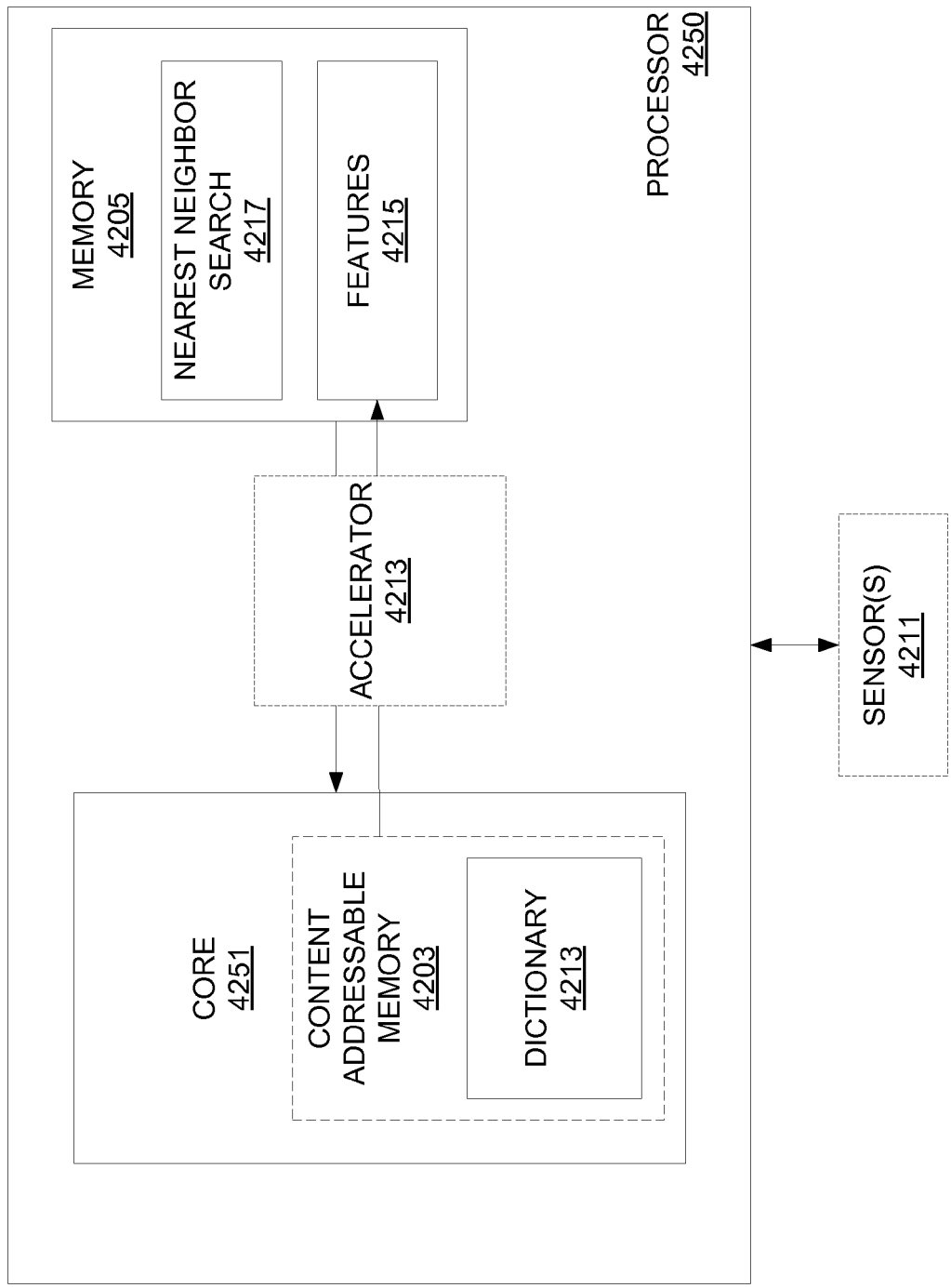

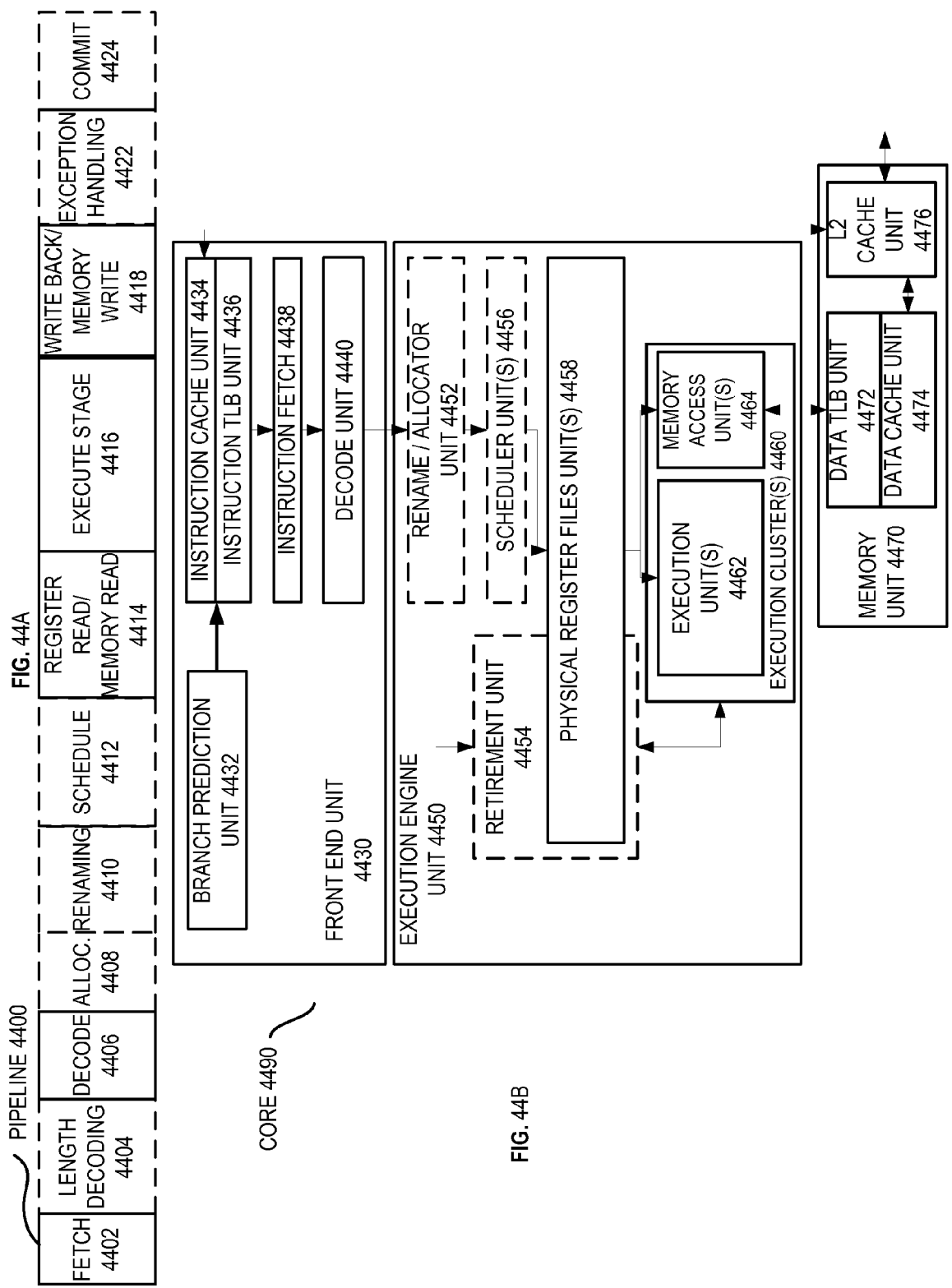

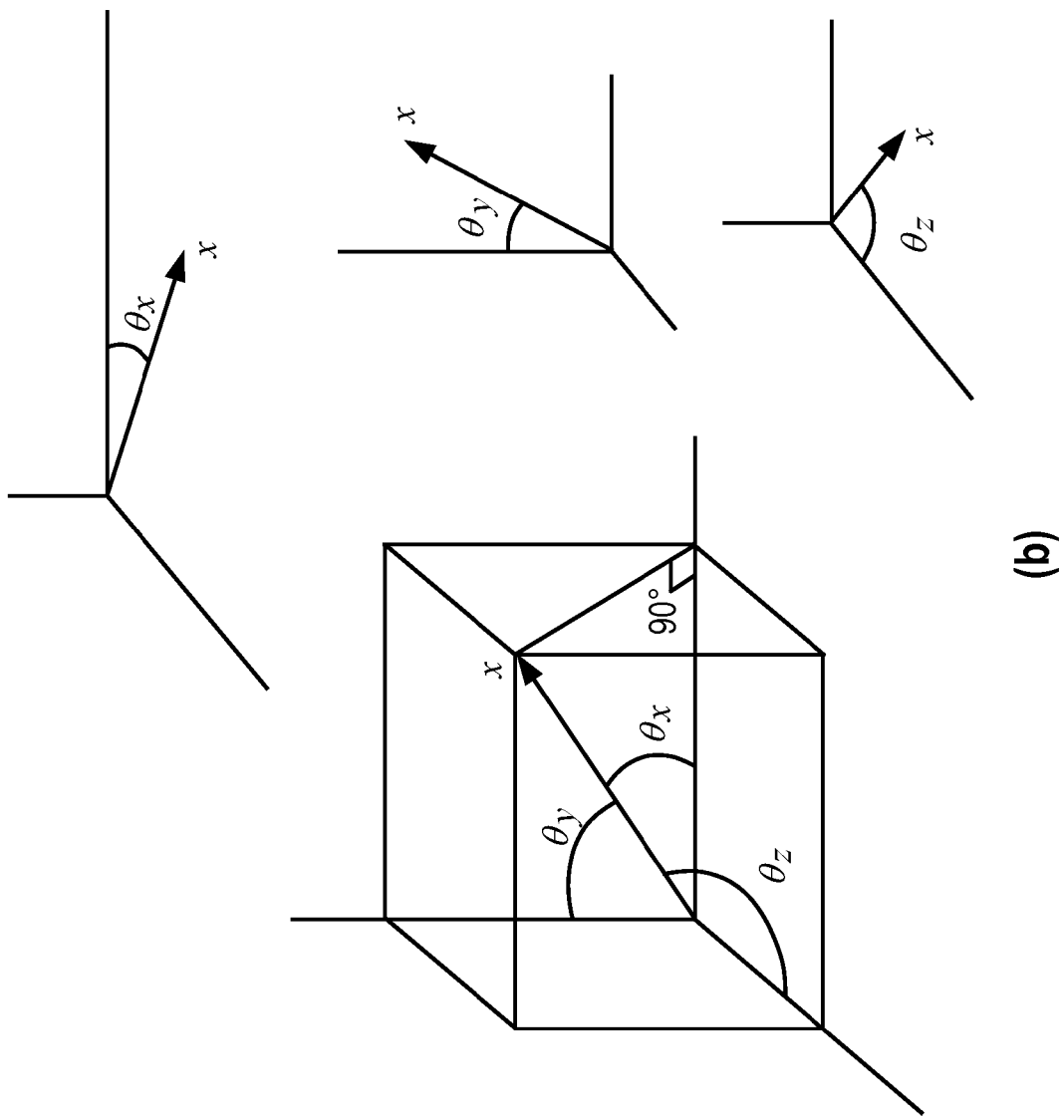
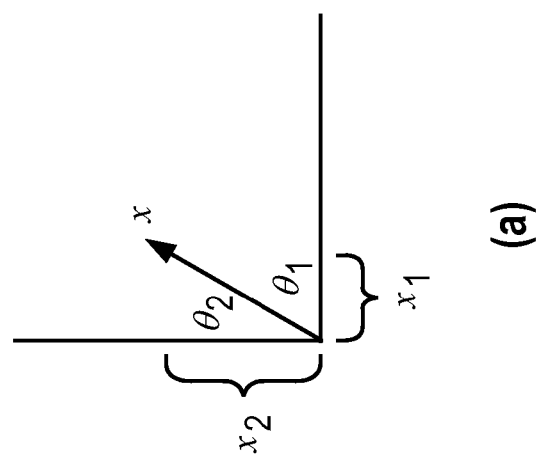
FIG. 52

SYSTEMS, APPARATUSES, AND METHODS FOR DEEP LEARNING OF FEATURE DETECTORS WITH SPARSE CODING

CROSS-REFERENCE TO RELATED APPLICATIONS

This application is related to, and claims priority to, U.S. Provisional Application No. 61/944,519 entitled "Systems, Apparatuses, and Methods for Feature Searching" filed on Feb. 25, 2014, which is hereby incorporated by reference; and is a continuation-in-part and claims priority to U.S. Non-Provisional Application No. 14/257,822 entitled "Systems, Apparatuses, and Methods for Feature Searching" filed on Apr. 21, 2014, which is hereby incorporated by reference.

FIELD OF INVENTION

The field of invention relates generally to computer processing, and, more specifically, deep learning.

BACKGROUND

There are many applications where a fast and efficient nearest neighbor search for multidimensional features (points) of a data set are desirable. For example, this type of search is beneficial in the areas such as image reconstruction and machine learning. There are several ways of nearest neighbor data set searching. In nearest neighbor searching, given a set of points in a space and an input instance (query point), a search is done to find a closest point in a set to the input instance.

BRIEF DESCRIPTION OF THE DRAWINGS

The present invention is illustrated by way of example and not limitation in the figures of the accompanying drawings, in which like references indicate similar elements and in which:

FIG. 4(a)-(b) illustrate embodiment of an input instance and a dictionary of features.

FIGS. 16(a)-(b) illustrate an exemplary feature intervals map and iCAM entries.

FIG. 17(a)-(b) illustrates a before and after look, respectively, of a features interval map after interval-rewrite.

FIG. 21 illustrates an example of five features (and their intervals) and what is selected as entries into an iCAM.

FIG. 22 shows the iCAM entries for the five features in FIG. 21.

FIGS. 26(a)-(c) illustrate exemplary embodiments of CAM cells.

FIG. 27 illustrates a contrast of the operation of iRAM for a given input on a dimension against that of a TCAM-based implementation.

FIGS. 41(A)-(C) illustrate exemplary embodiments of iCAM entries.

FIGS. 42(A)-(H) illustrate various embodiments of devices and systems that utilize iCAM.

FIG. 44A is a block diagram illustrating both an exemplary in-order pipeline and an exemplary register renaming, out-of-order issue/execution pipeline according to embodiments of the invention.

FIG. 44B is a block diagram illustrating both an exemplary embodiment of an in-order architecture core and an exemplary register renaming, out-of-order issue/execution architecture core to be included in a processor according to embodiments of the invention.

FIG. 52(A)-(B) illustrate exemplary angular coordinates.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

An approach to nearest neighbor searching is to compute a distance from the input instance to every point in a data set and keeping track of the shortest distance. However, this simplistic approach may not be workable for larger data sets. The distance calculation may be done using a k-dimensional (k-d) tree to perform an exhaustive examination of all features one feature at a time. This approach is therefore slow and additionally has high power consumption.

Figure 1:
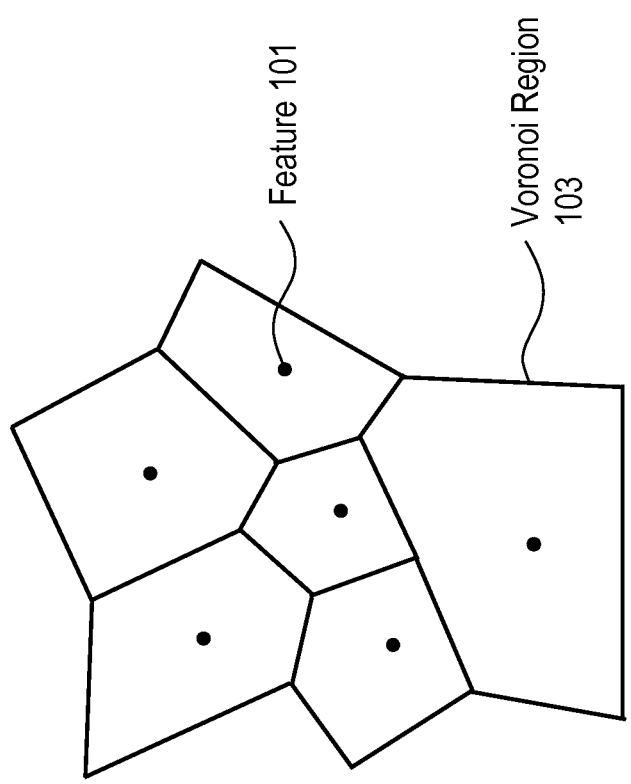
FIG. 1 illustrates an example of a Voronoi diagram of a feature space with multiple features (points), where for any point in a Voronoi region the nearest feature is the feature (denoted by a black dot) in the region.

Another nearest neighbor approach uses Voronoi diagrams. FIG. 1 illustrates an example of a Voronoi diagram of a feature space with multiple features (points). Each Voronoi diagram partitions a plane into regions of equal nearest neighbors called cells. This is illustrated by a plurality of cells 103 that each have one feature (point) 101. In theory, a "best-matched" feature may be found for any input instance using a Voronoi diagram to locate the feature in a particular cell. However, as shown, Voronoi cells are highly irregularly shaped and are difficult to compute (they are both time and processor intensive) and use. In other words, Voronoi diagrams do not lend themselves to easy, or efficient, nearest neighbor feature searches.

High-Level Overview of Embodiments of the Invention

Detailed herein are embodiments of systems, apparatuses, and methods to be used in improved nearest neighbor searching that overcomes the shortcomings of the above approaches. In short, given an input (i.e., an observation) a search for the best-matched feature in a feature space (i.e., a dictionary of features) is made. This approach is especially well suited to feature vectors that are typically sparsely presented in a high-dimensional vector space (note that features in this description are vectors and, thus, feature and feature vector are used interchangeably).

Detailed herein are embodiments of feature search methods, systems, and apparatuses which for a given input instance: (i) lookup corresponding features in dimensions in parallel, and then, if needed, (ii) combine the results to determine a set of one or more best-matched features for the input. As will be detailed below, an interval encoding scheme for features on each dimension of a context may be utilized in feature searching. Additionally, in some embodiments, a search task is partitioned into at least two phases: phase (i) processes all dimensions in parallel which offers efficiency (e.g., using a parallel lookup function such as a table or content addressable memory) and phase (ii) allows for the combination of search results from individual dimensions to provide flexibility in feature selecting strategies. In this description multiple feature lookup methods, systems, and apparatuses which use interval encoding and perform a search task in at least one of the two phases that may be used in, for example, nearest neighbor searching are described.

At least three different feature lookup approaches are described and a quick overview of these lookup approaches is provided here prior to a more thorough treatment below. These lookup approaches use one or more entry-based search structures such as a content addressable memory (CAM), a search tree, memory, etc. A first feature lookup approach is one that is CAM based. CAMs are physical devices that allow for parallel lookups of their contents. One prevalent type of CAM used in computing devices is a translation lookaside buffer (TLB). In some embodiments, a CAM used for feature lookups is a ternary CAM (TCAM). However, it should be understood that other physical structures that allow for parallel searching may also be used in the manner detailed below with respect to the CAM description.

Each of the feature lookup approaches use a technique called "interval encoding." Interval encoding allows efficient implementation of feature lookup based on defined dimensional interval intervals. The first approach uses an interval content addressable memory (iCAM) which uses a physical structure called a CAM. In some embodiments, the CAM is included in a processor (CPU, GPU, APU, etc.) and in others is a part of a chipset. Rather than computing best-matched features for a given input as in a conventional method, a given input is used to lookup the index of a best-matched feature from CAM (typically, in just one CAM read cycle). This hardware-assisted lookup may be very fast and is significantly faster than the computation required to conventionally find features in a data set and is likely to be more power efficient. While the discussion herein utilizes a hardware CAM other approaches may be used that offer similar functionality. For example, tree searching and hashing designs may offer similar functionality (with or without hardware assistance such as replication and pipelining). Additionally, hash table lookups may offer CAM-like functionality without requiring a physical CAM to be present. These other approaches will typically not require hardware that is not already found in a computing device and are thus more likely to be backward compatible.

There are numerous potential applications of iCAM systems. In particular, iCAM systems may efficiently perform the inner-most loop operation in computing the sparse representation of an input for a given dictionary that stores feature locations or features. Efficient computation of sparse representations is essential for applications such as machine learning and data compression. In general, an iCAM is applicable to any multidimensional nearest-neighbor search problem.

A second feature lookup approach is random access memory (RAM) based (iRAM) and also allows for efficient interval encoded lookups albeit RAM based. In some embodiments, on each dimension a bit string of the input is used as a memory address to retrieve a best-matched feature interval stored in RAM (typically, in just one RAM read cycle). This scheme is fast and has low power consumption. It is typically suited for applications where components of feature vectors have a relatively small dynamic range so it is sufficient to use RAM of moderate size. While RAM is detailed as the memory most likely to be used (and in particular dynamic RAM), other memory types such as disk, static RAM (SRAM), magnetic RAM (MRAM), PCMS, Flash, registers, etc. may be used.

A third interval encoded feature lookup approach is binary search tree based. With this scheme, on each dimension a binary search tree is used to locate a feature interval containing the input. This approach is typically suited for applications which require low power consumption and can tolerate a modest degradation in lookup speed (logarithmic time rather than constant time).

As would be evident, and hinted at above, other feature lookup approaches may be used. For example, different hardware based schemes (FLASH based, etc.) and/or different data structures such h-ary search trees with h>2 may be used.

iCAM Embodiments

As noted above, CAM-based schemes are described as a baseline iCAM implementation, and other implementations (RAM based and binary search tree based) are described as extensions/variations to meet various application needs and/or hardware limitations. In the description below, iCAM refers to lookup schemes which use an interval encoding on each dimension. Typically, this is done through the use of bounding boxes which approximate a location of feature and are described in more detail later.

Figure 2:
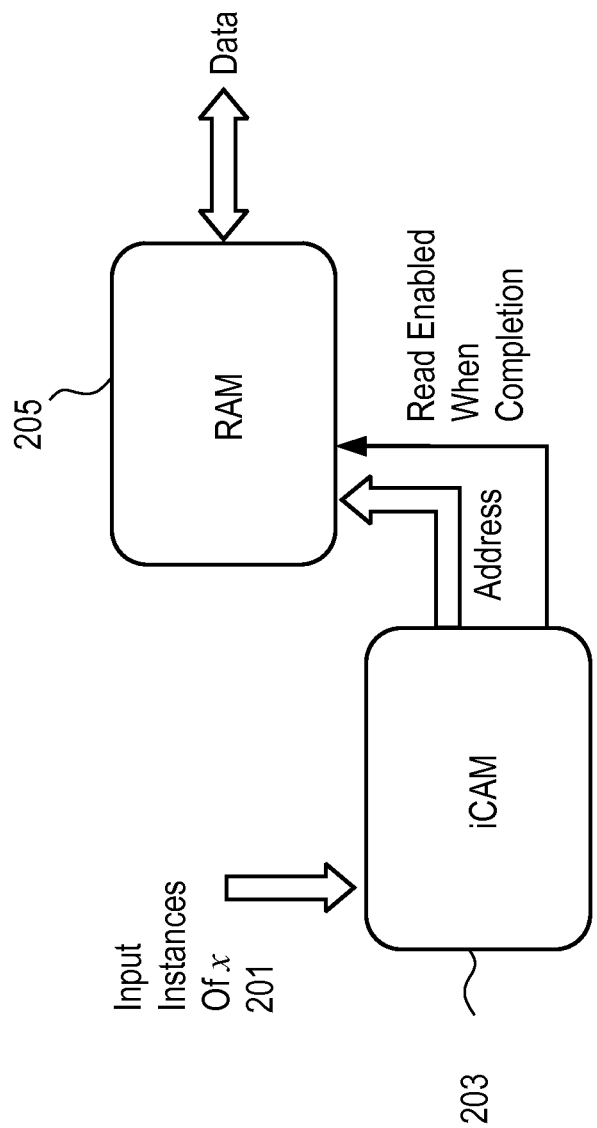
FIG. 2 illustrates an embodiment of an exemplary iCAM based system.

A high-level embodiment of an exemplary iCAM based system is illustrated in FIG. 2. In this embodiment, an iCAM 203 receives data in the form of "input instances" 201 which are content used to locate nearest features in values one or more dimensions. Typically, each iCAM entry points to an address in RAM 205 (or other storage) where the corresponding feature (Fi) is stored. For example, the storage may be RAM, disk (solid state, optical, or magnetic), PCM(S), a plurality of registers (such as packed data registers), etc. In typical implementations, each feature has its own address in RAM 205, however, in some embodiments, more than one feature are stored in a particular location in a packed data format. A parallel lookup using the iCAM for a best-matched feature in a given dictionary of features (or a portion thereof) stored in the iCAM 203 for a given input instance is at least a part of finding a feature of interest based on an input instance.

An input instance 201 is a vector of sample measurements. These may be obtained from sensors in the field (camera, audio, etc.), counters in a computer system, etc. Input instances 201 may also be stored in memory 205 (such as RAM or non-volatile memory) prior to their input into the iCAM 203. As will be detailed below, iCAM 203 searching typically uses a dictionary composed of dictionary atoms (features) trained or acquired for the current context of interest. For example, the dictionary may be trained using images of a room.

FIGS. 3(a) and (b) illustrate embodiments of a raw and randomly sub-sampled domain in an iCAM implementation. A dictionary (D) of features 301 trained from many instances of inputs (X) 305, and based on D 301, is used to compute a sparse representation (z) 303 of any given instance of x 305 for classification purposes. Typically, a clustering algorithm such as K-means is used to train the dictionary 301. The dictionary 301 in these figures is stored in a storage system coupled to in the iCAM.

An application is sparse in the sense that, when an input is represented in some appropriate basis, such as a properly trained dictionary D 301, it can be expressed as a linear combination of a small number of basic functions.

To lower processing cost, in some embodiments, random sub-sampling based on compressive sensing may be used. A random sub-sampling matrix $\Phi$ 307 is applied to both sides of the expression in FIG. 3(a) to obtain the first expression in the FIG. 3(b). The second expression in FIG. 3(b) is merely a rewrite of the first one.

Note that both FIGS. 3(a) and (b) involve the same z 303. Thus, sparse representation z 303 in FIG. 3(a) may be computed based on the raw x 305 or compressed $\hat{x}$ 311. For the latter case, compressive sensing theory stipulates that the recovery will succeed with high probability. The number of randomly selected samples need only be a small multiple (such as 3) of the sparsity associated with the application. For the rest of this description, input x and dictionary D either means x and D in the raw domain, or $\hat{x}$ and $\hat{D}$ in the randomly subsampled domain. For machine learning, the computed z is used to classify input objects x, whereas for object reconstruction, the z computed from $\hat{x}$ is used to form x=Dz.

Figure 3:
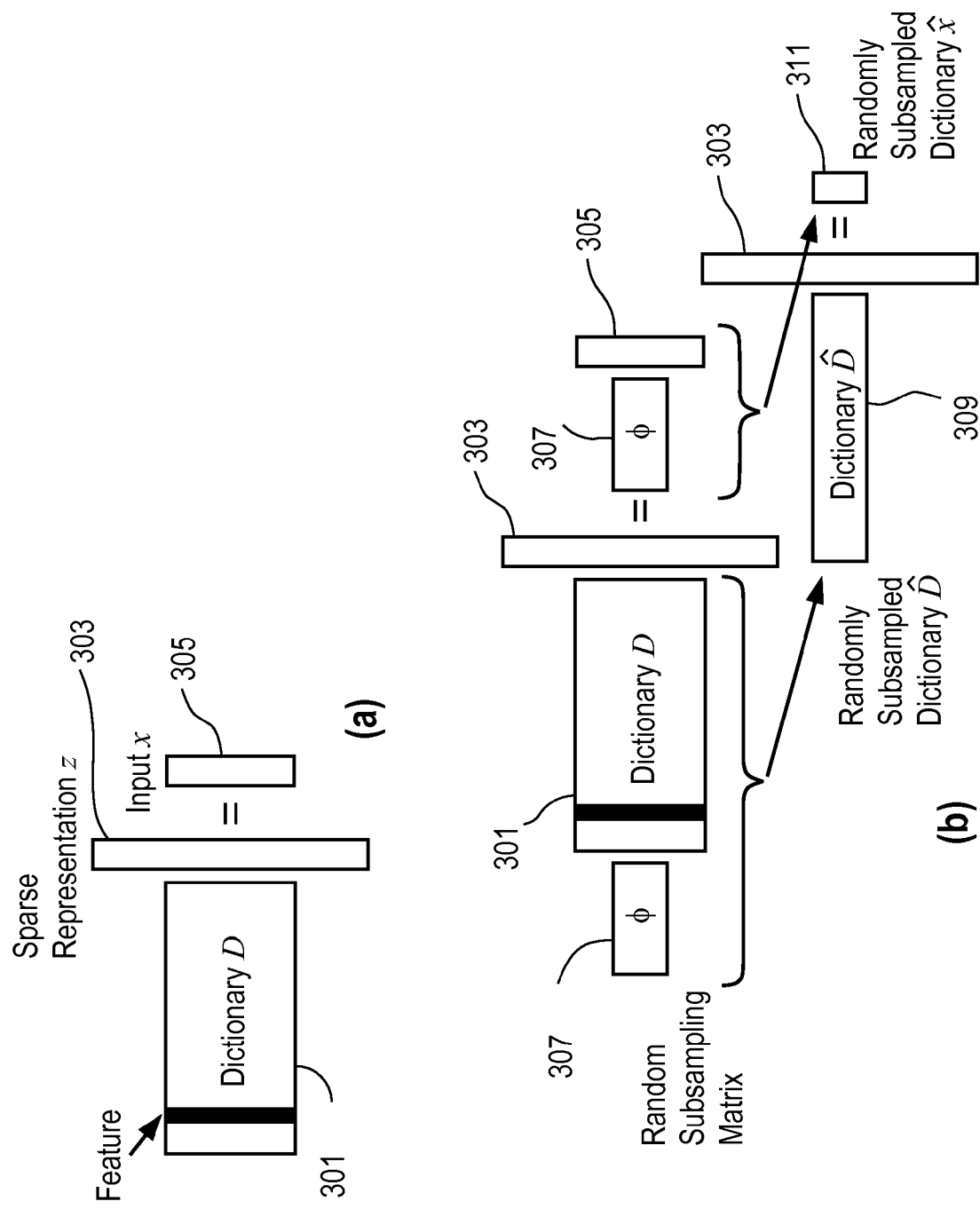
FIGS. 3(a)-(b) illustrate embodiments of a raw and randomly sub-sampled dictionary in an iCAM implementation.

In some embodiments, the different components of FIG. 3 may use different data types. For example, in some embodiments, features in a dictionary, endpoints of their bounding boxes, and sparse representations use floating point (and typically signed floating point). Integers are used for input instances according to some embodiments. It may be useful to convert floating point numbers to integers for example on endpoints of bounding boxes when specifying a feature interval per dimension and/or on input instances when doing an iCAM lookup. One way of performing this conversion is to identify a dynamic range of floating point numbers in a dictionary and in input instances and then map the floating point numbers into the range of integers. Additionally, when computations are discussed below (such as performing least squares, feature distance comparison, residual update/calculation, computation of a bounding box, etc.), these computations, in most embodiments, are performed using floating point.

FIG. 4(a) illustrates an embodiment of an input instance. For example, this input instance could be input x 305 or the randomly sub-sampled input x 311. An input instance is a m-dimensional vector in $R^m$ corresponding to m samples where each $x_i$ is a l-bit value. Practical systems may use, e.g., m=16 and l=8. Thus, the total number of bits in each input instance is ml. Using the exemplary values, ml=128. For input instances with this many bits a RAM-based table lookup implementation is generally not feasible.

FIG. 4(b) illustrates an embodiment of a dictionary of features. This exemplary dictionary has features a, b and c (note that the word atom may also be used for feature) that make up columns. This is an m×F dictionary. The dictionary may be trained using input samples or may be acquired from a dictionary repository.

Bounding Boxes

Embodiments of iCAM use an encoding of feature vectors using multidimensional bounding boxes. Typically, these bounding boxes are in the shape of a rectangle or square, but could be other shapes. Since bounding boxes are regularly shaped, their search is highly efficient. However, bounding boxes do not need to be the same size or shape in a context. A multidimensional bounding box is determined by its projected intervals on individual coordinate axes which are referred to as feature intervals. Feature intervals on each dimension are in turn derived from features in a given feature dictionary. This is called "interval encoding" below and allows for searching of bounding box proxies rather than the features themselves. In some embodiments, per-dimension, per-feature bounding boxes are utilized. That is, the bounding box for a given feature has its feature interval on each dimension determined by the nearest feature on each of the two directions.

Figure 5:
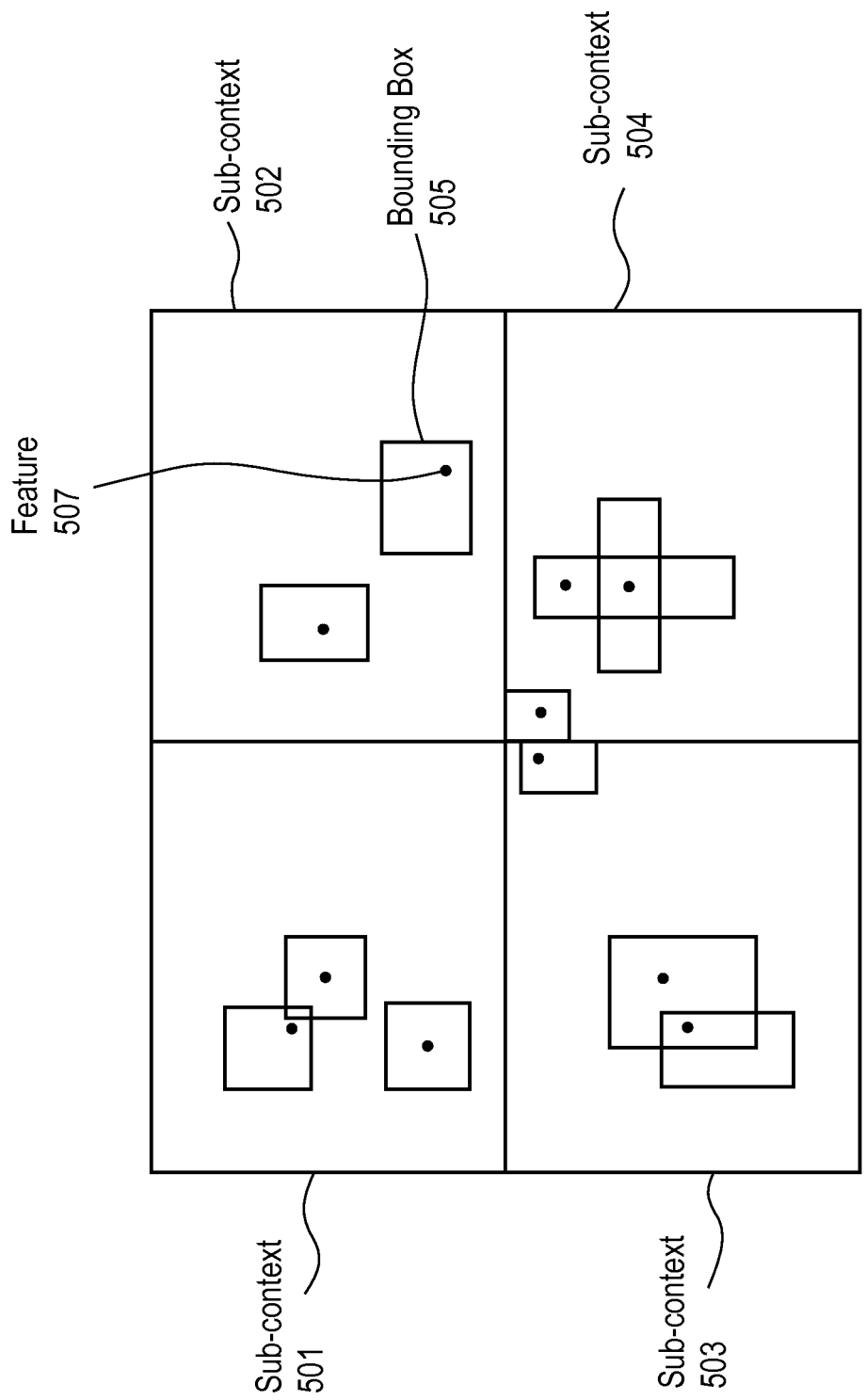
FIG. 5 illustrates an embodiment of bounding boxes for a context of interest.

FIG. 5 illustrates an embodiment of bounding boxes for a context of interest. In this particular illustration, the context of interest has several different sub-contexts 501-04 each having at least one bounding box 505. Each bounding box 505 includes a feature 507 (illustrated as a dot in a bounding box) at given coordinates, or at least an approximate coordinate value. Typically, these sub-contexts 501-04 are evaluated one at a time by placing the sub-context's dictionary into the iCAM, but in some embodiments they are evaluated in parallel as detailed below.

Figure 6:
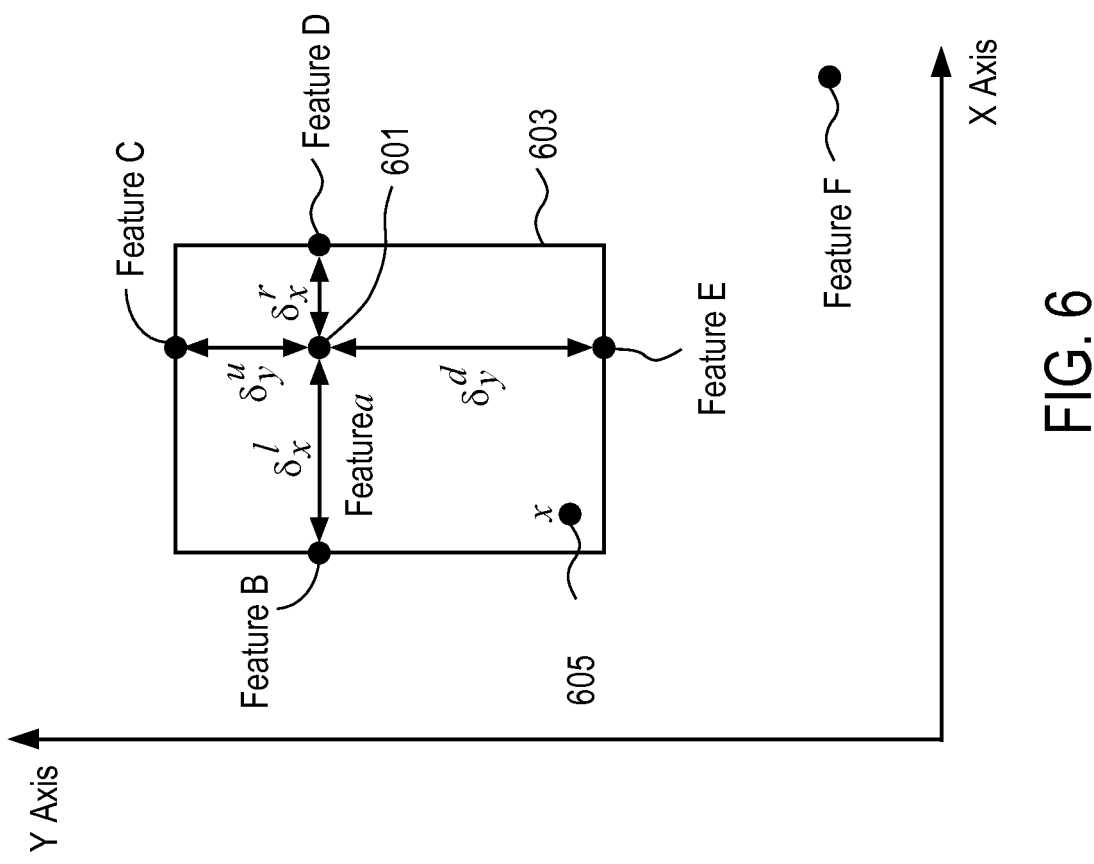
FIG. 6 illustrates an exemplary bounding box in a two dimensional space ($R^2$).

An exemplary bounding box in a two dimensional space ($R^2$) is shown in FIG. 6. A feature interval of the bounding box on a given dimension is determined by the minimum non-zero separation between the feature and any other feature in each of the dimensions. For a given feature a 601, suppose that on the X-axis its minimum non-zero separation from any other feature in each direction is $2\delta_x^l$ or $2\delta_x^r$, respectively, and that for the y-axis is $2\delta_y^u$ or $2\delta_y^d$, respectively. This leads to the bounding box for feature a 603 as depicted. In this illustration, there is an interval in both the x- and y-dimensions of $[\delta_x^l, \delta_x^r]$ and $[\delta_y^u, \delta_y^d]$ respectively.

If an input value is inside the bounding box (feature intervals) for a particular feature, then this feature is one of the best-matched features for that input value. For example, in FIG. 6, if the input x is searched for it, it will be found in the bounding box of feature a 603.

Figure 7:
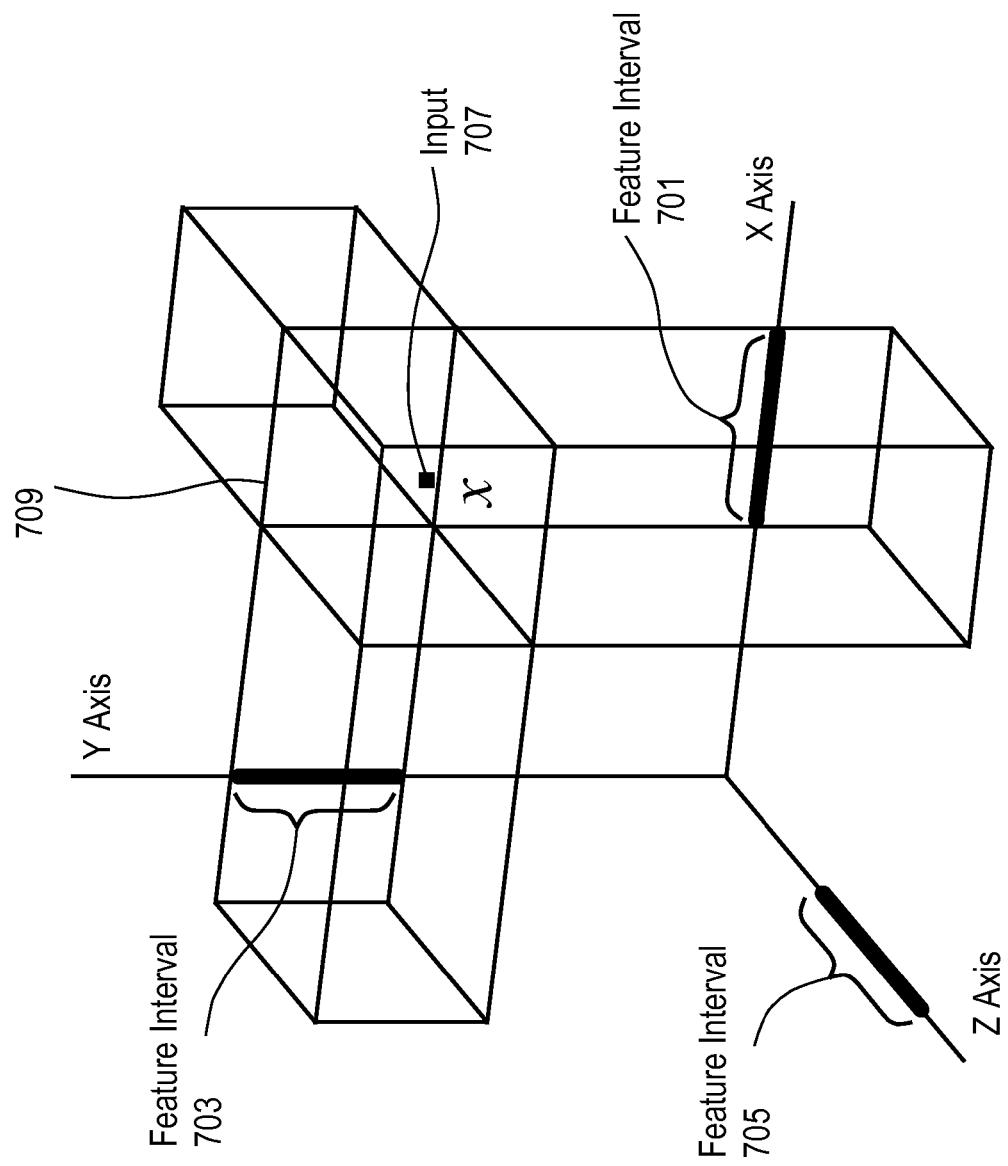
FIG. 7 illustrates an exemplary 3-D bounding box.

While FIG. 6 illustrates a simple 2D bounding box, any number of dimensions may be used. For example, a 3D bounding box may be used as shown in FIG. 7. This bounding box has feature intervals on the X-, Y- and Z-axes 701, 703, and 705 respectively. To determine if an input instance x 707 is in the bounding box 709, it is sufficient to check if x's X-, Y- and Z-coordinates are in the feature intervals 701, 703, and 705. As aforementioned, by using an iCAM or RAM, this check if x is in these feature intervals may be done via a lookup in every dimension.

It is natural for iCAM bounding boxes to use angular Cartesian coordinates, or angular coordinates for short, defined herein. However, non-angular ("conventional") Cartesian coordinates are used in some embodiments. Consider a normalized vector x. In conventional Cartesian coordinates, $x=(x_1, x_2, \ldots, x_m)^T$. In angular Cartesian coordinates, $x=(\theta_1, \theta_2, \ldots, \theta_m)^T$, where $\theta_{i=cos}^{-1} x_i$ with $\theta_i \in [0, \pi]$. FIG. 52(a) illustrates angular coordinates for x in $R^2$, i.e., m=2 and FIG. 52(b) illustrates angular coordinates for $x=(\theta_x, \theta_y, \theta_z)$ in $R^3$, i.e., m=3.

It is important to note that the angular representation is merely another way of expressing regular Cartesian coordinates. In the angular space, bounding boxes are specified in terms of its angular feature interval in each dimension. This is shown in FIG. 53(a) which depicts an angular feature interval is enclosed by two dotted arrows.

Consider a feature a in $R^2$. Suppose that the minimum nonzero separation to any other feature on the X- or Y-axis is $2\delta_x$ or $2\delta_y$, respectively. A bounding box for a may be specified as shown in FIG. 53(b) with the dashed lines.

Figure 53:
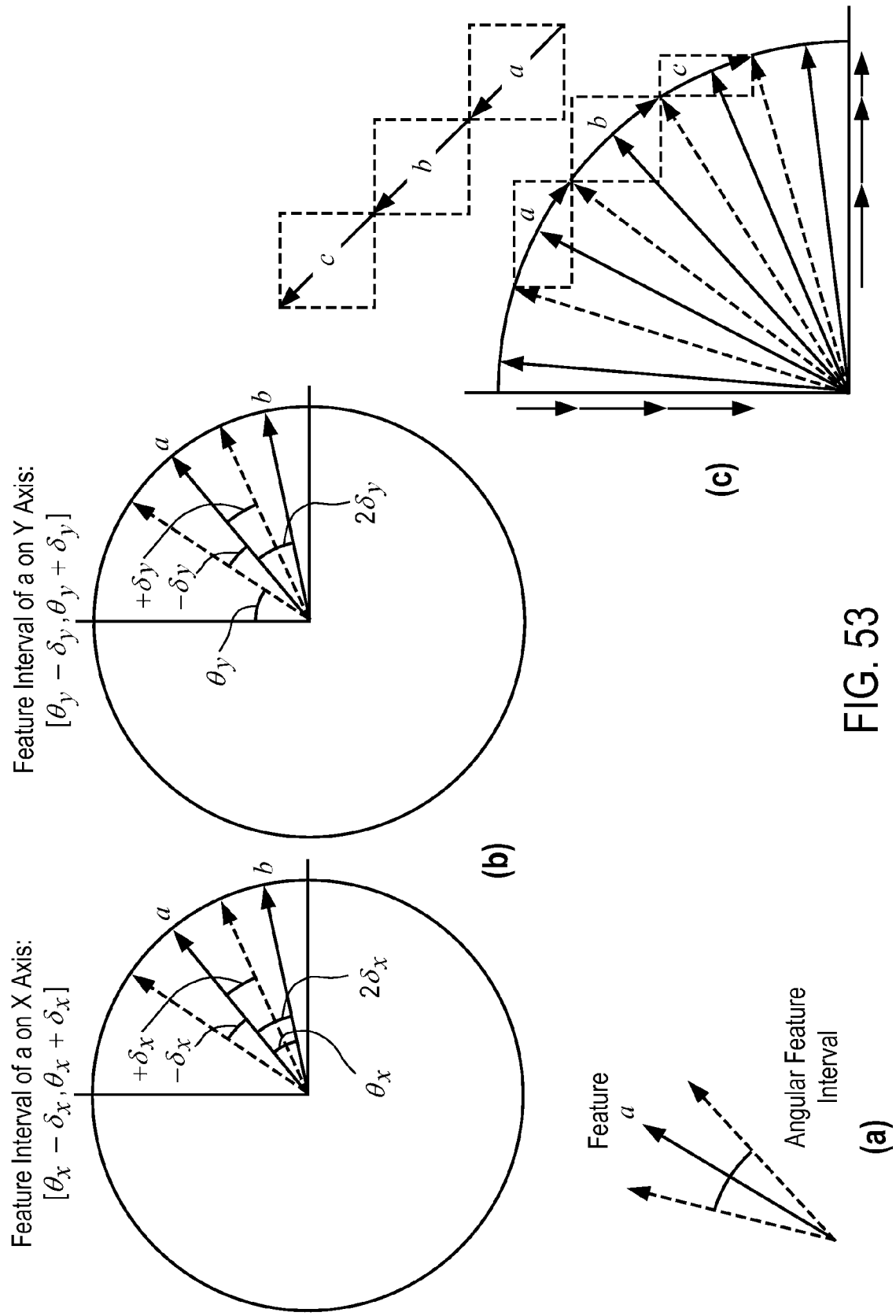
FIGS. 53(A)-(C) illustrate examples of angular feature intervals and bounding boxes.

As illustrated in FIG. 53(c) uniformly separated features in the angular space do not separate uniformly in conventional Cartesian coordinates. Note that dashed arrows on the axes do not need to have uniform lengths.

Using conventional Cartesian coordinates, bounding boxes near axes will have high aspect ratios, and to match a bounding box, an input instance will need to be more accurate on those dimensions where the bounding box has narrow edges. This means on any dimension features closer to the axis are less likely to be chosen. Therefore, there may be a systematic bias against these features, which should be avoided if possible.

In other words, the use of conventional Cartesian coordinates may make bounding box matching unnecessarily unreliable. In contrast, bounding boxes in angular coordinates do not have this problem. However, the description herein applies to both conventional and angular Cartesian coordinates.

Computing Sparse Representations

An embodiment of a CAM-based multi-dimensional iCAM lookup scheme has a property that the number of iCAM cells is $\leq 2(l-1) \cdot F$ where l is the number of bits in each sample of input instances and F is the number of features (the number of atoms in the given feature dictionary). The scheme is applicable to any sparse coding problem which seeks sparse representations for input instances or, generally, any nearest-neighbor search problem. Practical systems may have l=32 and F around tens of thousands.

Using iCAM interval encoding, in some embodiments, $2(l-1)$ entries of a Ternary CAM (TCAM)) are sufficient to encode any feature interval on each dimension, where l is the precision of features in bits. This results in an efficient CAM-based iCAM implementation for feature lookup. More precisely, for a given precision l, the iCAM system requires only O(F) entries for F features, and can lookup the best-matched feature in O(1) time independent of F.

Figure 8:
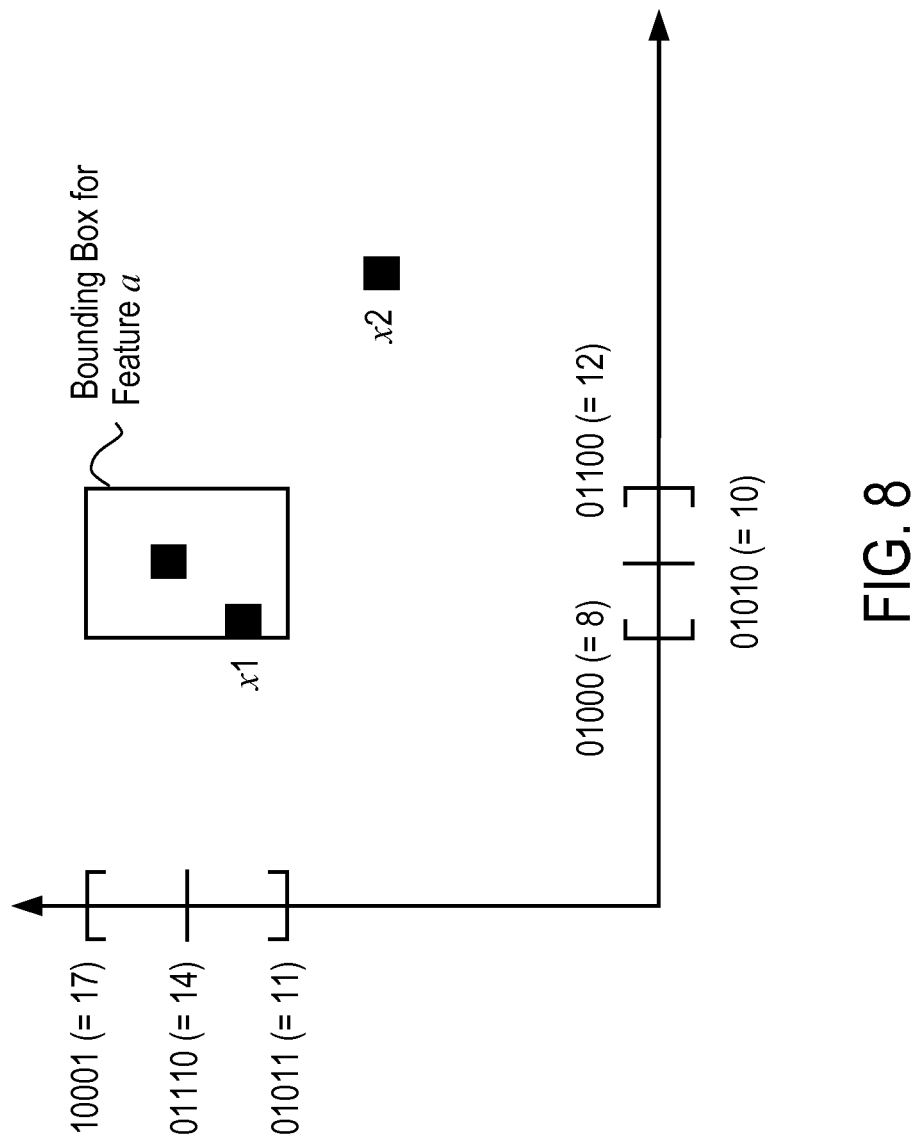
FIG. 8 illustrates an example of non-overlapping bounding boxes.

In iCAM based searching m-dimensional bounding boxes are searched for best-matched features. As noted earlier, these bounding boxes are blocks of instances surrounding features. A bounding box is specified for a feature in terms of its projected intervals on sample axes. These are feature intervals on these dimensions. For simplicity, a non-overlapping case is illustrated in FIG. 8, however, bounding boxes may overlap by design. In the figure, a bounding box in $R^2$ for feature $$a = \begin{bmatrix} 01010 \\ 01110 \end{bmatrix}$$

with m=2 and l=5 is shown. The feature interval on the vertical axis is 11 to 17 and on the horizontal axis is 8 to 12.

For any given instance x, an iCAM lookup is used to check if x is in a bounding box. As shown, if x is found to be in the bounding box for feature a, then x's best-matched feature is a.

For the example in FIG. 8, given an instance in $R^2$, its first and second components are used to search iCAM for intervals [8, 12] and [11, 17] in dimensions 1 and 2, respectively.

Consider, e.g., input instances $$x1 = \begin{bmatrix} 8 \\ 12 \end{bmatrix} = \begin{bmatrix} 01000 \\ 01100 \end{bmatrix} \text{ and } x2 = \begin{bmatrix} 19 \\ 8 \end{bmatrix} = \begin{bmatrix} 10011 \\ 01000 \end{bmatrix}.$$

For x1, a search of the iCAM using 01000 and 01100 is made. Both would yield matches, and it is concluded that x1's best-matched feature is a. For x2, the search will not yield a match and thus no feature is found.

There are many ways to compute a sparse representation using an iCAM approach. Detailed below are several embodiments of methods for performing this computation. For example, suppose that an input instance x can be approximated with a linear combination of K features in D. That is the sparsity is K. Then, for x, its sparse representation z has upto K nonzero components.

One approach to computing a sparse representation uses orthogonal matching pursuit (OMP). Without loss of generality, assume that input instances and dictionary atoms are normalized so that their $L_2$ norm is equal to 1. Using OMP, a computation of these K nonzero components in z is made one at a time by performing K iterations of using the a 3-step computation of:

1) Identifying the position of a nonzero component by finding x's best-matched feature in D. The feature closest to x in the angular distance is selected. With an iCAM this step will be done at least partially via a table lookup.

2) Computing the values of all non-zero components (coefficients) identified thus far in current and previous iterations. This is typically done by assuming that all other components are zeros and then solving the resulting over-constrained system via least squares.

3) Updating x by removing its orthogonal projection on the space spanned by all best-matched features found so far. That is, the updated x is the residual and the normalized residual is then used in the identification step.

Figure 9:
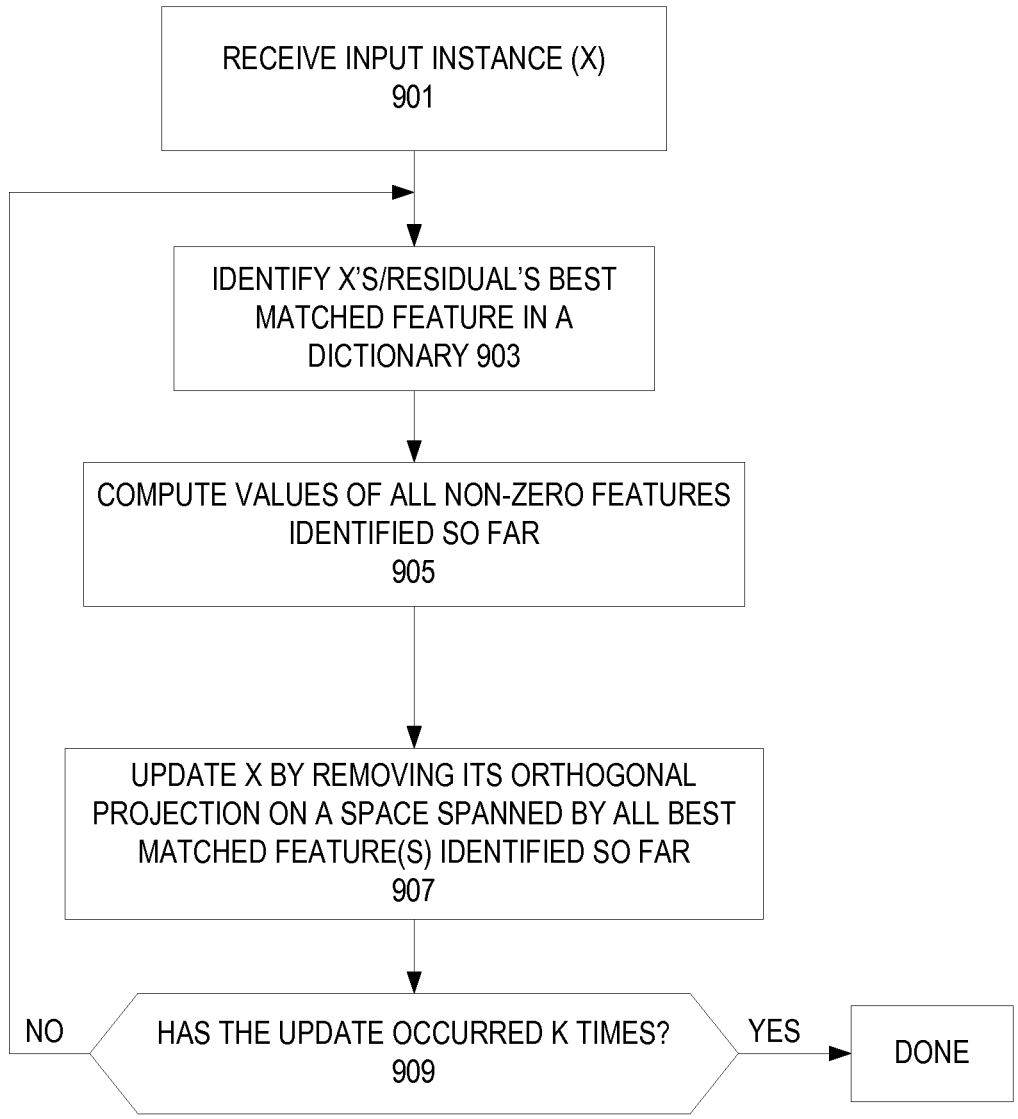
FIG. 9 illustrates an embodiment of an OMP method for finding best matches.
Figure 10:
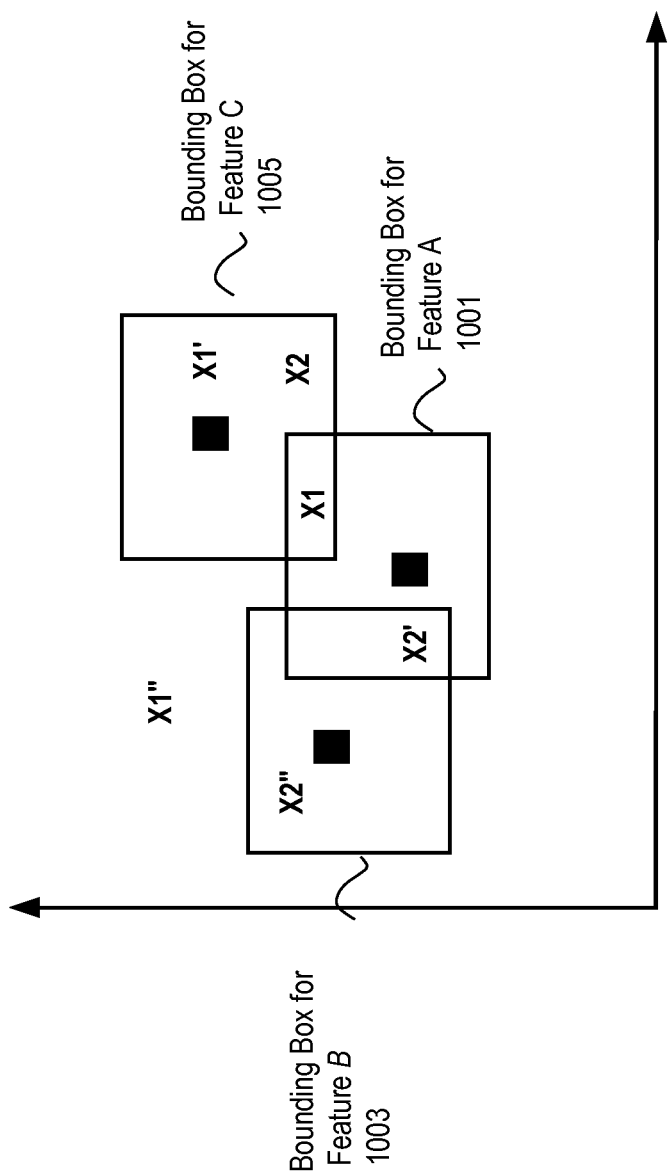
FIG. 10 illustrates an exemplary application of OMP.

FIG. 9 illustrates an embodiment of an OMP method for finding best matches. Additionally, to help make this embodiment clearer, an exemplary run through an embodiment of the method will be made with respect to FIG. 10 which illustrates an example of features a, b, and c and their bounding boxes 1001, 1003, and 1005 respectively. The OMP routine is stored in memory and executed by a processor (potentially with the help of another component such as a co-processor or accelerator).

At 901, an input instance, x, is received by the OMP routine. This routine is stored in memory of a computing system that includes an iCAM. An application of OMP to the example of FIG. 10 for input instances x1=10a+8c and x2=9c+3a+2b is described herein.

At 903, the input instance's best matched feature is found in a dictionary. Again, this is performed by an iCAM lookup and potentially some calculations. In some embodiments, multiple features are looked up. In some embodiments, for example, for x1, the first step is to perform an iCAM lookup for x1: a, c and for x2 it is to lookup c. For x1, the results of the lookup are compared. Whichever result has the smallest dot product with x is the best-matched feature. That is a for x1.

Once the best matched feature for the input instance is found, a computation of all of the non-zero features found so far is made at 905. Typically, this is done by a least squares computation on the best matched feature. In terms of x1 and x2, this would be the computation of least squares on a and c to get approximate values of 10 and 9 respectively.

The input instance is updated by removing its orthogonal projection on a space spanned by all best matched feature(s) identified so far at 907. In essence, a residual is created for the input instance. For example, x1 is updated to be x1' and x2' with x1'=x1−10a and x2'=x2−9c, approximately.

A determination of if the update has occurred k times is made at 909. In other words, a determination of if all of the best matched values have been identified is made. If not, then the residual is used to identify the next best matched feature at 903. For example, with respect to x1, x1' is used in the identification step. Here, an iCAM lookup for the residual is made and c is found. For x2' a and b would be found. This process of identify, compute, and update continues until all best matched features have been found.

The most expensive cost of an OMP iteration is finding the best-matched feature in D for input instance x or its residuals. The best-matched feature is the dictionary feature which has the smallest dot product with x. The dot product of two vectors a and b is defined as follows, with $\theta \in [0, \pi]$ being the angle between the two vectors: $a \cdot b = \|a\|_2 \|b\|_2 \cos \theta$. Since dot products are compared in absolute value, in some embodiments, both positive and negative feature vectors are used.

Figure 11:
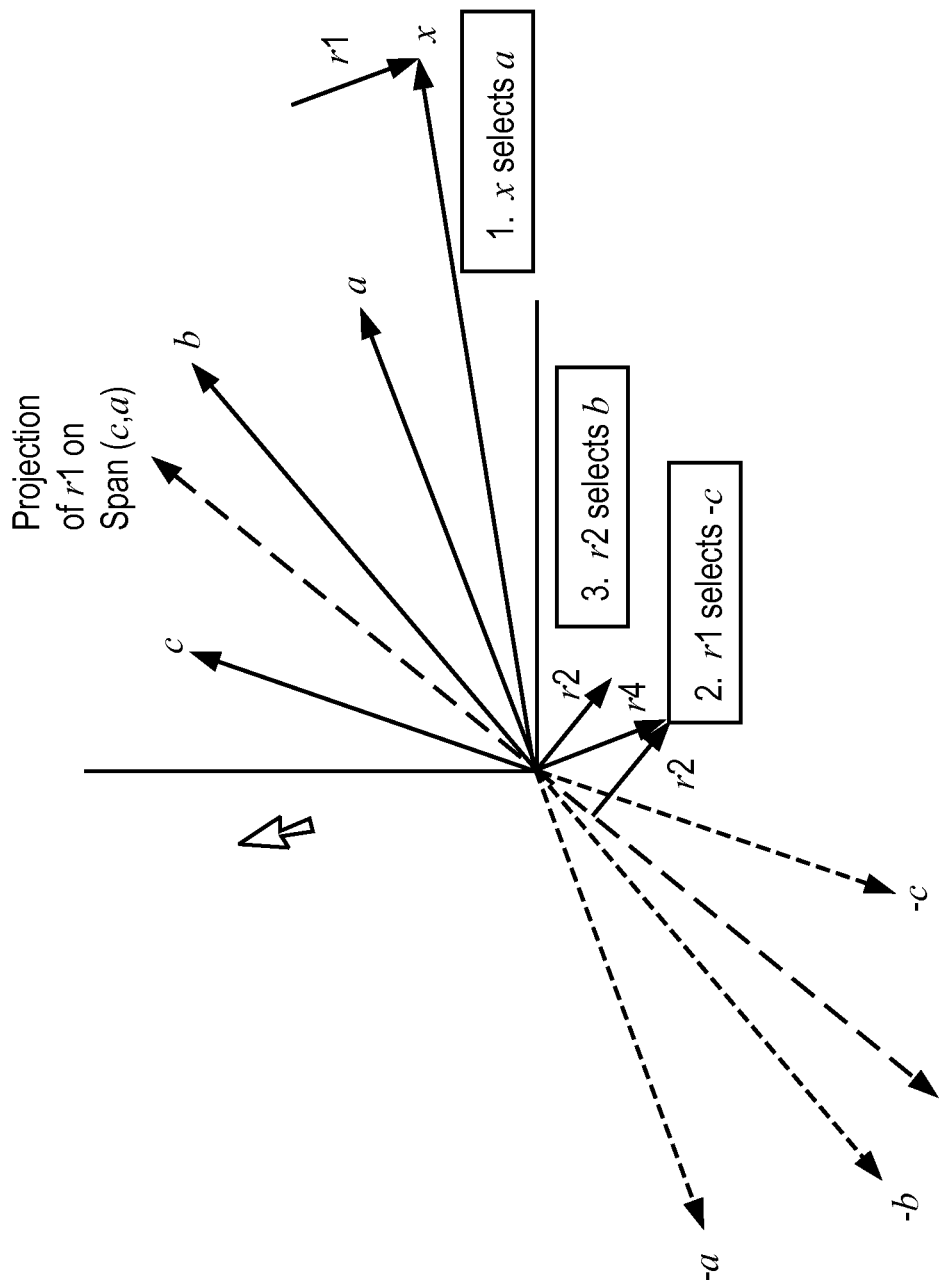
FIG. 11 illustrates an example of OMP using angles to identify the best-matched feature in each iteration.

As shown in FIG. 11, OMP uses angles to identify the best-matched feature in each iteration, where both positive and negative versions of each feature vector in D are included in the consideration is shown. Given features a, b, c and input instance x, successive OMP iterations yield residuals r1, r2, etc. of decreasing magnitude. In this illustration, the iterations are numbered 1 through 3. In the figure, r2 is perpendicular to the subspace spanned by a and c. The dashed line is the projection of r2 on this subspace.

Figure 12:
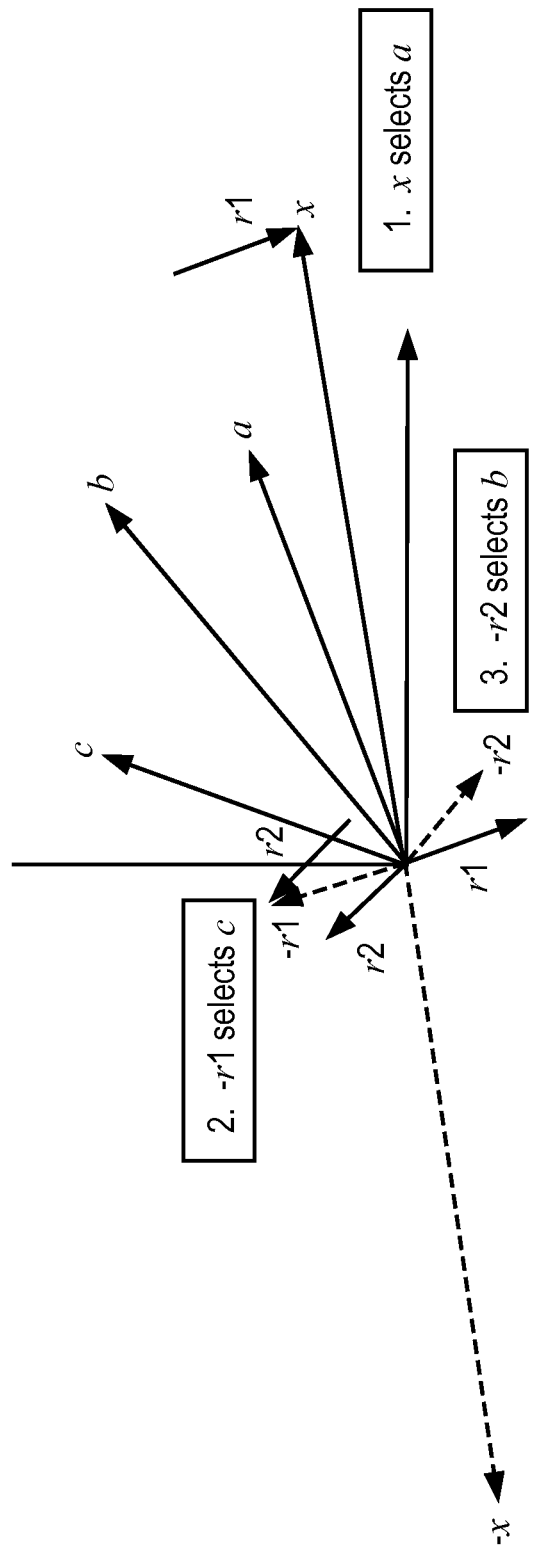
FIG. 12 illustrates an exemplary iCAM OMP implementation using only positive versions of feature vectors.

In an iCAM OMP implementation, it is possible to only use positive versions of feature vectors but lookup both positive and negative inputs, e.g., x and −x, r1 and −r1, etc. This may avoid doubling the iCAM size. FIG. 12 illustrates an exemplary iCAM OMP implementation using only positive versions of feature vectors. Note that iCAM OMP finds the same best-matched features as OMP in FIG. 11.

Figure 13:
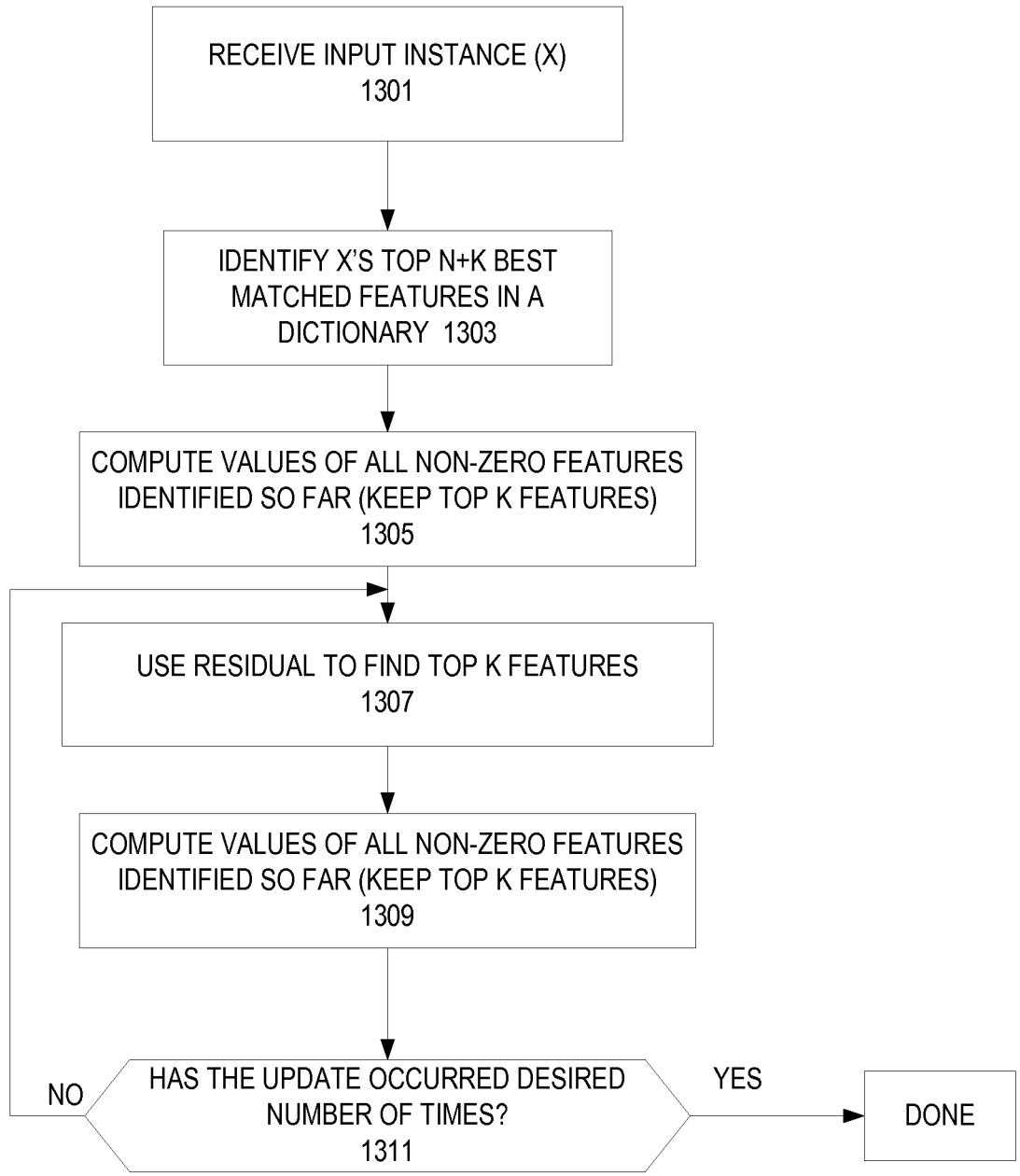
FIG. 13 illustrates a method for identifying features using match pursuit ("MP" or "CoSaMP") according to some embodiments.
Figure 14:
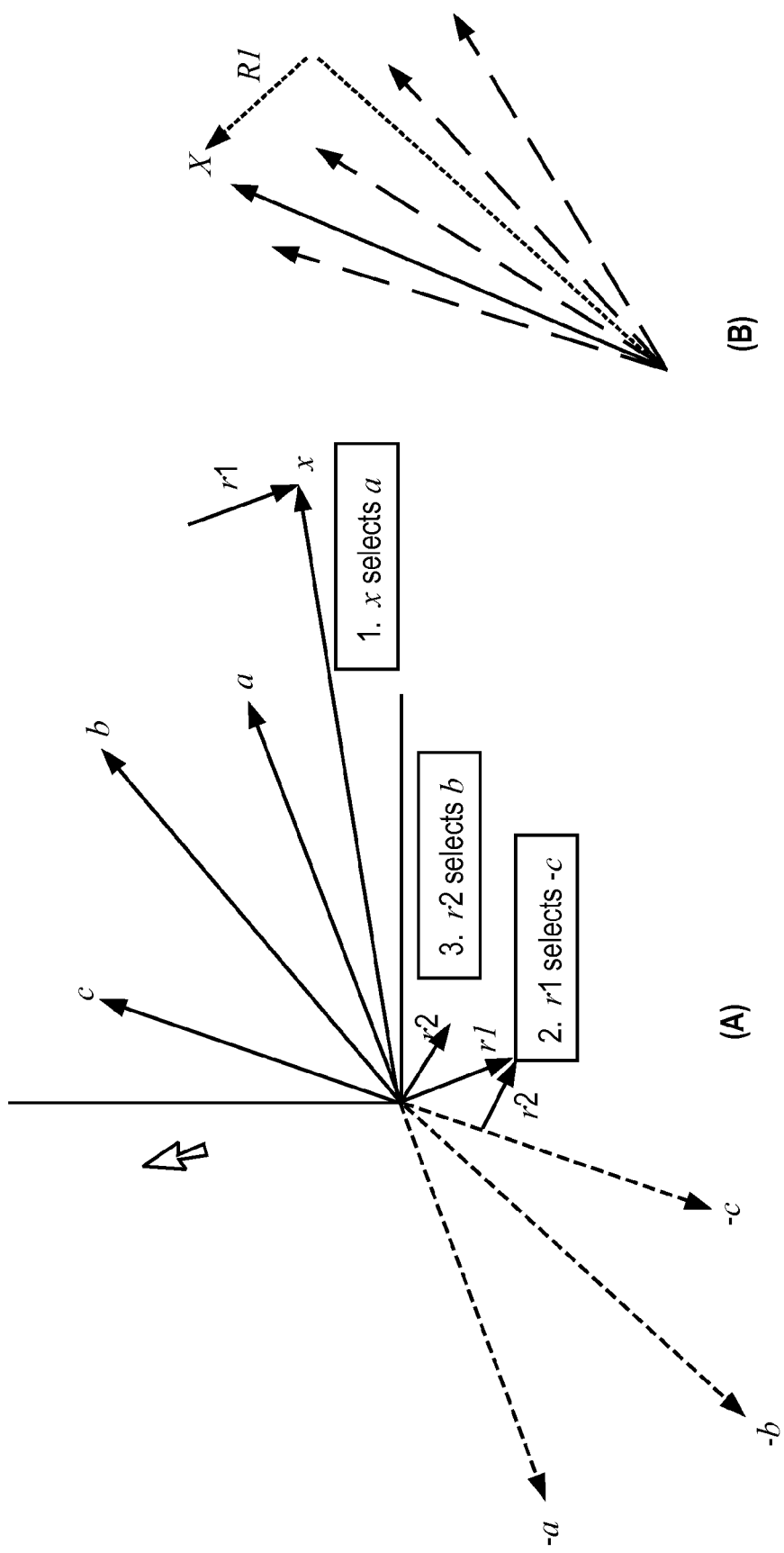
FIGS. 14(A)-(B) illustrate MP calculations.

FIG. 13 illustrates a method for identifying features using match pursuit ("MP") according to some embodiments. Match pursuit (MP) has simpler operations than OMP and in some variations such as Compressive Sampling Matched Pursuit (CoSaMP) may be more accurate and is used for high-quality sparse representations. In some embodiments, an MP routine for identifying features is stored in memory and executed, at least partially, by a processor. Additionally, in some embodiments, an accelerator external to the processor's cores is used to access a CAM (such as a TCAM) or iCAM. Using MP, each iteration of the MP routine computes K top features rather than one top feature as in OMP. FIG. 14(A) illustrates an exemplary CoSaMP calculation.

At 1301, an input instance, x, is received for processing. This input instance may be received by the CoSaMP routine stored in memory associated with a processor.

Using the input instance, x, the top N+k features are identified by a lookup such as an iCAM or TCAM lookup at 1303. For example, when N=2 and k=2, 4 features are found. An example of a result of this identification is illustrated in FIG. 14(B). Here, the top 4 features (dashed arrows) are identified.

A computation of the best approximation(s) to the input instance in the subspace spanned by the identified top features is made at 1305. For example, the CoSaMP routine calls for a least squares calculation to compute the best approximation (solid arrow). This best approximation is a linear combination of these top features. The output of the least squares calculation is a residual and the identified top features. The best N features (dotted arrows) are kept for the subsequent iteration which have the largest coefficients in the linear combination.

Using the residual, its top k features for the residual are found using as a lookup such as an iCAM or TCAM lookup at 1307. A computation of the best approximation(s) to the input instance in the subspace spanned by the identified top k features and the best N features from the previous iteration is made at 1309. In some embodiments, this is done with a least squares calculation as before. However, in other embodiments, an update of MP residuals is performed with $\pi/2$ complements as shown in FIG. 14(b). For example, suppose that a is the most recently selected feature, and in angular coordinates $a=(\theta_x, \theta_y, \theta_z)$. Then, as depicted in the figure, the residual r is obtained by taking $\pi/2$ complements on a's angular coordinates, i.e., $$r = \left(\frac{\pi}{2} - \vartheta_x, \frac{\pi}{2} - \vartheta_y, \frac{\pi}{2} - \vartheta_z\right).$$

Thus, while producing higher quality sparse representations, top-k MP has comparable cost as OMP. In a top-k iteration each successive top feature can be simply obtained with an iCAM lookup followed by the $$\frac{\pi}{2} - \vartheta$$

angular update for each dimension. Like the calculation of 1305, the output of this computation is a residual and top k features.

In some embodiments, this pattern of identifying top N+k features and computing the best approximation is repeated based on heuristics as shown in 1311. Generally, there are not many iterations needed (on the order of 2-5 iterations).

Examples of iCAM Lookup

A single-dimensional iCAM interval lookup matches a single sample in an input instance x. For example, for a single sample (input instance) that has l=32 bits and the dictionary that has F=1K features (columns), this lookup is done by applying the sample to the dictionary to find a best-matched feature in the iCAM by evaluating all of the entries of the iCAM in parallel. Typically, the dictionary of the iCAM will use only 2(l-1)*F cells, or, using the above values 62K cells.

Many applications will require more than a single dimensional lookup. An exemplary parallel multi-dimensional iCAM lookup is detailed in FIG. 15(a). In this example, an input instance with m=6 samples each of which has l=3 bits is provided as shown.

Figure 15:
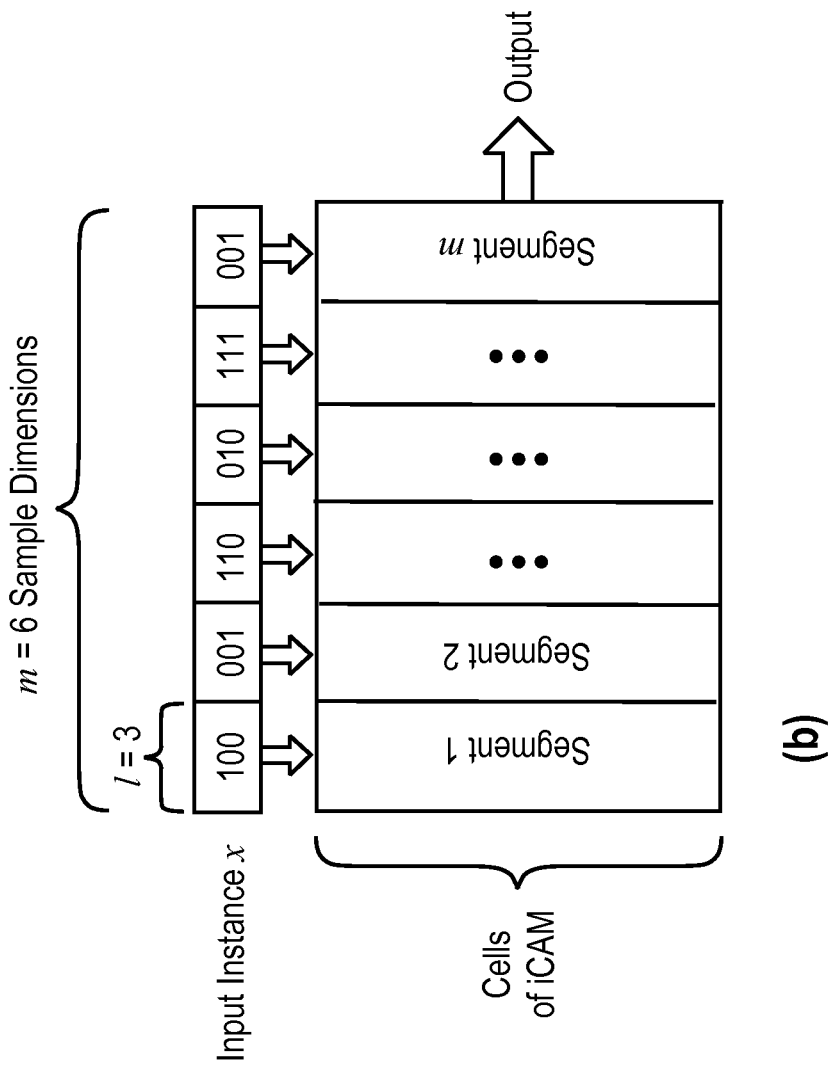
FIGS. 15(a)-(b) illustrate an exemplary parallel multi-dimensional iCAM lookup and input instance.

The m samples of the instance are input into the iCAM in parallel. As such, the iCAM has m=6 "segments," each of which is associated with a sample dimension. For the input instance above, each segment is l=3 bits wide, as illustrated in FIG. 15(b).

The feature intervals map for a dimension shows feature intervals of all features projected onto this dimension. For example, the feature intervals map in FIG. 16(a) depicts three l=3 bits features F1, F2, and F3, with feature intervals [0, 1], [2, 5] and [6, 7], respectively.

iCAM Optimizations Including Entry Creation

In some embodiments, the dictionary stored in an iCAM includes all entries per feature interval. However, this is not likely to be an efficient, or practical, way to utilize iCAM space. In some embodiments, as noted above, up to 2(l-1) entries are stored.

In some embodiments, iCAM entries are saved by noticing lower-order bits that often do not matter. FIG. 16(b) illustrates saved iCAM entries. Suppose one would want to find out if a single-sample, 3-bit input instance x uses feature F1. If its leading two bits are 00, then it can be immediately concluded that the instance uses F1. There is no need to continue examining bit 3. This gain is called early completion. Early-completion gain for features increases with lengths of their intervals. Note that in this illustration rectangles are used to mark the corresponding completion substrings.

Figure 17:
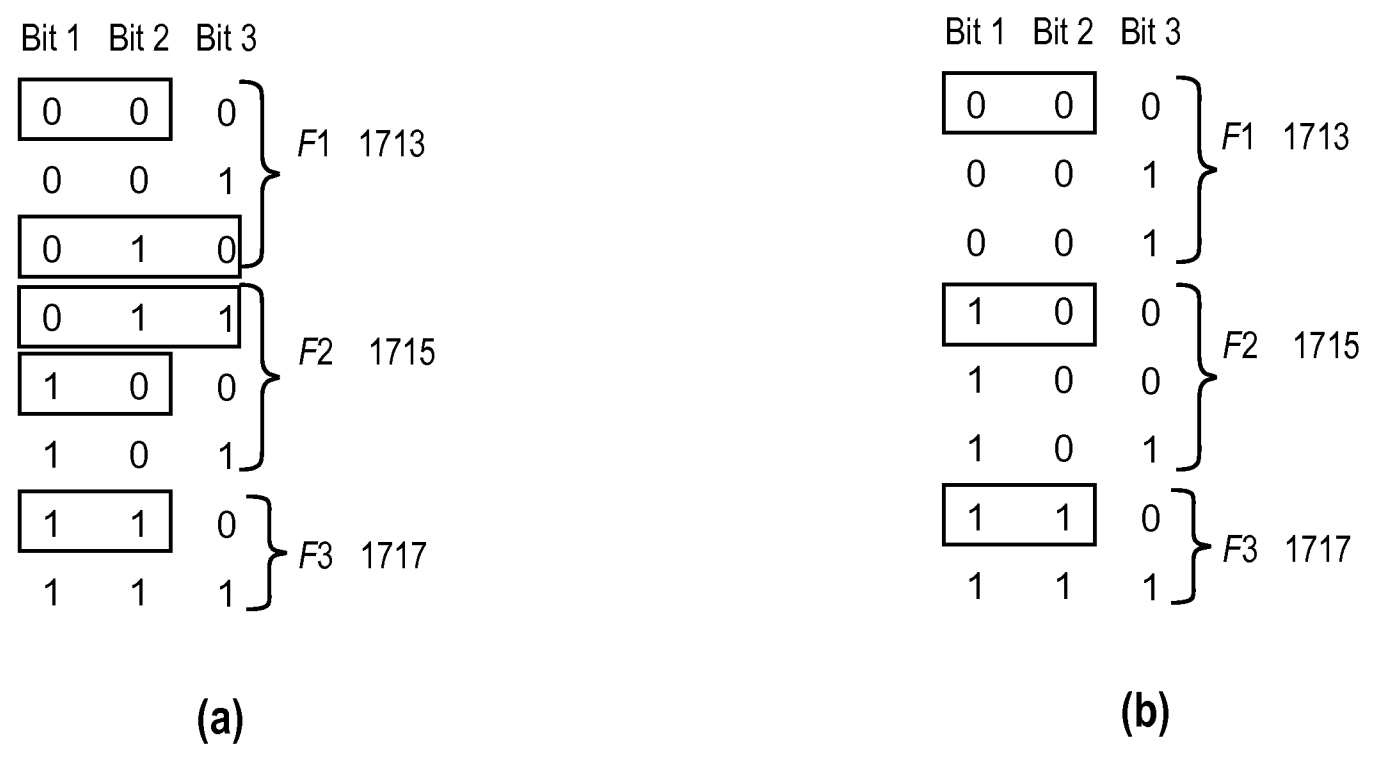

In some embodiments, early completion gain is increased using "interval-end rewrite." FIG. 17(a)-(b) illustrates a before and after look, respectively, of a features interval map after interval-end rewrite. As illustrated, feature intervals F1 and F2 each have two bit patterns unique to them. The goal of interval-end rewrite is to minimize those bit patterns. Adding a "1" to the beginning instance and/or subtracting "1" from the last instance for each feature interval with more than one unique bit patterns is performed if the beginning and end instances have a least significant bit of 1 and 0 respectively. In FIG. 17(a), bit pattern 010 of F1 and bit pattern 011 of F2 are subject to rewrite as 010 is the last instance of F1 and ends in a 0 and 011 of F2 is the beginning instance and ends in a 1. After re-writing these two values, F1 can be identified with 00* and F2 with 10* thus removing an iCAM entry for both F1 and F2.

Figure 18:
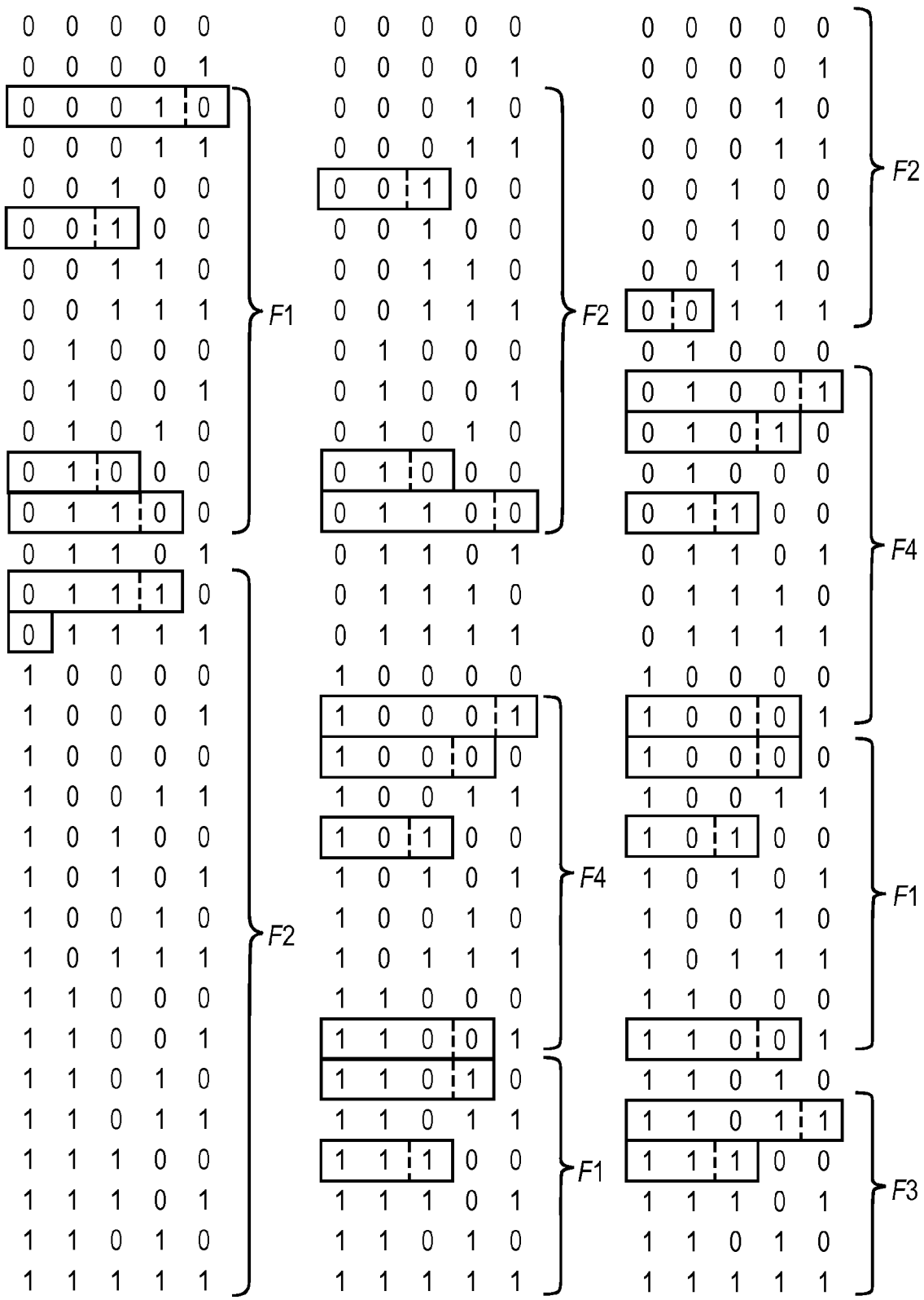
FIG. 18 illustrates an exemplary multi-dimensional lookup.
Figure 19:
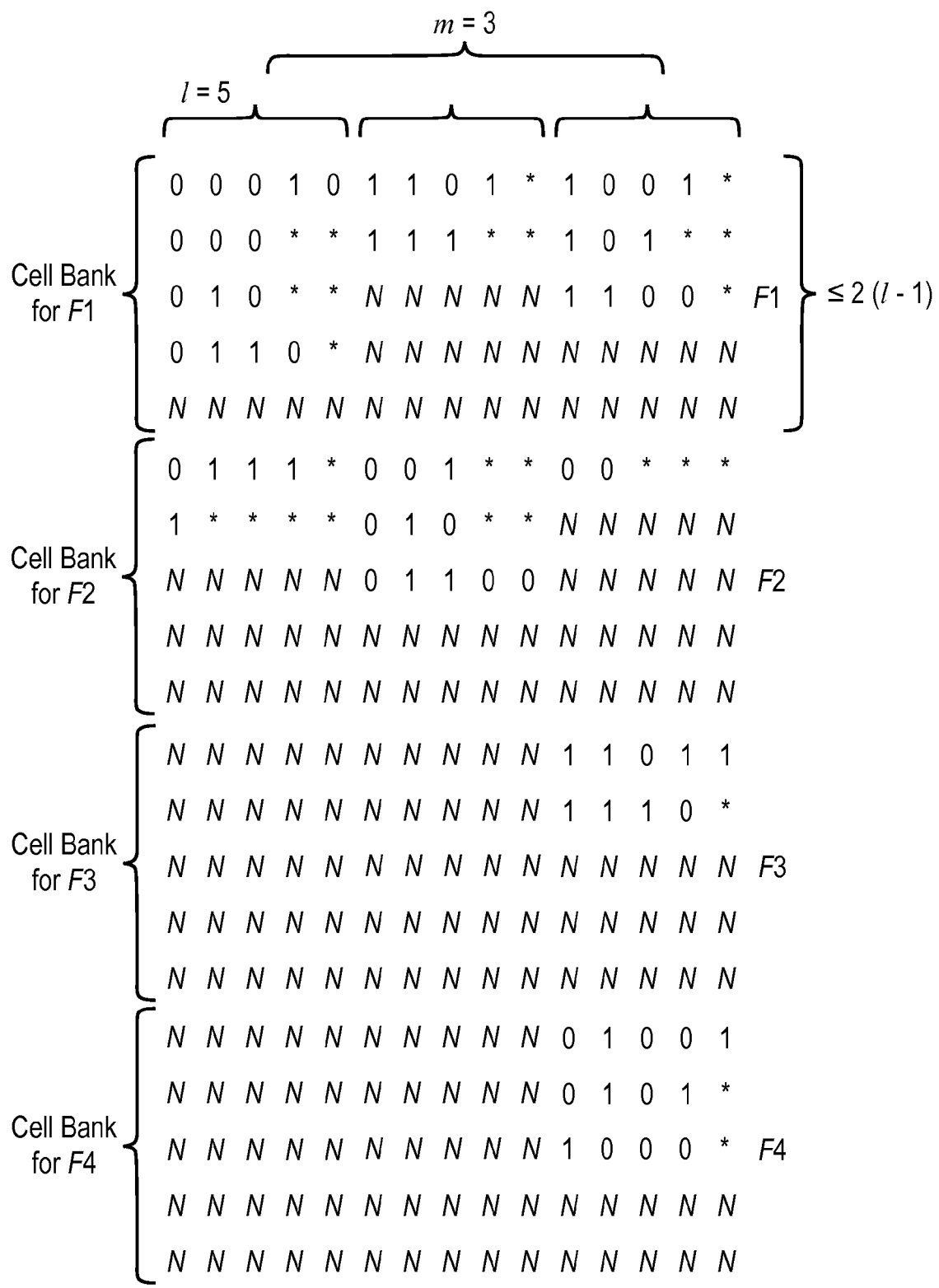
FIG. 19 illustrates an exemplary to a multi-dimensional iCAM scheme.

A multi-dimensional iCAM interval lookup matches multiple samples in an input instance x. Suppose that given an input instance of m=3 samples each with l=6 bits, and a match with 3-dimensional features is desired as depicted in FIG. 18. A single-dimensional iCAM feature lookup is used for each sample. For this, a more optimum iCAM may use a cell bank of height no greater than 2(l-1) for any feature interval regardless its size. This leads to a multi-dimensional iCAM scheme for matching all three samples, as depicted in FIG. 19 which shows cell banks of an iCAM for 3D features.

Those rows that are composed of entirely copies of symbol N will not match anything. They could be removed from the table or kept for the sake of uniformity. Additionally, there are instances where a bit position does not matter and is therefore a "don't care" value (illustrated as a *). For example, in completion substrings 00010 and 00011 the final bit does not matter and therefore the iCAM entry may simply be 0010* thus saving one entry from having to be created in the iCAM. Note that cell bank sizes do not need to be the same.

Figure 20:
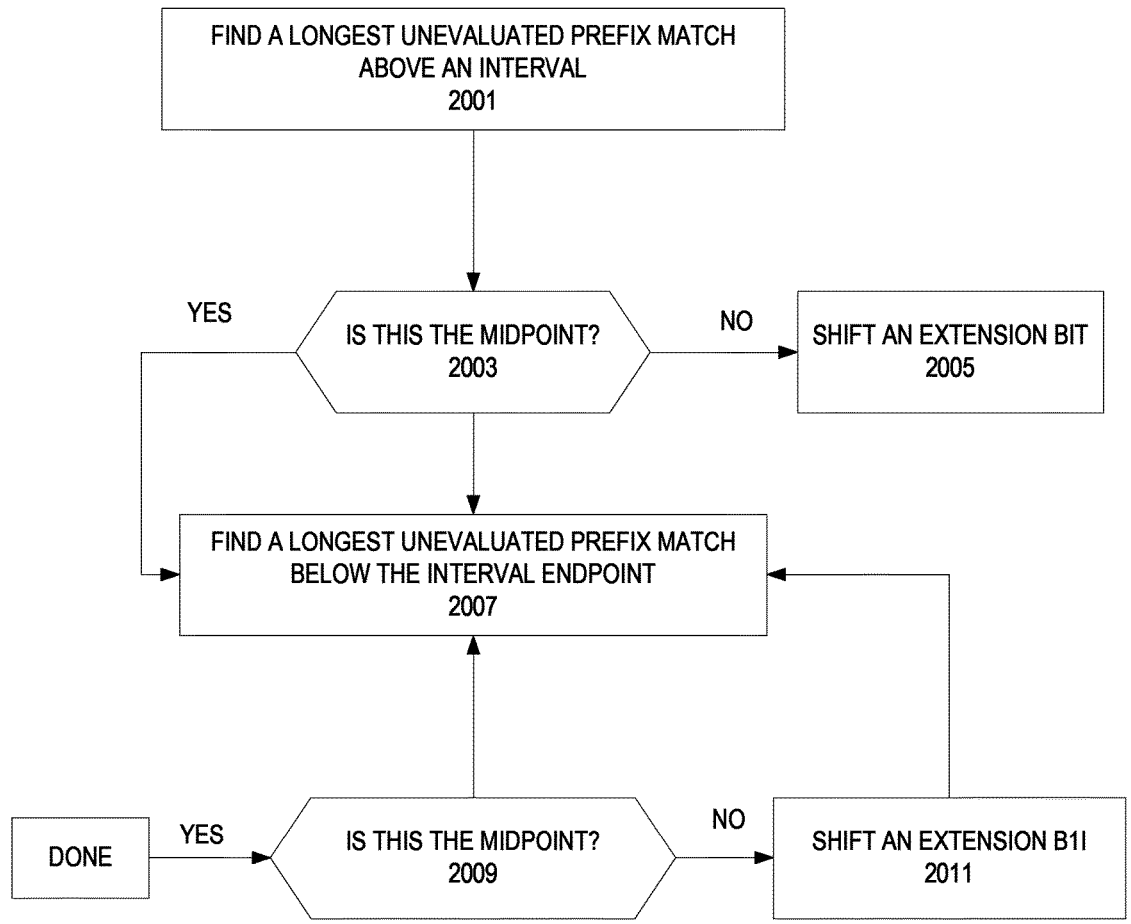
FIG. 20 illustrates an embodiment of a method for efficient encoding of feature intervals.
Figure 21:
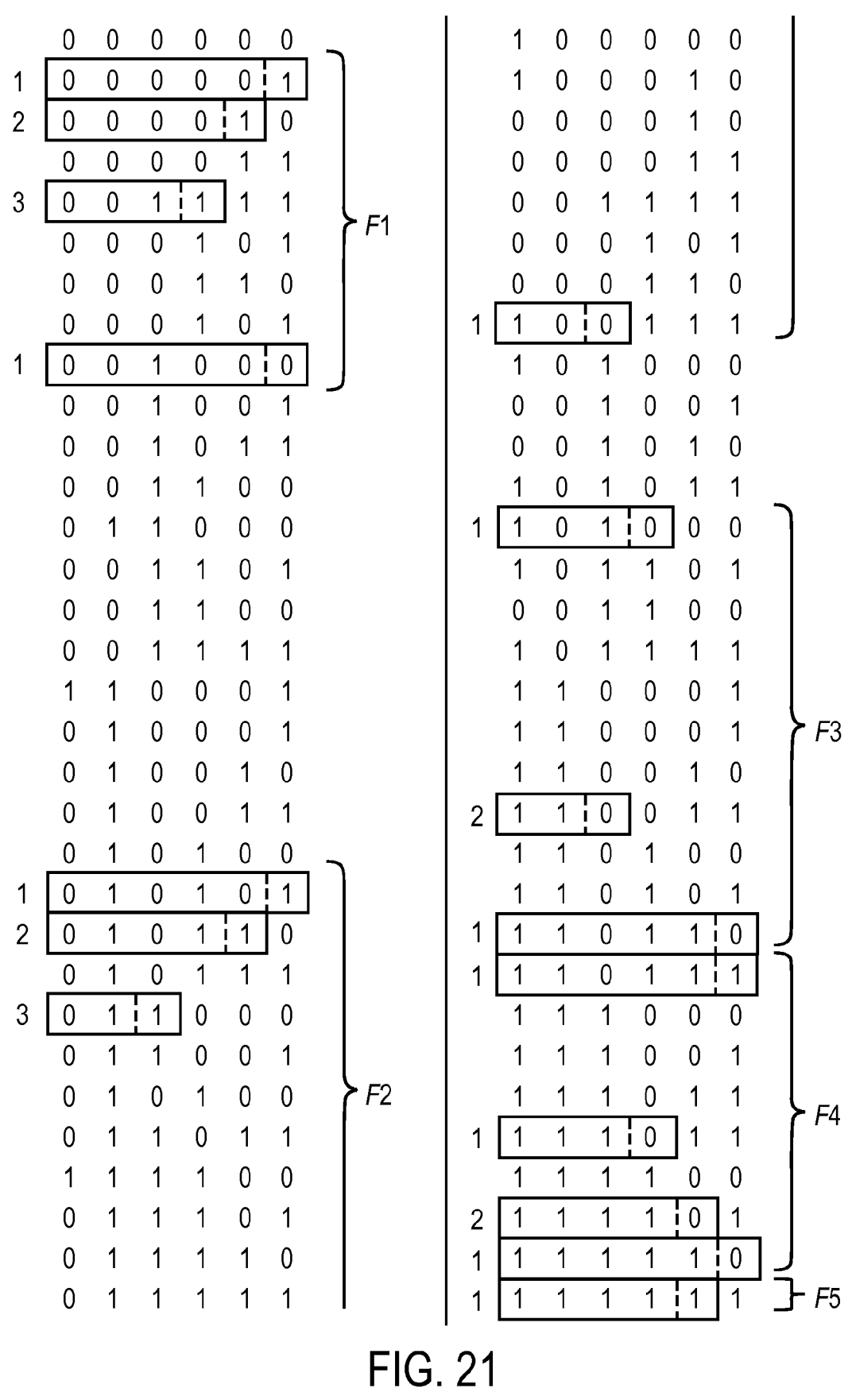

FIG. 20 illustrates an embodiment of a method for compressing feature intervals. This method is executed by a processor on feature interval sets stored in memory. In some embodiments, this method is performed after interval end rewrite. For each feature interval, there is a beginning, middle, and endpoint. FIG. 21 illustrates an example of five features (and their intervals) and what is selected as entries into an iCAM. In this figure, l=6 bits and the selected iCAM entries are denoted by rectangles with solid black boundary. FIG. 21 is used to provide a concrete example for FIG. 20.

At 2001, a longest unevaluated prefix match above the interval is found which is an entry in the iCAM. In terms of FIG. 21 this is 0000 for F1, 01010 for F2, etc. The iCAM entries are the longest prefix match patterns extended by one bit at the right end in the example. Any bit positions that extend beyond the extension bit are don't cares. So the first entry into the iCAM for F1 is 000001 which corresponds to an address that points to F1 in RAM in the typical implementation.

A decision of if the midpoint has been reached is made at 2003. If not, then the extension bit is shifted to the left by one bit position from the previous one at 2005 and the next longest prefix match pattern is found at 2001. For F1, this next longest match is 0000 and the entry would be 00001*. Note that this covers two entries of the feature interval 000011 and 000010, but minimizes the number of entries required in the iCAM. In other words, if there are remaining leading bits not identified yet, include them as iCAM entries.

If the midpoint has been reached at 2003, a longest unevaluated prefix match below the midpoint of the interval is found at 2007 which is an entry in the iCAM. Typically, this the largest value in the interval. For F1, the longest pattern is 00100. The entry into the iCAM would be 001000 since there are no other patterns available to match and the entries are as optimized as they can be.

A decision of if the midpoint has been reached is made at 2009. If not, then the extension bit is shifted to the left by one bit position from the previous one at 2007 and find the next longest prefix match pattern at 2007. For F1, there would be no such match. However, for F4 this would be 1111 which leads to an iCAM entry of 11110*.

Since each successive longest match pattern shifts at least one bit position from the previous one, there cannot be more than 2(l–1) such longest prefix match patterns in the interval.

The above operations are performed per feature interval such that all feature intervals are evaluated and the iCAM entries deduced. Of course, the above operations may be done in a different order such as doing bottom-up passes before top-down passes.

FIG. 22 shows the iCAM entries for the five features in FIG. 21. Each CAM entry points to a RAM address where the corresponding feature Fi is stored.

While this illustration shows each iCAM entry pointing to a different location in RAM, it should be noted that in a typical implementation, each iCAM entry includes sample information for a feature and an address into RAM (other other storage). For iCAM entries that are common to a particular feature (and therefore feature interval), the address into RAM is typically the same. In other words, the same feature is not stored into different locations in RAM.

Figure 23:
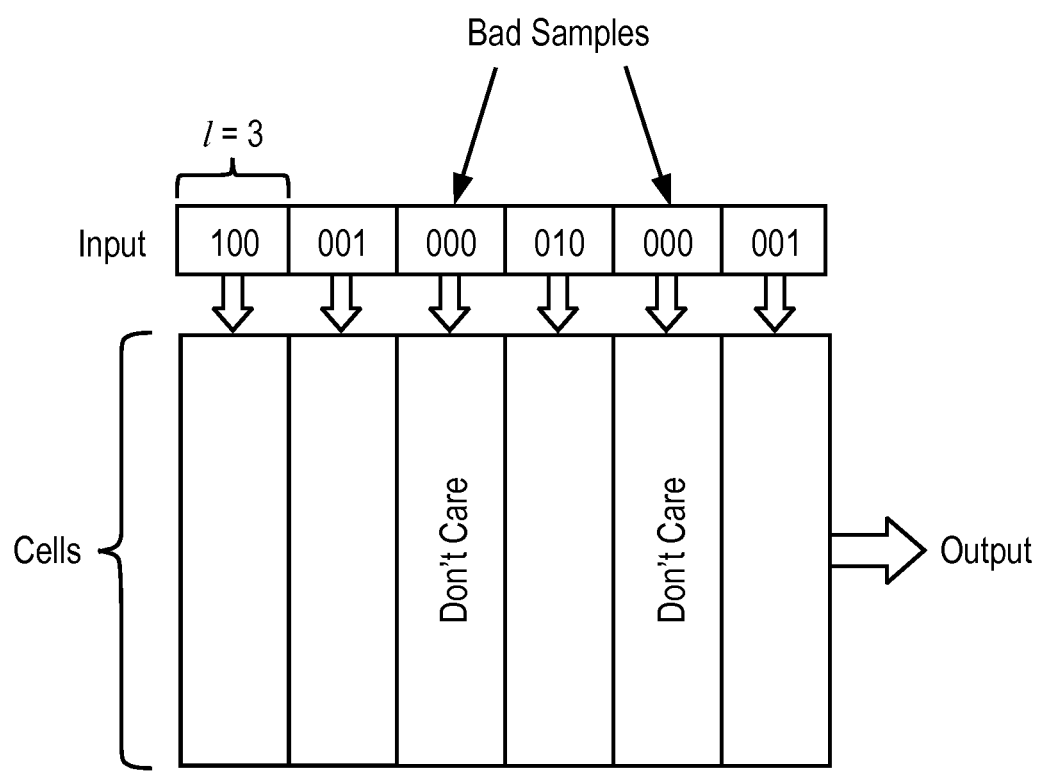
FIG. 23 illustrates an example of the use of don't cares in an iCAM.

Unfortunately, an input instance may have one or more bad samples. For example, samples that are reporting zero depth values may indicate sensing failures in depth estimation. In some embodiments, if a number of bad samples exceeds a threshold, then the input instance is invalid. For example, if the number of bad samples $>\beta m$ for some chosen $\beta$ (such as $\beta=0.5$), then the input instance is invalid. Invalid input instances may be thrown out completely and not used, or, in some embodiments, the corresponding segments are set to be "don't care", as illustrated in FIG. 23.

Voting Used in Searching

As noted earlier, in some implementations, for each given feature, its bounding box is determined by its minimum separation from any other feature on each dimension is used. However, for real-world feature vectors, the minimum separation often varies drastically among dimensions. It is less likely that an input instance or its residuals will end up in feature intervals on those dimensions where the minimum separation is small. Therefore these dimensions may be discounted in some embodiments.

In some embodiments, voting is a mechanism for implementing this discounting and can allow various strategies of combining multiple single-dimensional iCAM lookup results. For example, in an iCAM search, a feature which is identified by sufficiently many dimensions and by the highest number of them is considered to be the best-matched feature. Typically, voting is a (sub)routine stored in memory to be executed by a processor.

Figure 24:
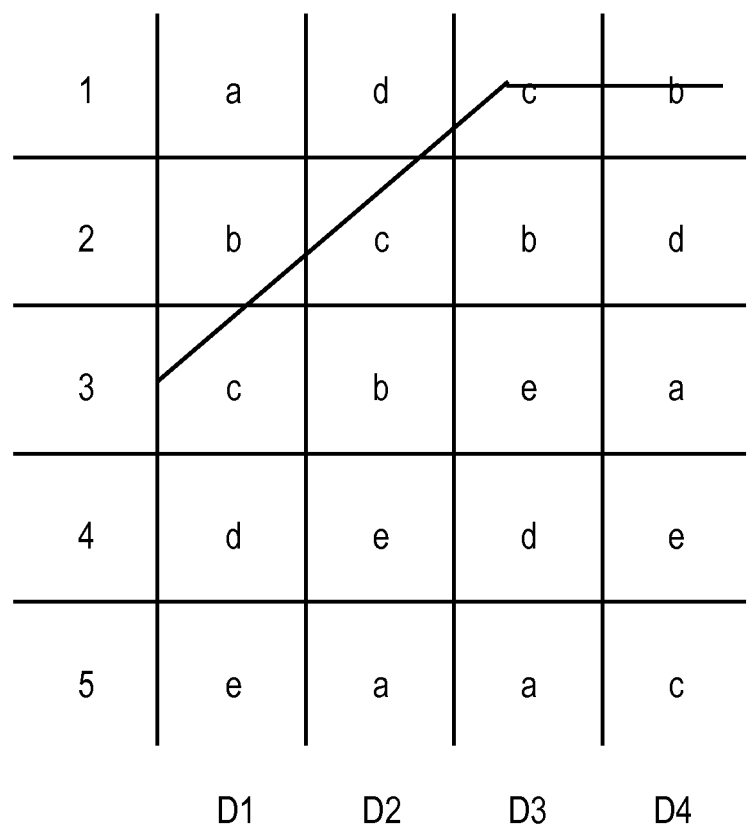
FIG. 24 illustrates an example of five 4-dimensional features used in voting.

In FIG. 24, five 4-dimensional features are shown to be used in voting. Consider an input instance $x=(3, 2, 1, 1)^T$, which is denoted by the solid black line in the figure. Note that for this input instance the c feature has three votes, with mean square error (MSE) equal to $$\frac{(5-1)^2}{4} = 4.$$

The b feature has only one vote; it nevertheless has a smaller MSE:

$$(1^2 + 1^2 + 1^2)/4 = \frac{3}{4}$$

approximately equal to 0.75.

This suggests that neighbor voting would be useful. That is, the voting will include as candidates some neighbors of the matched feature in each dimension. Suppose that candidates just include one immediate neighbor on each side (a "1-neighbor voting" scheme). For this example, one would compare votes for three features, b, c and d. They will have 4, 3 and 3 votes respectively. For b, in the first dimension it has c as a neighbor (1), in the second dimension it has c as a neighbor (2), in the third dimension it has c as a neighbor (3), and in the fourth dimension it has d as a neighbor (4). For c, in the first dimension it has b as a neighbor (1), in the second dimension it has d as a neighbor (2), in the third dimension it has b as a neighbor (3), and in the fourth dimension it has no neighbors (4). Based on these neighbor voting results, the b feature would be selected as the best-matched feature.

Figure 25:
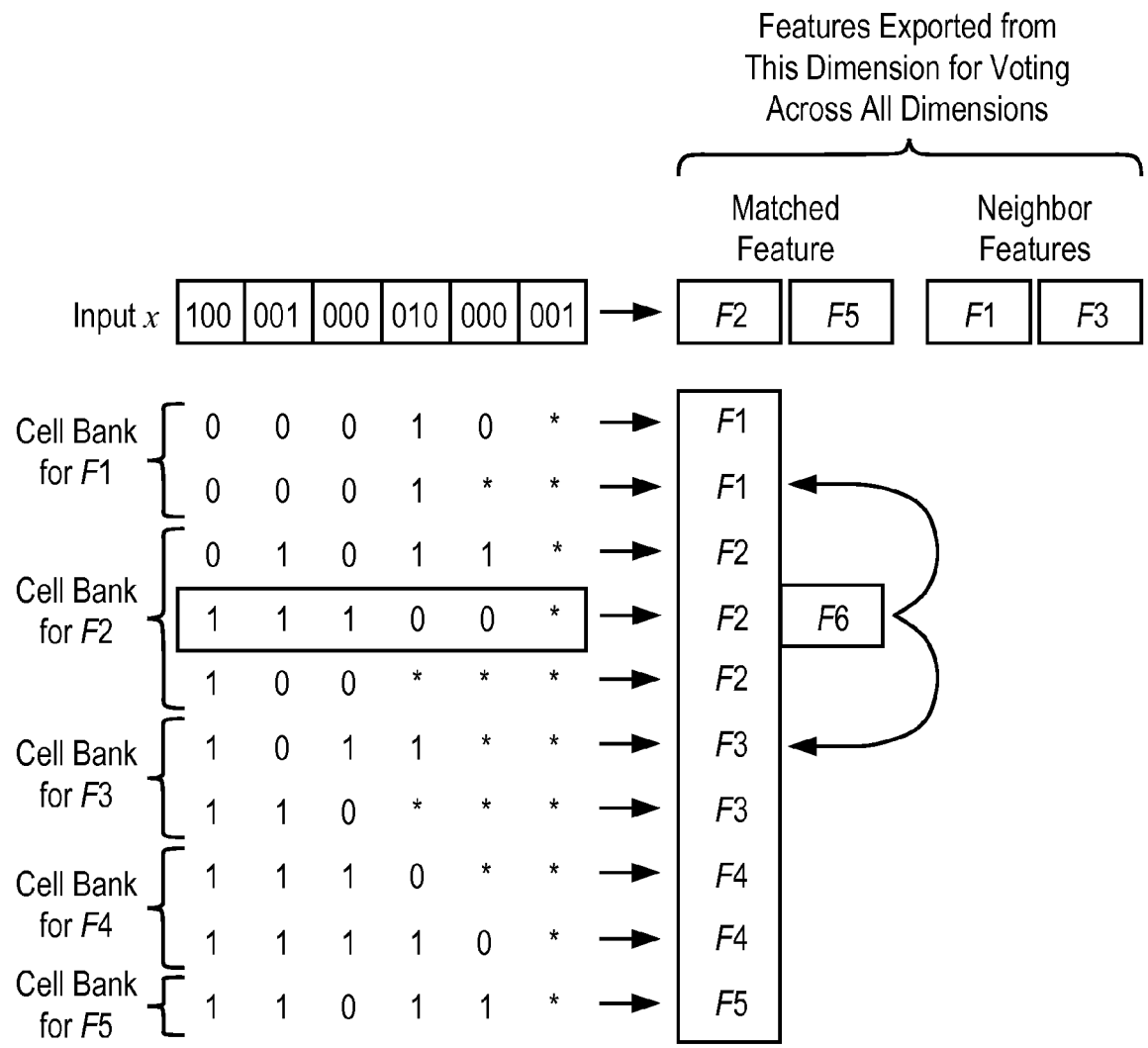
FIG. 25 illustrates an example of voting on a dimension.

As such, included in voting are both a matched feature and some neighbor features on each dimension. This is illustrated in FIG. 25 of iCAM neighbor voting on a dimension. In this example, for input instance x, the best match is found in cell bank for F2 (feature 2) and F6 (not shown). F2 has neighbors of F1 and F3 which are then used in voting.

Interval Sharing Reduction

As noted earlier, in some embodiments, floating-point feature vectors and input instances are converted to 1-bit integers for CAM-based or RAM-based iCAM implementations. In the conversion nearby floating-point numbers may be mapped to the same integer. This means that multiple features may share the same feature interval on a dimension. Thus, an input instance could be in the feature interval of multiple features. In the case, for a given input instance in the interval, an iCAM will output all these features on this dimension. A large bit size l to reduce the interval sharing is used in some embodiments.

Alternatively, in some embodiments, those feature intervals on a dimension which are shared by a large number of features are disabled. Thus, these features will not be exported from the current dimension for across-dimension voting. Excluding these features from voting is reasonable, given that they all share the same feature interval on this dimension so they are not discriminating in the first place.

Physical iCAM Structure Embodiments

Detailed below are embodiments of iCAM circuits for baseline voting and any voting. To provide a basis for comparison, consider the case of m=3 and l=6 in a TCAM. In this case, both iCAM and TCAM are ml=18 bits wide. FIG. 26(A) depicts the first two cells of a conventional TCAM. The search lines run vertically and broadcast the search input instance to all cells. Each matchline runs horizontally and its output indicates whether the search input instance matches the row's word. Matchlines are precharged high. Cells with a mismatch pull down the matchline.

The block diagram of FIG. 26(B) illustrates a simplistic embodiment of an iCAM circuit which estimates a number of matches across all its dimensions that an input may have on a feature (baseline voting). In this example, for input $$x = \begin{bmatrix} 000001 \\ 010111 \\ 110101 \end{bmatrix},$$

features $$\begin{bmatrix} 000001 \\ 010111 \\ 1011** \end{bmatrix} \text{ and } \begin{bmatrix} 00001* \\ 01011* \\ 110*** \end{bmatrix}$$

receive 1 and 2 votes, respectively. Note that an input may trigger multiple votes on a dimension when feature intervals overlap. In this exemplary iCAM each CAM cell is coupled to summation logic (such as an adder) to add up the number of matches to the cell. In some embodiments, this summation logic is internal to the iCAM. In other embodiments, a signal per cell and dimension is output indicating a match or not. These signals are then counted to determine which cell has the better match. Typically, each input value is logically ANDed with value of a cell in a dimension. If the result of the ANDing indicates that all of the bit positions match (or at least all that are not don't care values) then the value of the cell in the dimension is a match. Like the summation logic, the AND logic may be outside of the physical iCAM structure with signals being fed into this logic.

An iCAM cell bank may contain multiple entries for a feature as illustrated in FIG. 26(C). In some embodiments, this iCAM circuit is used for any voting. Note that input x matches the first entry in cell bank 1 on dimension 1 and the second entry on dimension 2. Thus the feature corresponding to cell bank 1 receives two votes for input x. As shown, the iCAM structure includes not only the summation logic detailed above, but includes OR and AND logic. For example, within each dimension, OR logic (such as an OR gate or multiple OR gates) is used to determine if the dimension has a "yes" vote (if any one entry is a yes, then the dimension will be a yes).

As was the case in the single value scenario, each input value is logically ANDed with each entry of a cell in a dimension. If the result of the ANDing indicates that all of the bit positions match (or at least all that are not don't care values) for an entry then there is a match in the dimension. Like the summation logic, the OR and/or AND logic may be outside of the physical iCAM structure with signals being fed into this logic. Equivalent logic may alternatively be used. Alternative logic (such as NAND, etc.) is used in alternative embodiments.

iRAM

Discussed below are embodiments of "iRAM" which is a RAM-based version of an iCAM implementation. This RAM may be external to the processor or internal (embedded DRAM, for example). Additionally, RAM is used generically and other memory technology may be utilized including, but not limited to, phase change memory (PCM), phase change memory and switch (PCMS), FLASH, hard disk, etc. Suppose that components of feature vectors have a relatively small dynamic range. In this case, on each dimension the bit string of an input instance is used as the memory address to retrieve the feature whose interval contains the value of the input instance. The lookup time is just one memory read time. When the dynamic range is small, a RAM of moderate size would suffice.

In FIG. 27, a contrast of the operation of iRAM for a given input on a dimension against that of a TCAM-based implementation is illustrated. Suppose that sample $x_i$ on dimension i has value 12, which in binary representation is 01100. Using a TCAM, the input 12 matches the 0110* entry and feature b is output. In contrast, with iRAM, bits of input 12 are used as an address to retrieve feature b from RAM.

Note that in supporting neighbor voting, iRAM may output additional neighbor features stored in the RAM as noted above. Then voting among all looked up features across dimensions may be performed to determine the best match.

iSearch

Figure 28:
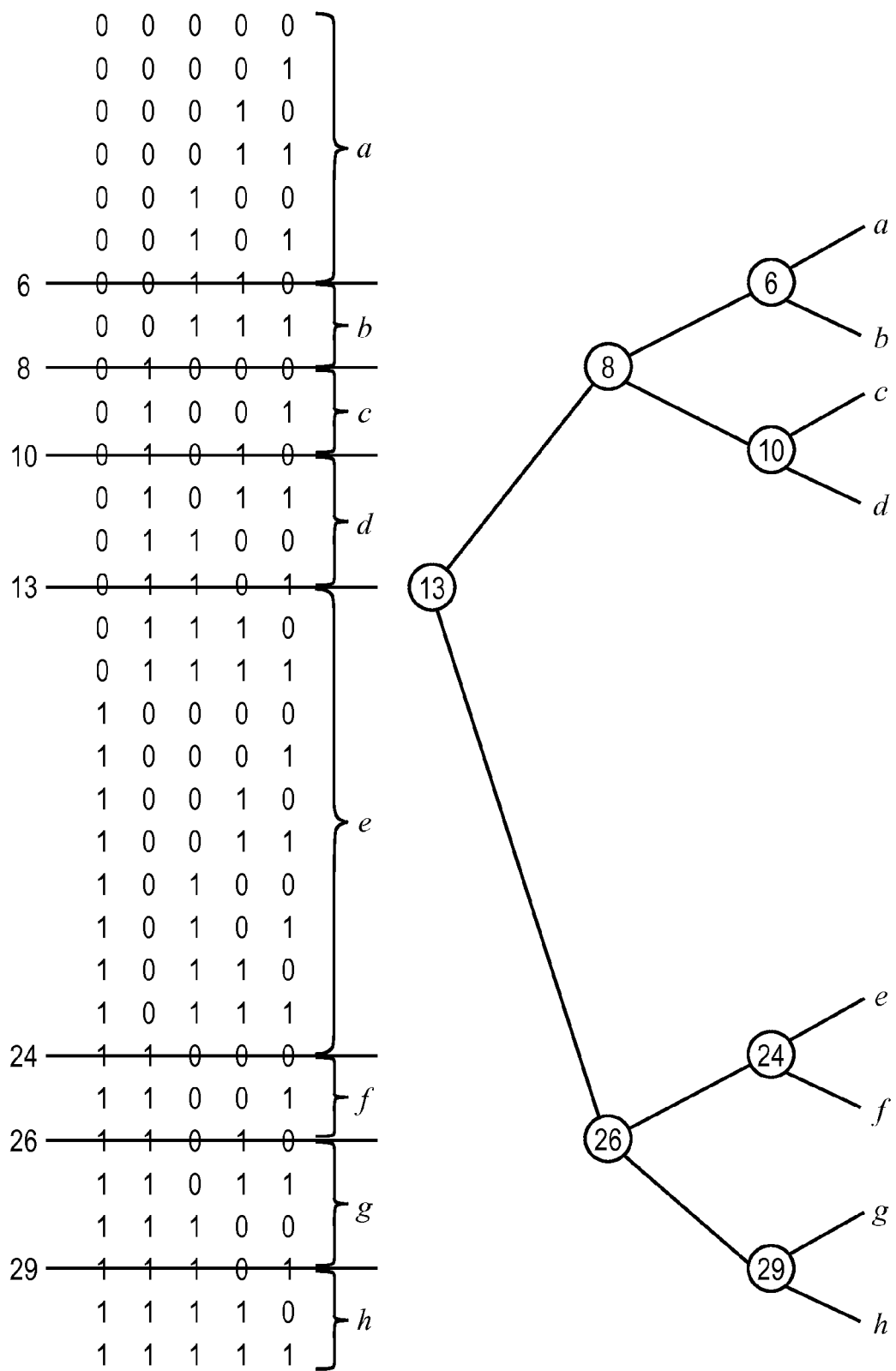
FIG. 28 illustrates F features, a, b, c, etc. with their feature intervals on a dimension.

Discussed herein is the use of a tree for searching. As illustrated in FIG. 28, suppose that there are F features, a, b, c, etc. with their feature intervals on a dimension as specified by horizontal lines. Based on endpoints of these feature intervals, a balanced binary search tree is constructed as shown. The tree is balanced in that any two subtrees of a tree node have an approximately equal number of leaves.

Using binary search on the tree, a feature interval to which an input belongs may be found in $O(\log_2 F)$ comparisons, in contrast to the $O(1)$ time of iRAM. For this search, tree nodes may perform floating-point comparisons and the tree size is only $O(F)$, independent of the dynamic range of components in feature vectors. The small memory requirement of this search can be attractive to some applications.

Figure 32:
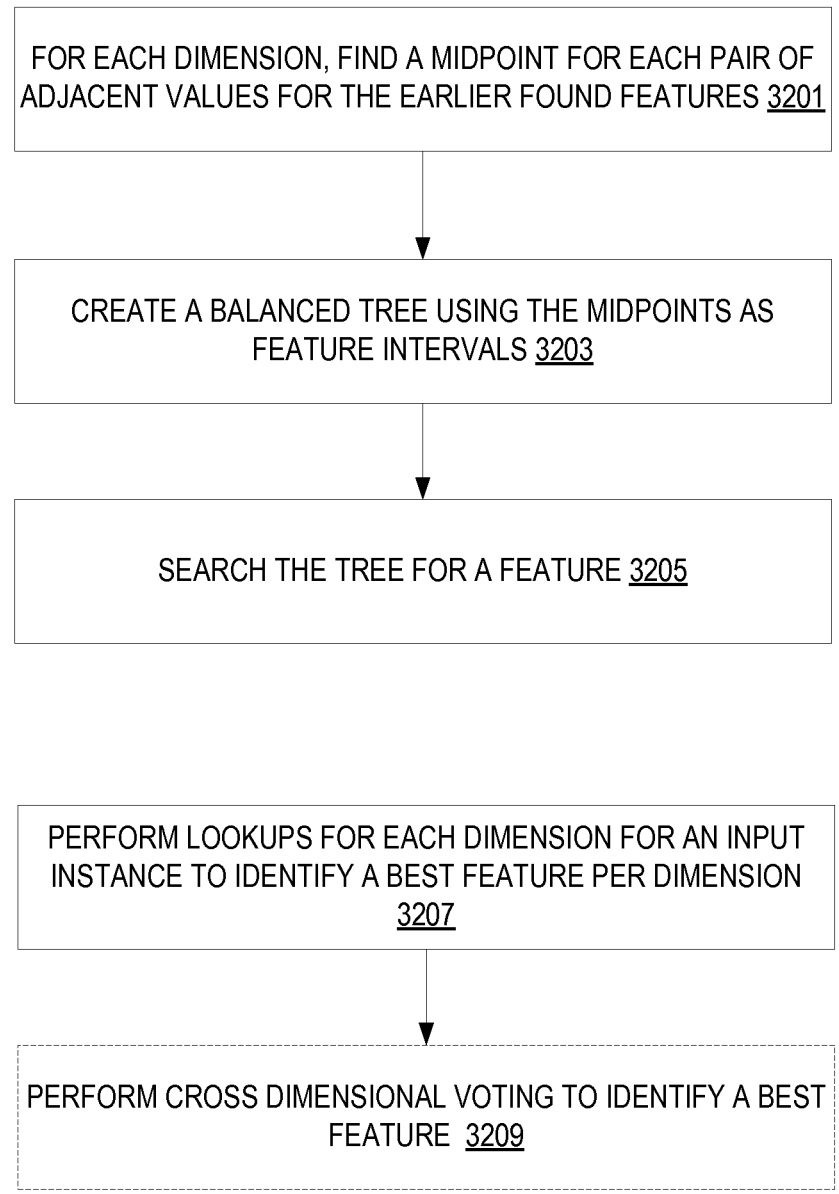
FIG. 32 illustrates an embodiment of a method for iSearch.

FIG. 32 illustrates an embodiment of a method for iSearch. First, a tree should be created. For each dimension, a midpoint for each pair of adjacent values for features is found at 3201. In the exemplary FIG. 28, the values for each feature are called out (3 for a, 7 for b, etc.) and the midpoints between these values and the adjacent value are shown with a horizontal line. For features a and b, the midpoint is 5. These horizontal lines define the feature intervals for each feature. So for feature b, its interval is [5,8].

Using the endpoints of these feature intervals (the midpoints of 3203), a balanced binary search tree is created at 3205. The tree is balanced in that two subtrees of any tree note have approximately an equal number of leaves. Of course, other tree types may be used.

Once the search tree is created, at some later point a feature interval to which an input belongs can be found by searching the tree. When the input value is equal to the value of a node, typically the next smaller branch is evaluateded. For example, if 13 was the input value then d would be the leaf the search finds. At 3207, for a given input instance, single-dimension iCAM lookups for all dimensions is performed. The iSearch routine and tree are stored in memory such as RAM and the routine is performed by a processing device.

In some embodiments, these lookups are then subjected to cross-dimension voting (with neighbor voting as detailed above) to identify the best matched feature at 3209.

Multiple iCAM Usage

Figure 30:
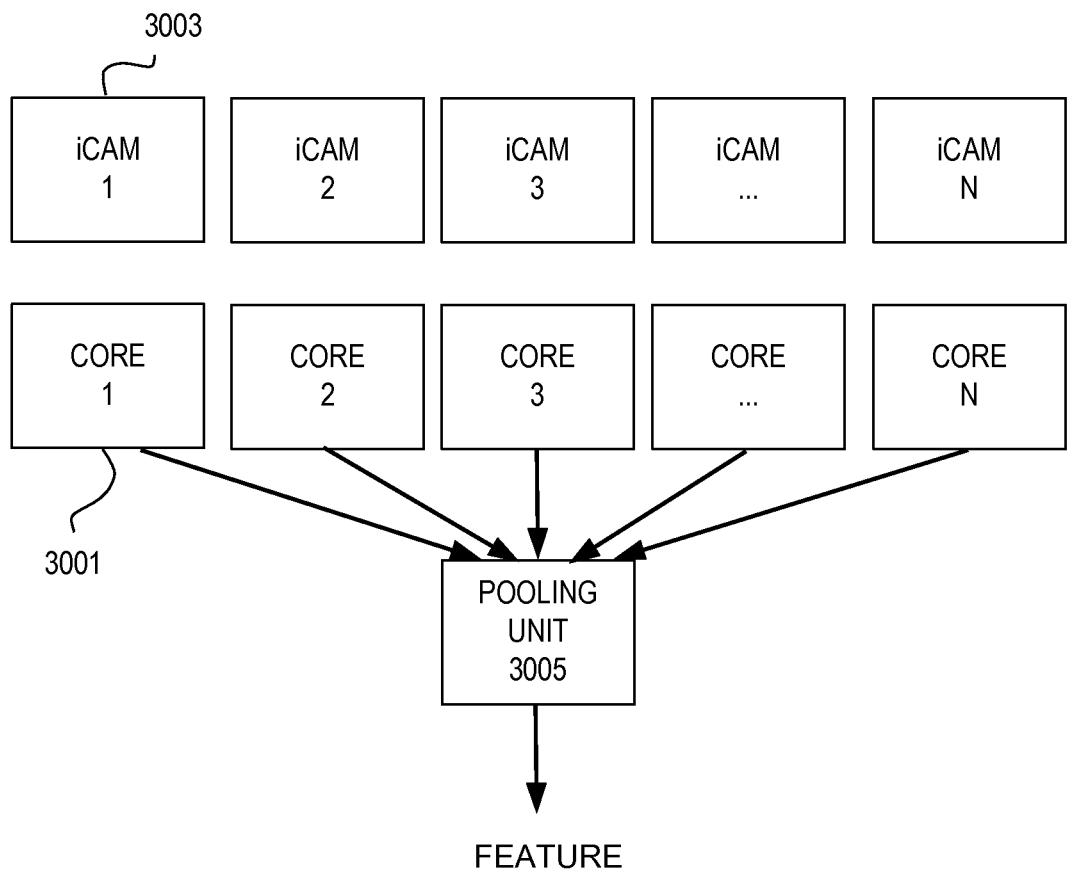
FIG. 30 illustrates an embodiment of an iCAM-based architecture using multiple iCAMs and multiple cores.

While the description above has primarily focused on single iCAM usage, the model is extendable to multiple iCAM. FIG. 30 illustrates an embodiment of an iCAM-based architecture using multiple iCAMs and multiple cores. This may be used for extracting a best-matched feature for an input instance. In this exemplary embodiment, each core 3001 has an associated iCAM 3003. These cores 3001 may be complex cores (such as SIMD, VLIW, etc.) or simpler cores (less complicated pipelines, etc.). Additionally, the cores do not need to be the same. For example, some cores may be simple ones and others complex so long as they each support iCAM 3003 access.

In this configuration, each iCAM 3003 may be responsible for a different part of a context and the entire context (or a portion thereof) may be searched in parallel for one or more features by command of the corresponding core.

Pooling unit 3005 forms a pooled sparse representation from the search results provided by the iCAMs 3003 and outputs a best matched feature or features. The pooling unit 3005 may be discrete logic, software that runs on one of the cores 3001, or software that runs on a core external to the ones shown (such as on a different machine).

Figure 31:
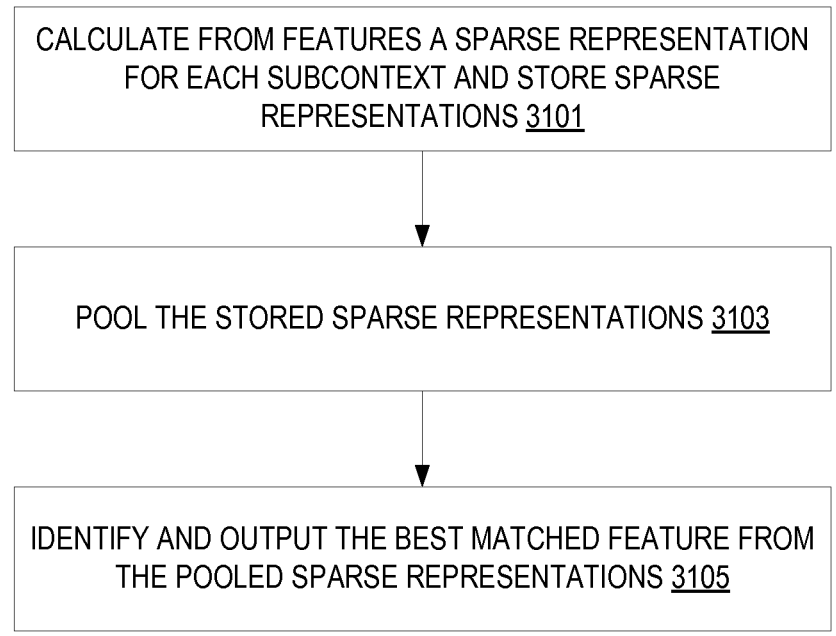
FIG. 31 illustrates an embodiment of a method for using multiple cores and associated iCAMs.

In particular, this architecture may be used in a scalable Map-Reduce scenarios. FIG. 31 illustrates an embodiment of a method for using multiple cores and associated iCAMs. This method assumes that each ICAM has a subcontext loaded. At 3101, a calculation from features of sparse representations for each subcontext is made and these sparse representations are stored in memory. This calculation is made by, for each core and iCAM, first loading a dictionary for a subcontext that the core and iCAM are responsible for into the iCAM, loading an input vector, and looking up the best matched feature and its neighboring features. Typically, this calculation is done in parallel, or substantially in parallel, using loaded iCAMs.

The stored sparse representations from all cores are pooled into a pooled sparse representation at 3103. This may be done using max pooling (for "multi-layer hierarchical inference"), additive pooling (for "voting"), etc.

At 3105, the feature corresponding to the largest component in the pooled sparse representation is output as the best match.

High-Level Overview

Figure 29:
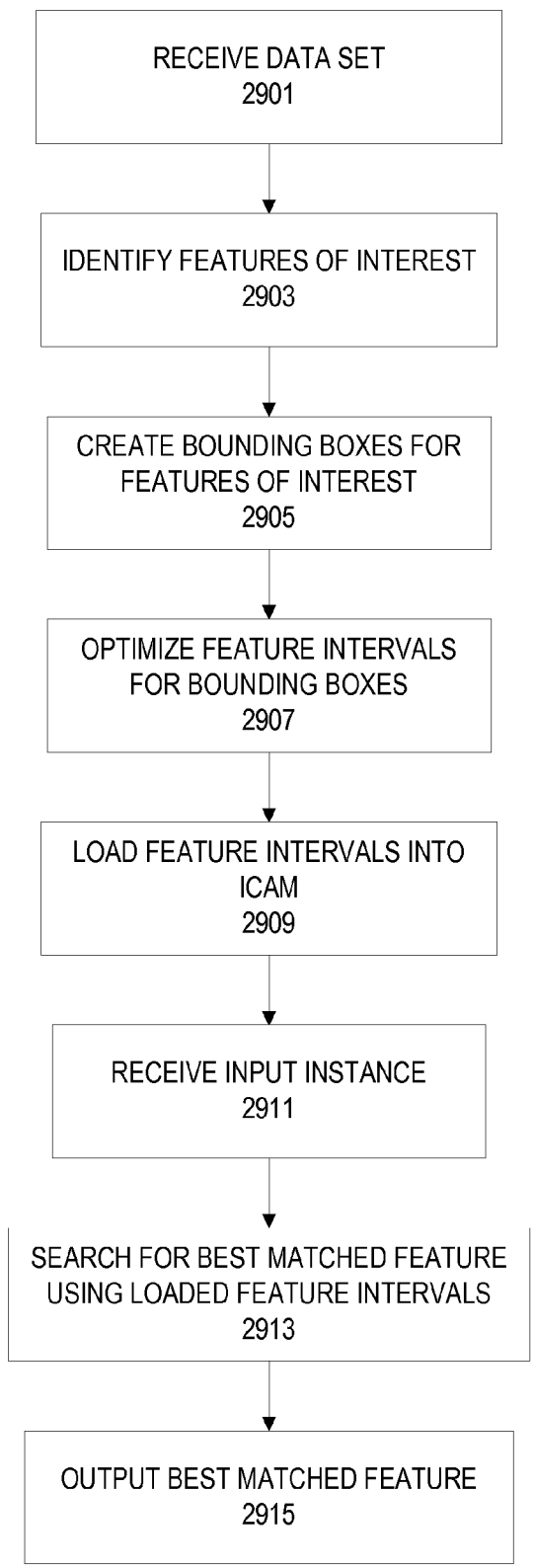
FIG. 29 illustrates an embodiment of a high-level method of using the iCAM principles detailed above.

FIG. 29 illustrates an embodiment of a high-level method of using the iCAM principles detailed above. A data set of input instances is received by a computing device at 2901. Exemplary data sets include, but are not limited to, one or more images, financial data, weather forecast information, etc. This computing device may be one that implements iCAM principles (uses feature interval searching) or it may be a device that is used to create/train a dictionary, etc. The data set may come from a sensor, etc. that is coupled to, or a part of, the computing device.

Features of interest are identified by the computing device at 2903. Typically, these features are found using software such as dictionary training. This computing device may or may not be the same one as used before.

Bounding boxes for features of interest are created at 2905. As detailed earlier, bounding boxes are essentially self-defining in that is a collection of feature intervals that encompass a feature, wherein a feature interval of the bounding box on a given dimension is determined by the minimum non-zero separation between the feature and any other feature in each of the dimensions to be processed. For example, a 2D bounding box for a feature may be defined by a minimum non-zero separation between that feature and four other features (two in each dimension).

An optimization of the feature intervals is made at 2907 in some embodiments. An exemplary optimization to shrink the number of iCAM entries has been detailed earlier including, but not limited, completion gain such as interval end rewrite, determining which samples are bad, increasing the bit size l, disabling feature intervals that are shared by a large number of features.

The feature intervals including associated memory locations or feature values are loaded as a dictionary into an iCAM at 2909. This iCAM may be found in the computing device that generated the dictionary, etc., or may be in a different computing device. In systems without a CAM-based iCAM, iRAM and/or iSearch may be utilized.

At some later point in time, an input instance is received by the computing device housing the iCAM at 2911. Examples of input instances have been detailed above.

A search for a best matched feature for the input instance using the loaded dictionary is made at 2913. This feature may be found using the CAM-based iCAM, iRAM, or iSearch. Additionally, this search may include multiple context searches, voting, etc.

The best matched feature is output at 2915. In some embodiments, this output is an address for the feature, and in others the output is the feature itself.

There are many potential applications to the above search schemes. By applying similar ideas or their generalization, other application opportunities beyond the few described here are possible.

One such application is image reconstruction in depth imaging. Conventional image depth estimation approaches for estimating depth maps involve dense sampling of depth values, where each sample requires a time-consuming block-matching computation. It is noted that since depth maps are generally sparse in nature, by using compressive sensing they can be reconstructed with a small number of samples resulting from a random subsampling process. Therefore one can subsample depth values and using the obtained samples to reconstruct a complete depth map. In contrast to conventional uniform subsampling which compromises fidelity, random subsampling technique can preserve fidelity with high probability, based on theory of compressive sensing.

With iCAM, reconstruction can be done quickly by using table lookup, without involving expensive optimization computations associated with sparse recovery. First, iCAM entries are configured based on a given dictionary related to the context of interest. Then for any given input instance of randomly subsampled depth values, the iCAM is used to lookup the best-matched dictionary atoms, followed by a least squares computation to obtain their coefficients. With this information, OMP or similar methods may be used to compute a sparse representation for the input instance to recover the complete depth map.

In many instances, OMP is an efficient approximation algorithm for computing sparse representations. However, there may be representations computed by OMP that are of inferior quality as they deliver suboptimal classification accuracy on several image datasets. This is caused by OMP's relatively weak stability under data variations, which leads to unreliability in supervised classifier training. For example, traditional OMP techniques may fail to find nearby representations for data with small variations.

Detailed herein is an OMP approach that uses a non-negativity constraint. This nonnegative variant of OMP (NOMP) may mitigate OMP's stability issue and is resistant to noise over-fitting. In some embodiments, a multi-layer deep architecture is used for representation learning, where K-means is used for feature (dictionary) learning and NOMP for representation encoding.

Looking back at FIG. 3, given a feature dictionary such as dictionary 301 of n atoms (column vectors) and an input data vector x such as input x 305, NOMP may be used to encode data representations by selecting a small number, k, of the atoms, such that their linear combination best approximates the data vector. The NOMP selection procedure only needs k successive iterations as detailed above, wherein, in each iteration, the atom that can maximally reduce the residual error is selected and unlike the previous discussion of OMP which utilized both positive and negative vectors, NOMP only uses positive vectors.

At a high-level, given a nonnegative dictionary $D \in R^{m \times n}$ and a nonnegative data vector x, NOMP may be used to find an approximate solution to the following non-negatively constrained problem:

$$\min_z \|X - DZ\|_2 \text{ subject to } \|z_k\|_0 \leq k, z_{ijk} \geq 0 \forall i$$

That is, a sparse nonnegative coefficients $z \in R^n$ that can approximately reconstruct the data x using the corresponding k dictionary atoms may be found, where k is a relatively small integer. NOMP iterates the following steps for up to k rounds:

1) Initialize the residual vector $r^{(0)} = x$ and round number I=1. Select the atom $d_{i_I}$ that has the highest positive correlation with the residual, $$i_I = \text{argmax} < d_i, r^{(I-1)} >$$

This is terminated when the largest correlation is less than or equal to zero.

2) Approximate the coefficients of the selected atoms by nonnegative least squares.

$$z^{(I)} = \text{argmin}_z \|\Sigma_{h=1}^I d_{i_h} z_{i_h}\|_2 \text{ such that } z_{i_h} \geq 0$$

3) Compute the new residual $r^{(I)} = x - Dz^{(I)}$. Increment I by 1.

The high-level iterative approach of NOMP uses two different mechanisms. First, the atom that has the highest positive correlation with the residual is selected in a NOMP routine, which is in contrast to OMP that considers both positive and negative correlations. Additionally, a NOMP routine may exit the iteration process early if there are no more atoms with positive correlations. Second, a NOMP routine computes the sparse representations using non-negative least squares instead of conventional unconstrained least squares. Solving non-negative least squares is considerably more expensive than solving its unconstrained variant. In some embodiments, an approximate solution is arrived at by solving for unconstrained least squares and truncating resulting negative coefficients to zero. Given the similarity between NOMP and OMP, efficient OMP implementations that are detailed above may be adapted to NOMP. Note that with a large dictionary and small k, the overall computation required is dominated by computing a single round of atom correlations $D^T x$.

Figure 33:
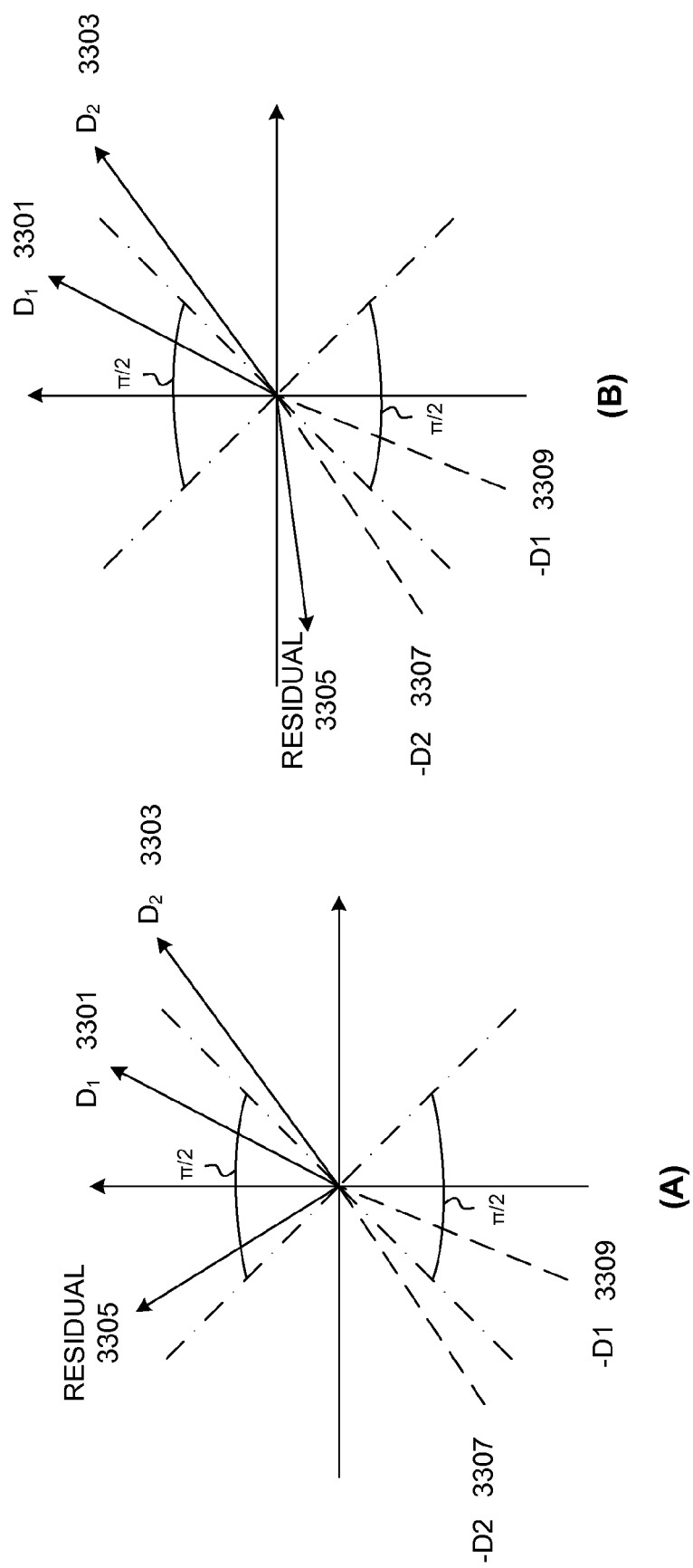
FIGS. 33(A)-(C) illustrate OMP and NOMP calculations.
Figure 33C:
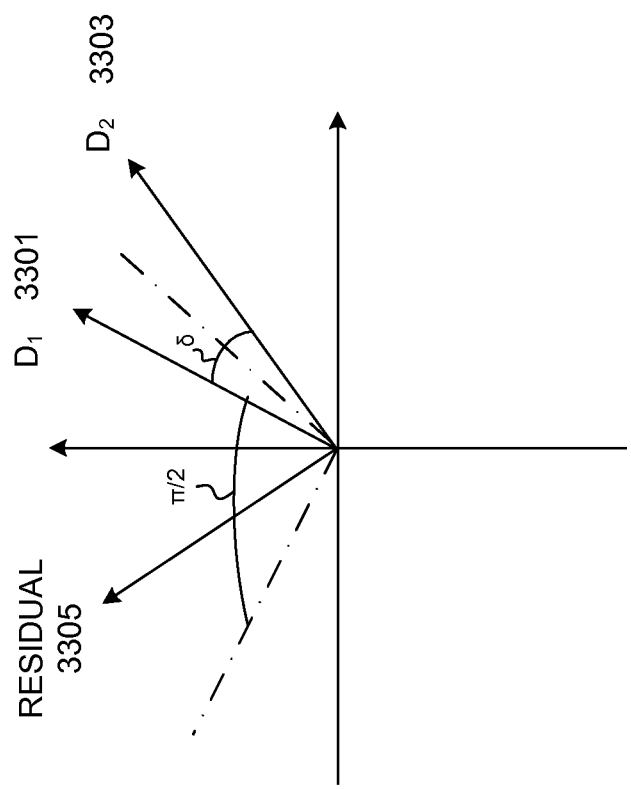

FIGS. 33(A)-(C) illustrate OMP and NOMP calculations. In the examples, there are two atoms ($d_1$ 33A01 and $d_2$ 33A03) in a given dictionary. In FIG. 33(A), given the residual vector 33A05, OMP would select $d_1$ 33A01 as the next atom because the projection of the residual vector onto $d_1$ 33A01 is larger than its projection onto both $d_2$ 33A03 and negative $d_2$ 33A09. Unfortunately, this selection procedure may allow the residual 3305 to be affected by small noise. If this deviation is small enough such that the deviated residual does not fall out of the boundary area delineated by dash-dot lines defining an angle $\pi/2$ in both the positive and negative space, the same atom $d_1$ 33A01 will still be selected by OMP. However, a slightly larger noise may cause OMP to select $-d_2$ 33A03 as the next atom when the residual does not fall within the boundary area as shown in FIG. 33(B), and subsequently the computed representation may differ by a large error due to a different support set.

In contrast, in FIG. 33(C), NOMP is able to tolerate a larger noise as illustrated. Here the boundary that the residual may fall in for $d_1$ 33A01 to be selected is much larger. In NOMP, only the projections of the residual onto positive $d_1$ 33A01 and $d_2$ 33A03 are considered giving a larger noise-tolerant area. The angle separating $d_1$ 33A01 and $d_2$ 33A03 is $\delta$ and the noise-tolerant area for NOMP to choose $d_1$ 33A01 spans an angle of $\pi/2 + \delta/2$ which is larger than OMP's $\pi/2$. NOMP's noise-tolerant region grows when the two dictionary atoms are further separated, while OMP's noise-tolerant region has a fixed size no matter how the angle between atoms is varied.

Figure 34:
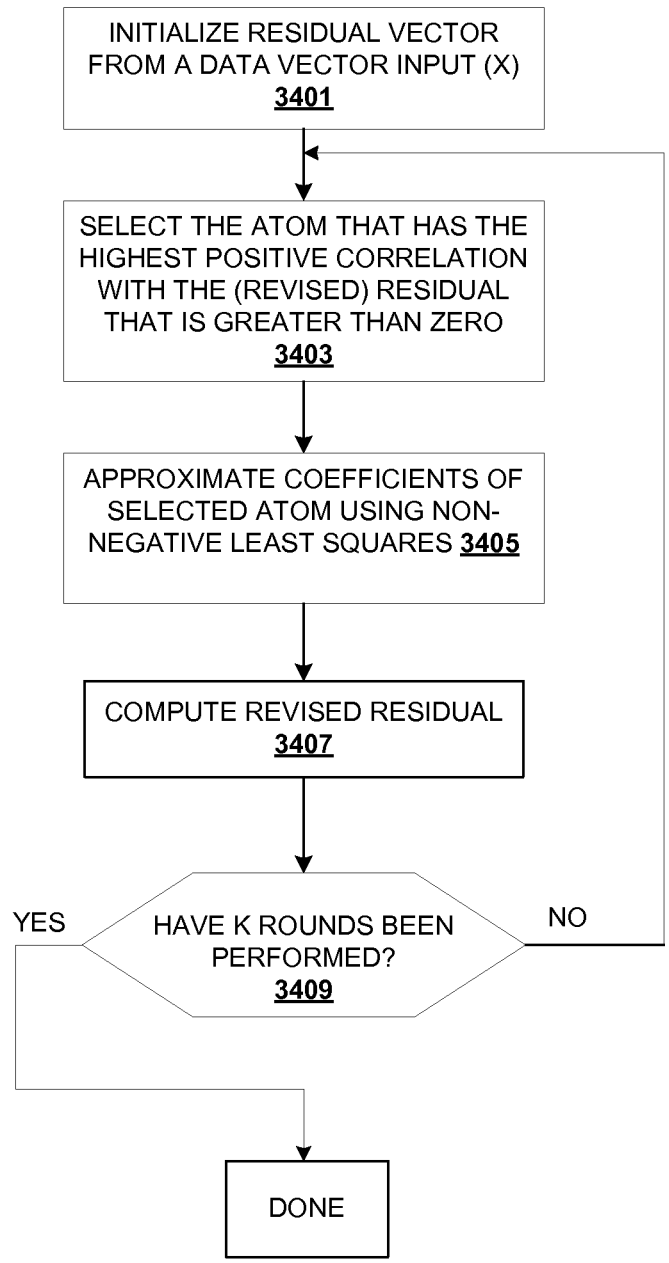
FIG. 34 illustrates an exemplary method of using NOMP to computer sparse representations according to an embodiment.

FIG. 34 illustrates an exemplary method of using NOMP to computer sparse representations according to an embodiment. Typically, a NOMP routine following this method is stored in a memory of a computing system to be executed by a processor of the computing system. As noted above, the goal is to find sparse nonnegative coefficients $z \in R^n$ that can approximately reconstruct input data x using a corresponding k number of dictionary atoms, where k is a relatively small integer.

At 3401, a residual vector is initialized from a data vector. For example, the residual vector may be the data elements of an input vector such as input x detailed above with respect to FIG. 3.

At 3403, an atom that has the highest positive correlation with the residual that is greater than zero is selected. In some embodiments, this is found by $i_I = \text{argmax} < d_i, r^{(I-1)} >$.

Looking at FIG. 33(C), this would be atom D1 3301 which is closest to the residual (or in the first iteration of NOMP to input x) in angular distance. If an iCAM is used, this step will be done at least partially via a table lookup such as a dictionary lookup to find a result that has the smallest dot product with x is the best-matched feature. In some embodiments, multiple features are looked up. If there is no atom greater than zero, then in some embodiments the NOMP routine halts.

At 3405, approximate coefficients of the selected atom are found using non-negative least squares. In some embodiments, these coefficients are found by $$z^{(I)} = \text{argmin}_z \|\Sigma_{h=1}^I d_{i_h} z_{i_h}\|_2 \text{ such that } z_{i_h} \geq 0$$

Typically, the values of all non-zero components (coefficients) identified thus far in current and previous iterations are found. This is typically done by assuming that all other components are zeros and then solving the resulting over-constrained system via least squares.

A revised residual is computed at 3407 by removing its orthogonal projection on the space spanned by all best-matched atoms found so far. That is, the residual is updated and in some embodiments is normalized.

A determination of if "k" rounds have been performed is made at 3409. If not, then a selection of a different atom that has the highest positive correlation with the revised residual that is greater than zero is selected. In FIG. 33(C), this atom would be D2. If yes, then NOMP has completed. The resultant matches are saved to memory such as disk, RAM, or iCAM.

Figure 35:
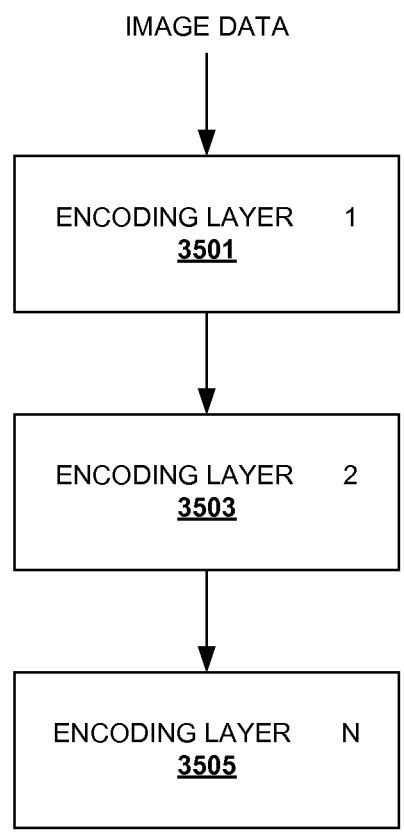
FIG. 35 illustrates an embodiment of an architecture for deep learning and/or image reconstruction using a plurality of encoding layers.

FIG. 35 illustrates an embodiment of an architecture for deep learning using a plurality of encoding layers. Each convolutional encoding layer is typically a software routine stored in memory that is executed by a hardware processor. However, in some embodiments, one or more of the encoding layers is an application specific integrated circuit (ASIC). The deep-learning algorithm and architecture detailed herein computes sparse intermediate representations for each layer (a small number of non-zero entries are involved). By working on only these non-zeros computation is greatly sped up. Not shown in the architecture are a processing element (such as a hardware processor core), memory to store a deep learning (such as a dictionary) or data (such as image reconstruction) processing algorithm to be executed by the processing element and/or results of any learning, or an iCAM to a dictionary.

In the illustration of FIG. 35, layer 1 3501, layer 2 3503, and layer N 3505 each compute sparse representations for given inputs with respect to a feature dictionary for the current layer. In other words, the input to the layer is compared against features in a dictionary for detecting their presence. In embodiments using iCAM, this comparison uses an iCAM lookup. The coefficients (matching scores) of the detected features are recorded in the sparse representation.

Figure 36:
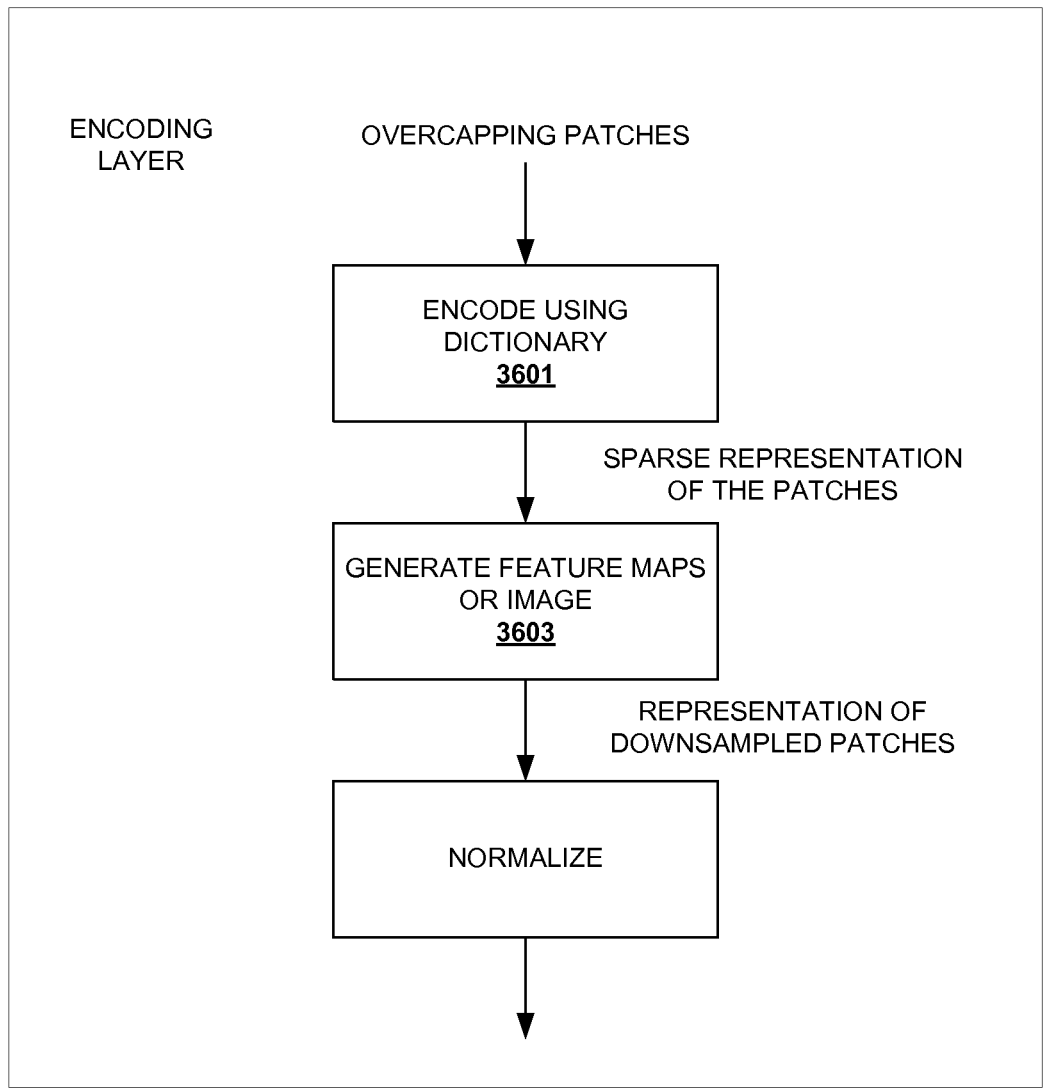
FIG. 36 illustrates an embodiment of an encoding layer.

FIG. 36 illustrates an embodiment of an encoding layer. Each encoding layer has three sub-layers: sparse representation pursuit 3601, pooling 3603, and normalization 3605. In the sparse representation pursuit sub-layer 3601 overlapping patches from the input feature maps are encoded using a feature dictionary to output a sparse representation of the patches. For example, the sparse representation pursuit sub-layer 3601 solves the constrained minimization problem detailed above to find the sparse representation of the input data using NOMP. In some embodiments, when NOMP is used for encoding, and both dictionaries and inputs are made non-negative. In some embodiments, a nonlinear mapping transforms the input data x into a nonnegative vector x that is double-sized. For example, a length-2 data vector [1, −1] is transformed to a length-4 vector [1, 0, 0, 1].

The computed representations are then pooled (max or average) over a small neighborhood to generate feature maps for further encoding in the next layer, or pooled over the whole image to form an image representation using pooling sub-layer 3603. The pooling sub-layer 3603 performs nonlinear downsampling to the reduce data size and capture features under small-scale translational variations. Typically, max pooling is sued in downsampling to preserve strong feature responses in local neighborhood.

The normalization sub-layer 3605 normalizes the length of the computed representation that is output from the pooling sub-layer 3603.

The underlying architecture illustrated in FIG. 35 may be used to learn feature dictionaries and/or reconstruct images. Dictionary learning is discussed first. The method to cause a processor to perform dictionary learning is stored in memory accessible by the processor. The dictionaries are learned through unsupervised learning in a layer-wise manner. In other words, the dictionary at layer 1 is learned using raw values of the training data set. For example, raw pixel values of a training image are used to train the dictionary used at in encoding layer 1 3501. Then the computed representations are passed from layer 1 and are used as training data to learn the layer-2 dictionary, etc.

For example, if X denotes an input data matrix where each column in X is a data vector and D is the feature dictionary the unsupervised learning algorithm solves the following optimization problem:

$$\min_{D,Z} \|X - DZ\|_2 \text{ subject to } \|z_k\|_0 \le s \text{ and } d_{ij}, z_{jk} \ge 0 \forall i,j,k$$

In some embodiments, this problem is solved by modifying the K-SVD algorithm such that non-negative constraints on entries are applied in both the dictionary (D) and the coefficient matrix (Z) as shown in the equation above. The constraint is particularly useful in learning high-layer dictionaries where the training data X is a set of sparse representations. Without the constraint, the algorithm may learn a dictionary that would incorrectly attempt to explain zeros or small values in training data or sparse representations resulted from accidental cancellation between positive and negative coefficients. In other words, the learning algorithm would attempt to explain the data using non-existing features.

This modification to K-SVD solves the optimization problem above, by alternating between solving D and Z. When D is fixed, Z is solved by using NOMP and when Z is fixed, D's columns are solved by performing at least one non-negative rank-1 factorization.

Figure 37:
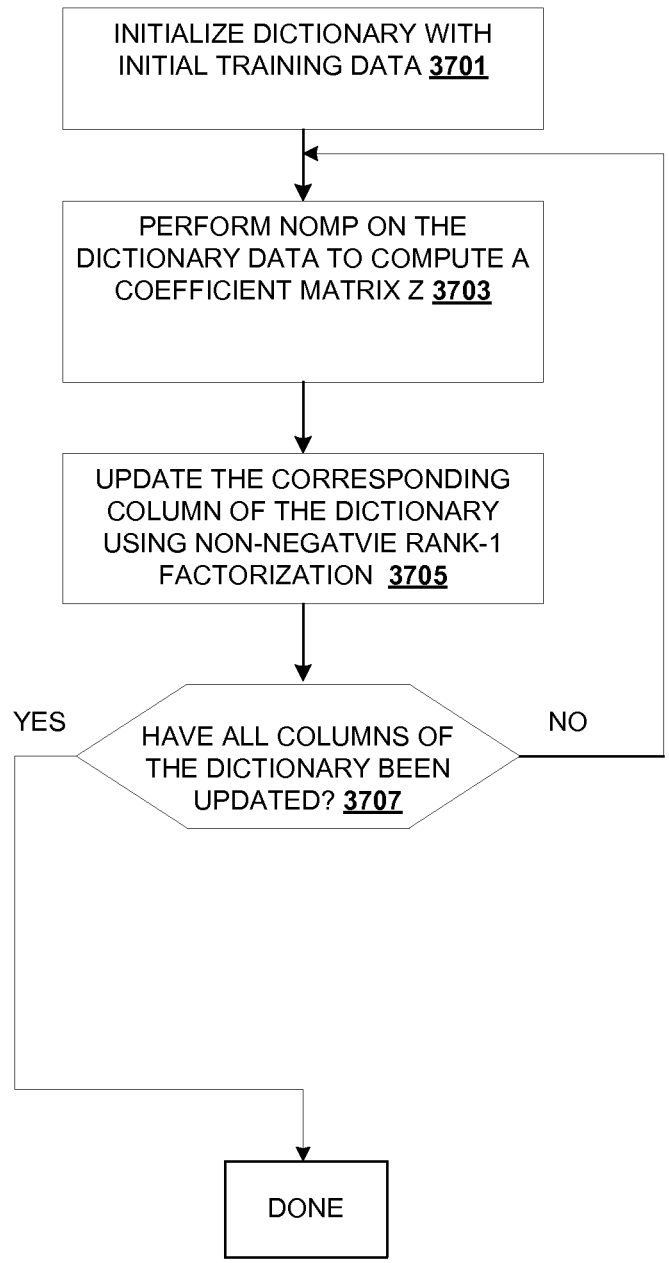
FIG. 37 illustrates an embodiment of a method for training dictionaries.

FIG. 37 illustrates an embodiment of a method for training dictionaries. Typically, this method is stored as a routine in memory to be executed by a processor, however, an ASIC may also be used. In some embodiments, trained dictionaries are stored in memory such as RAM or iCAM to be used as detailed above.

At 3701, a dictionary is initialized with a first training data set. For example, raw pixel values are used to initialize a dictionary.

A NOMP routine is performed on the dictionary to compute a coefficient matrix Z at 3703. This varies from traditional K-SVD which does not use NOMP (although OMP has been used in K-SVD).

A corresponding column of the dictionary is updated using non-negative rank-1 factorization at 3705. This too differs from K-SVD in that the rank-1 in K-SVD may use negative values.

The alternating NOMP and rank-1 calculations of 3703 and 3705 are performed until a determination is made that all columns of the dictionary have been updated at 3707.

Once the dictionaries are learned, an image may be passed through the architecture to compute a sparse representation. Similar to the dictionary learning algorithm, NOMP is used to compute the sparse representations in the sparse representation pursuit sub-layer. However, the sparsity for representations should to be set to a higher value. This is because setting a higher sparsity allows the coefficient vectors to better approximate input data vectors with a relatively large number of embedded features. Consequently, this means that a higher sparsity should to be set when generating training data for learning a higher-layer dictionary. In contrast, a lower sparsity needs to be used for dictionary learning in order to encourage the algorithm to discover meaningful structure in training data. Such sparsity control is critical to learn higher-layer dictionaries in the above architecture.

Figure 38:
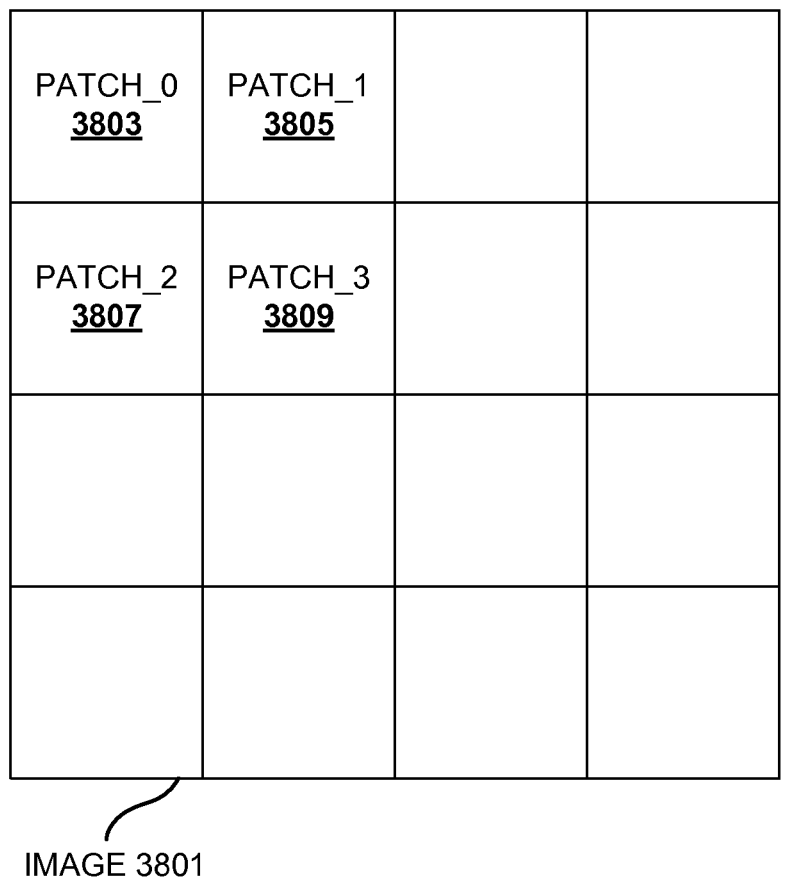
FIG. 38 illustrates an exemplary patch configuration for an image to be processed.

As shown above, multiple encoding layers are stacked hierarchically in the architecture. Higher encoding layers compute sparse representations corresponding to larger data (such as image) patches. Note that only the first layer takes image pixel values such as intensities and gradients as its input. Other layers use the sparse representations computed at the previous layer as the input. Therefore, the final representation for an image is a "deep" one—it is computed by sequentially passing the image through multiple encoding layers. This allows representations computed at a lower layer to be combined and refined at a higher layer. For example, layer 1 may compute representations for 10×10 image patches and layer 2 then combines the representations computed from layer 1 and computes new sparse representations corresponding to 20×20 patches as illustrated in FIG. 38.

Figure 39:
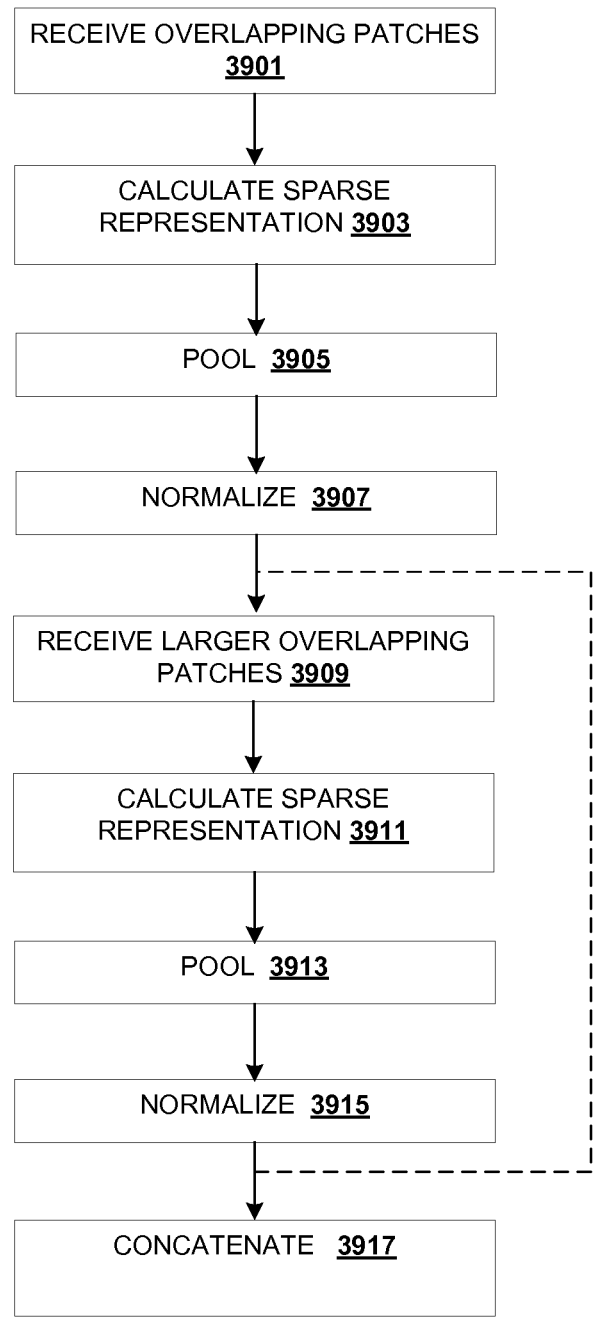
FIG. 39 illustrates a method for calculating a sparse representation of an image according to an embodiment.

FIG. 39 illustrates a method for calculating a sparse representation of an image according to an embodiment. This method is stored in memory to be executed by a processor. At 3901, overlapping patches are received a first encoding layer of a hierarchical stack. In some embodiments, standard preprocessing steps are applied on image data to generate data vectors for this first layer. These include mean subtraction, contrast normalization, and/or ZCA-whitening, followed by sign-splitting.

At 3903, a sparse representation for the patches is calculated using sparse representation pursuit such as applying NOMP. In some embodiments, the NOMP calculation uses a dictionary stored in an iCAM as detailed above.

This sparse representation is pooled at 3905 to create a downsampled patch of the representations.

At normalization is then performed at 3907. This feature vector normalization makes framework very simple as compared to other existing frameworks, which require some form of data whitening.

Another set of overlapping patches is input into the next layer at 3909 which combines the representations computed from the previous later and computes new spares representations corresponding to a larger patch at 3911. A pooling at 3913 and normalization at 3915 are performed and the above repeated until a desired amount of patches have been evaluated or until the layers have been exhausted.

Finally, the representations computed at the different layers are concatenated as a image feature vector for use in classification at 3917, for which a linear classifier (e.g., L2-SVM) is employed.

Figure 40:
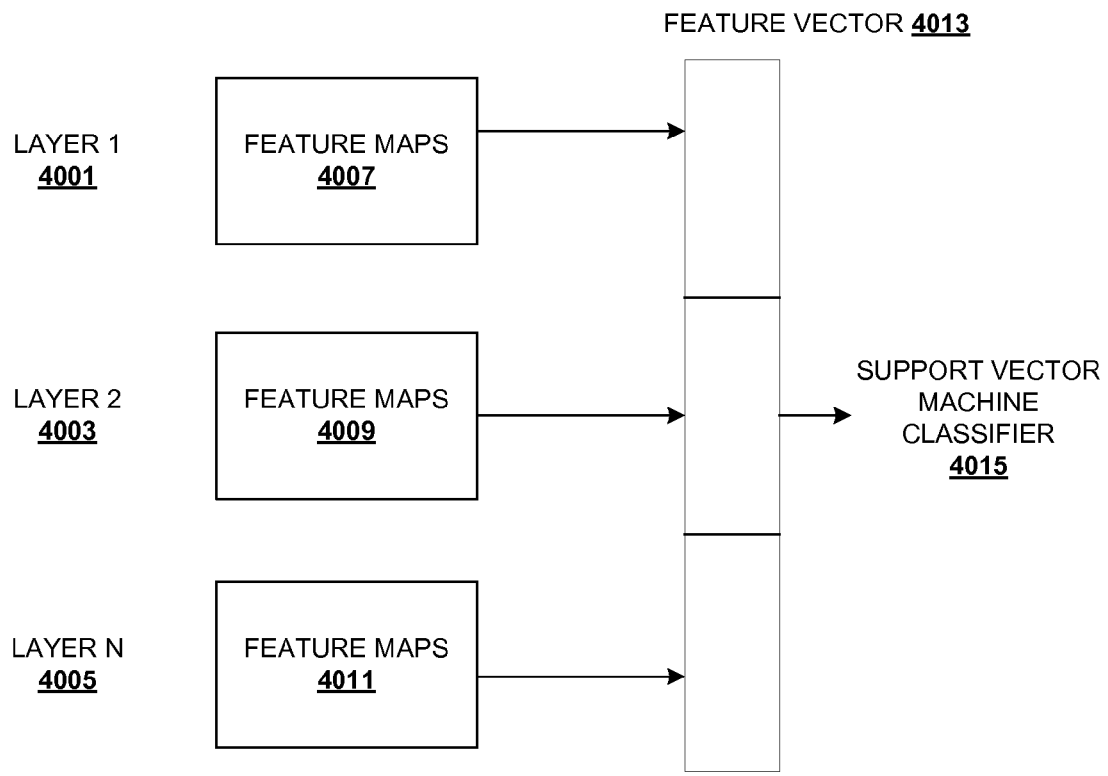
FIG. 40 illustrates an embodiment of an architecture of deep learning and/or image reconstruction according to an embodiment.

Graphically, this is illustrated in FIG. 40. Layers 1-N 3501-5 generate feature maps 3507-11 which are then concatenated into feature vector 3513. In some embodiments, at least the first layer feature map was found using NOMP. The concatenated vector 3513 is then fed to a support vector machine classifier 3515. The feature maps 3507-11 and vector 3513 may be stored in memory and the SVM 3515 may be either a hardware circuit or software to run on a processor to perform classification.

By the same principle as that used in reconstructing a depth image, iCAM lookup can be used to reconstruct RGB or RGB-D images for consumer cameras from a subset of randomly selected pixels.

In machine learning, an input instance (observation) is often classified based on its sparse representation with respect to a dictionary of features. To compute sparse representations one usually would use approximation methods such as NOMP, OMP or CoSaMP. As aforementioned, this amounts to finding best-matched features for the input instance and its residuals, which iCAM facilitates.

In recent years there has been a wave of new Internet of Things (IoT) devices in consumer markets. These include wearables such as wrist watch computers and ear phones for personal entertainment, work assistance and bio-metric monitoring. Enabled with energy-efficient computing cores and sensors, these devices can be programmed to perform a variety of personalized or context-specific tasks at extremely low power consumption. Assisted by iCAM, these IoT devices which are typically equipped with a variety of sensors such as accelerometers, gyroscopes and depth cameras, can map the nearby environment, or recognize events or objects rapidly and efficiently, and make predictions based on the current context.

By incorporating iCAM, computers which understand features may be made. These computers can extract features for input instances and self-learn dictionaries for the current context. As a result, they can automatically perform tasks such as characterizing workload for power management, performing speculative computation, identify items on a shelf, recognizing and classifying malware.

Exemplary iCAM Architectures

Discussed below are exemplary architectures that may utilize the above teachings.

FIGS. 41(A)-(C) illustrate exemplary embodiments of iCAM entries. In FIG. 41(A), an iCAM 4101 has, per feature interval, interval values 4103 per dimension and an address 4105 (or portion thereof) where a corresponding feature is stored in each entry. In some embodiments, each entry also includes one or more validity bits 4107 that indicate when the entry does not hold trustworthy data. The validity bits may also indicate when an entire cell does not hold trustworthy data.

In FIG. 41(B), an iCAM 4109 has, per feature interval, interval values 4111 per dimension and a value 4115 for the corresponding feature in each entry. In some embodiments, each entry also includes one or more validity bits 4115 that indicate when the entry does not hold trustworthy data. The validity bits 4115 may also indicate when an entire cell does not hold trustworthy data.

In FIG. 41(C), an iCAM 4125 has, per feature interval, interval values 4117 per dimension and an address 4119 (or portion thereof) where a corresponding feature is stored in a packed data element and an indication of which data element stores the feature 4121 in each entry. In some embodiments, each entry also includes one or more validity bits 4123 that indicate when the entry does not hold trustworthy data. The validity bits may also indicate when an entire cell does not hold trustworthy data.

While not illustrated, in some embodiments, an iCAM entry has a range of interval values for a particular feature. For example, instead of an interval value of 5 it would be 5-9.

Exemplary Processing Device and System Architectures

FIGS. 42(A)-(H) illustrate various embodiments of devices and systems that utilize iCAM. In all FIG. 42, aspects that are not particularly relevant to the use of iCAM are not included. For example, a display is not shown. However, typical features such as processor cores are present if not explicitly called out. Exemplary devices and systems include computers, processors, systems on a chip, etc. Additionally, components that are similarly numbered and their functions are not always called out for brevity.

Figure 42A:
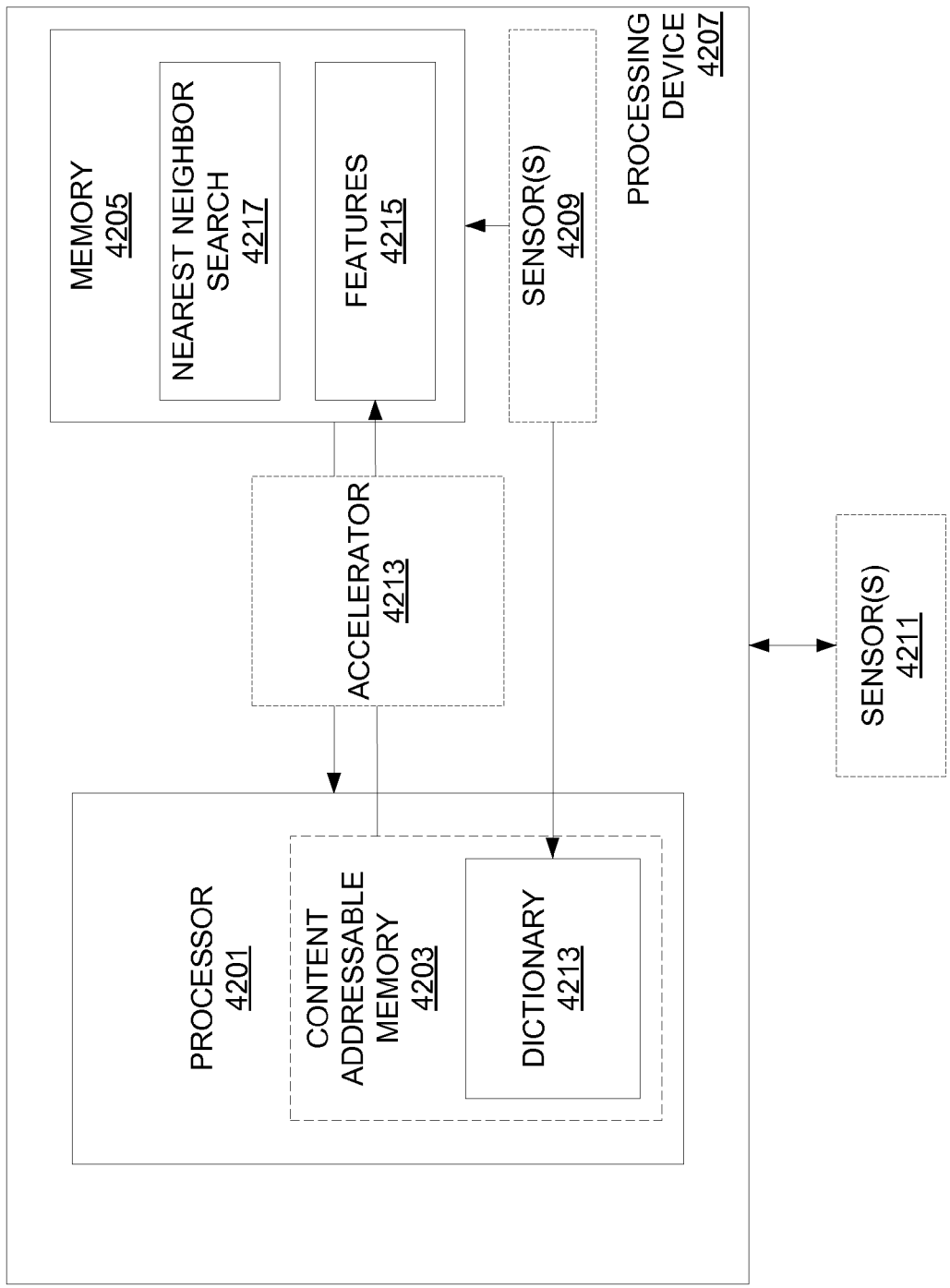

FIG. 42(A) illustrates an embodiment of processing device 4207 that uses iCAM principles. A hardware processor 4201 (such as a central processing unit, graphics processing unit, etc.) includes an iCAM 4203. This iCAM 4203 is used to store a feature dictionary 4213 as detailed above and includes entries as shown in FIG. 41(A).

A memory device 4205, such as RAM, stores features 4215 for at least one context. The memory device 4205 may also store a program for locating a particular feature such as any one of the methods detailed above, a program for training a dictionary, a program for reconstructing an image, etc. The RAM may also be used to store the dictionary 4213 if a iCAM 4203 is not available.

In some embodiments, a hardware accelerator 4213 is coupled to the processor and memory 4215 to act as an intermediary between the processor 4201 and the memory 4215. This accelerator 4213 may be used, for example, to access both the dictionary 4213 and features 4215.

Depending upon the implementation, processing device 4207 may include sensor(s) 4209 such as one or more cameras or these sensors may be external to the device such as shown in 4211. These sensors may communicate with the CAM 4203 to provide the dictionary or raw data stream of interest, or to the memory 4205, again, to provide the dictionary or a raw data stream of interest.

Figure 42B:
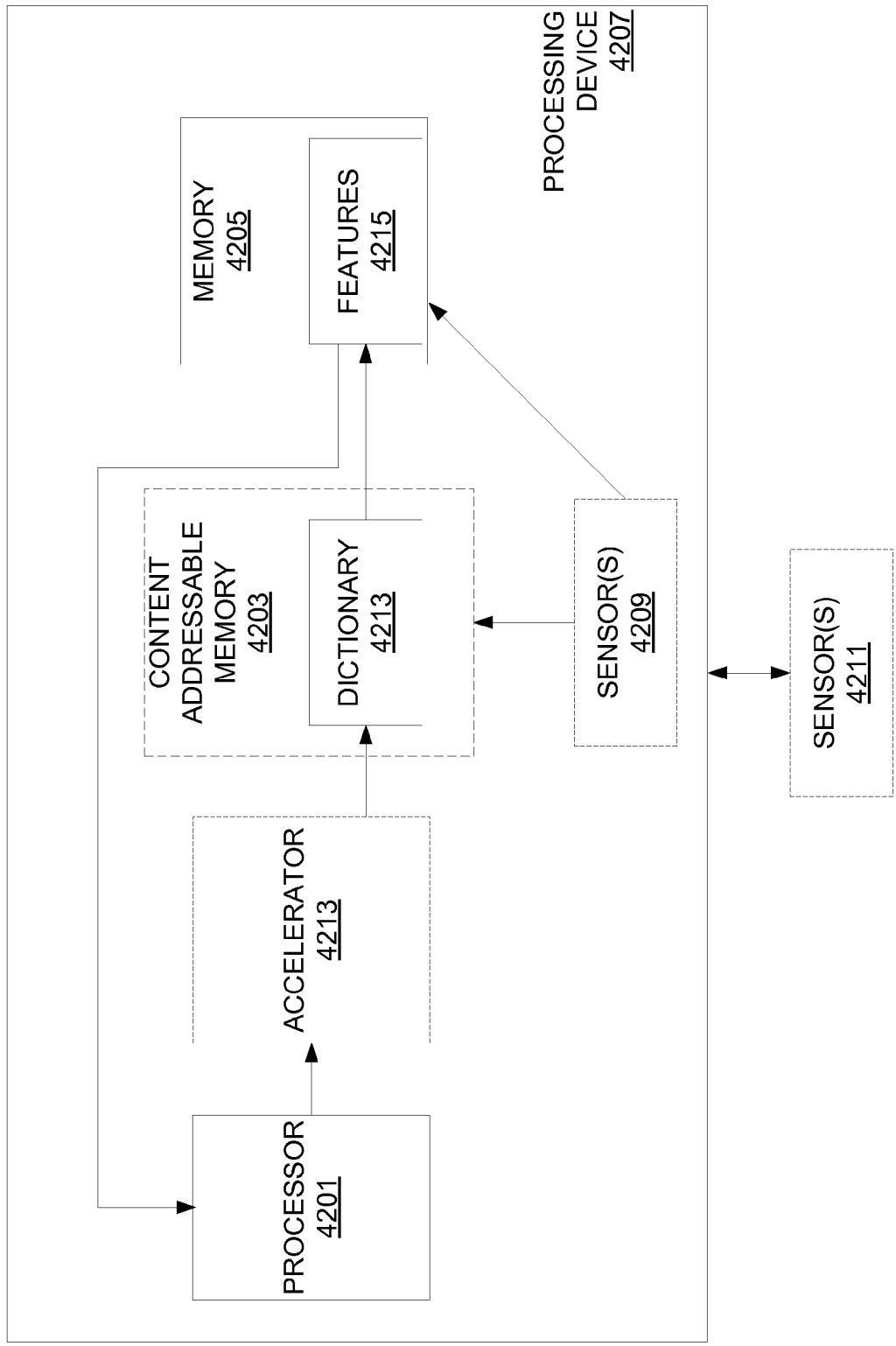

FIG. 42(B) illustrates another embodiment of processing device 4207 that uses iCAM principles. In this example, the iCAM 4203 is internal to the processor 4201 and the accelerator 4213 acts as an intermediary between the processor 4201 and the iCAM 4203. The accelerator 4213 may also be coupled to the memory 4205 although that connection is not shown.

Figure 42C:
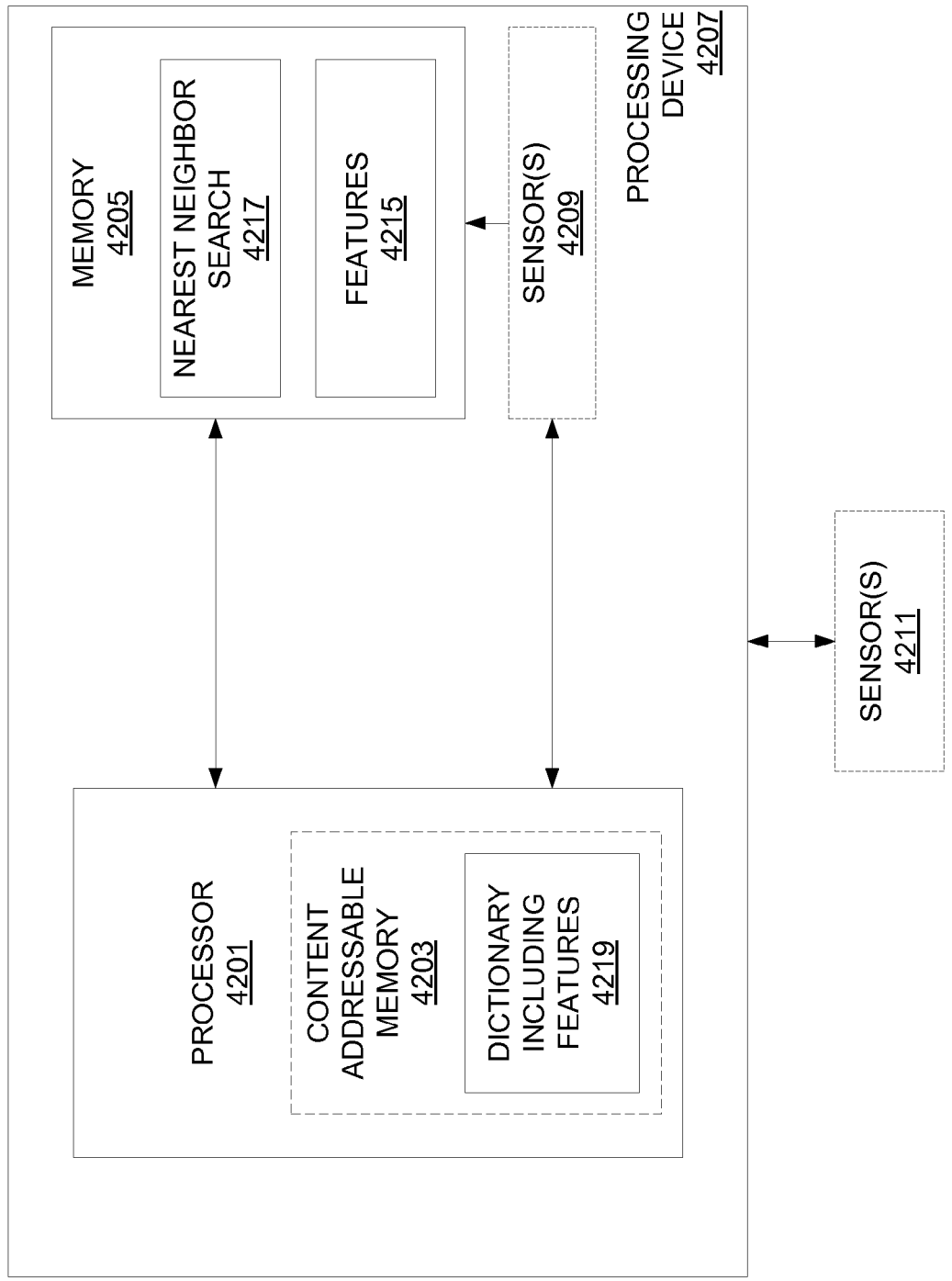

FIG. 42(C) illustrates another embodiment of processing device 4207 that uses iCAM principles. In this example, the iCAM 4203 is internal to the processor 4201 and includes a dictionary 4219 with entries as shown in FIG. 41(B) or (C).

FIG. 42(D) illustrates another embodiment of processing device 4207 that uses iCAM principles. In this example, the iCAM 4203 is external to the processor 4201 and includes a dictionary 4219 with entries as shown in FIG. 41(B) or (C).

FIG. 42(E) illustrates an embodiment of processor 4241 that uses iCAM principles. A core 4251 includes a iCAM 4203. This iCAM 4203 is used to store a feature dictionary 4213 as detailed above and includes entries as shown in FIG. 41(A). A memory device 4205, such as embedded RAM, stores features 4215 for at least one context. The memory device 4205 may also store a program for locating a particular feature such as any one of the methods detailed above. The embedded RAM may also be used to store the dictionary 4213 if a iCAM 4203 is not available.

In some embodiments, an accelerator 4213 is coupled to the processor and memory 4215 to act as an intermediary between the core 4251 and the memory 4215. This accelerator 4213 may be used, for example, to access both the dictionary 4213 and features 4215.

Figure 42F:
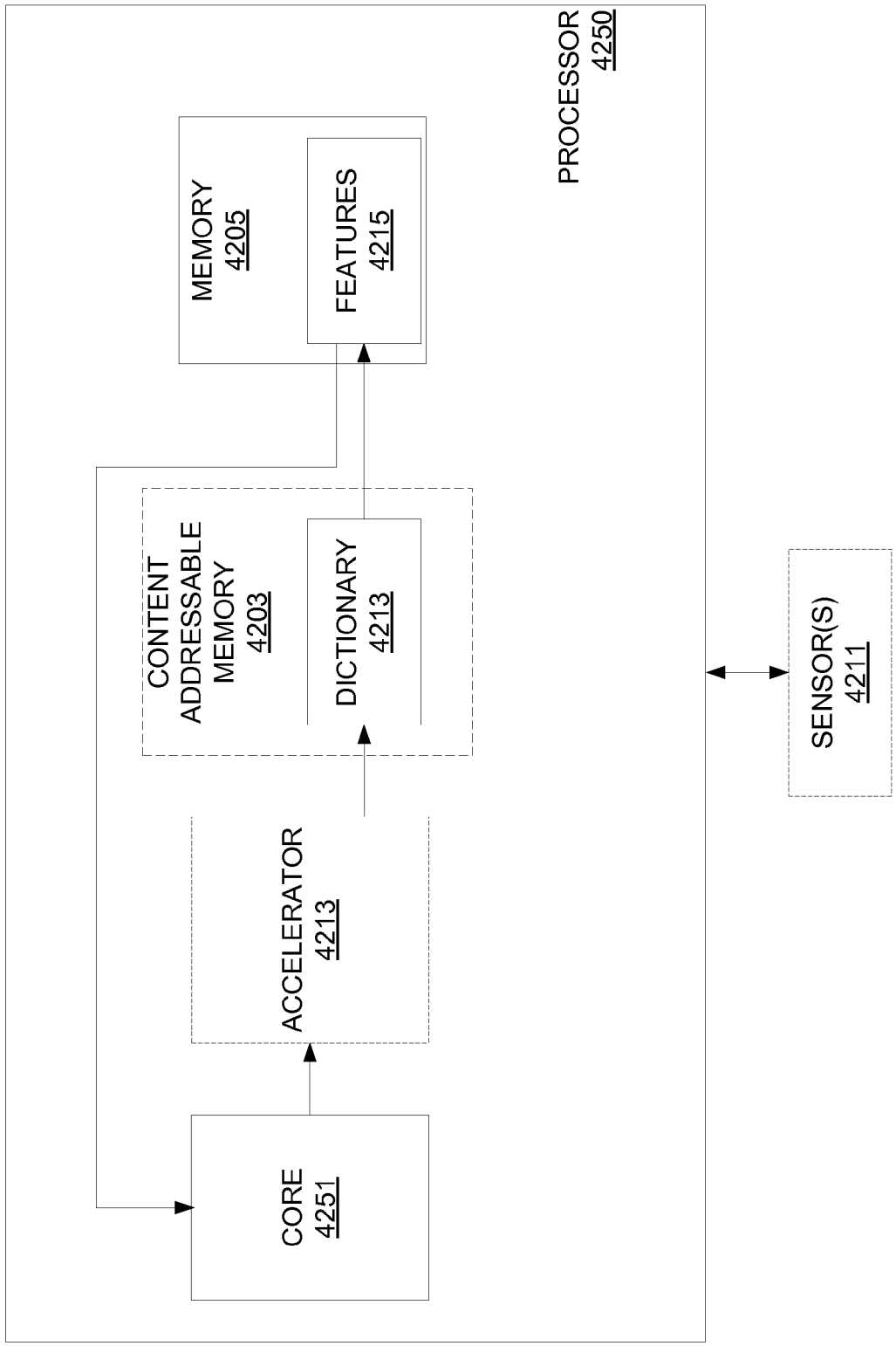

FIG. 42(F) illustrates another embodiment of a processor 4250 that uses iCAM principles. In this example, the iCAM 4203 is eternal to the core 4251 and the accelerator 4213 acts as an intermediary between the core 4251 and the iCAM 4203. The accelerator 4213 may also be coupled to the memory 4205 although that connection is not shown. Again, embedded RAM is used.

Figure 42G:
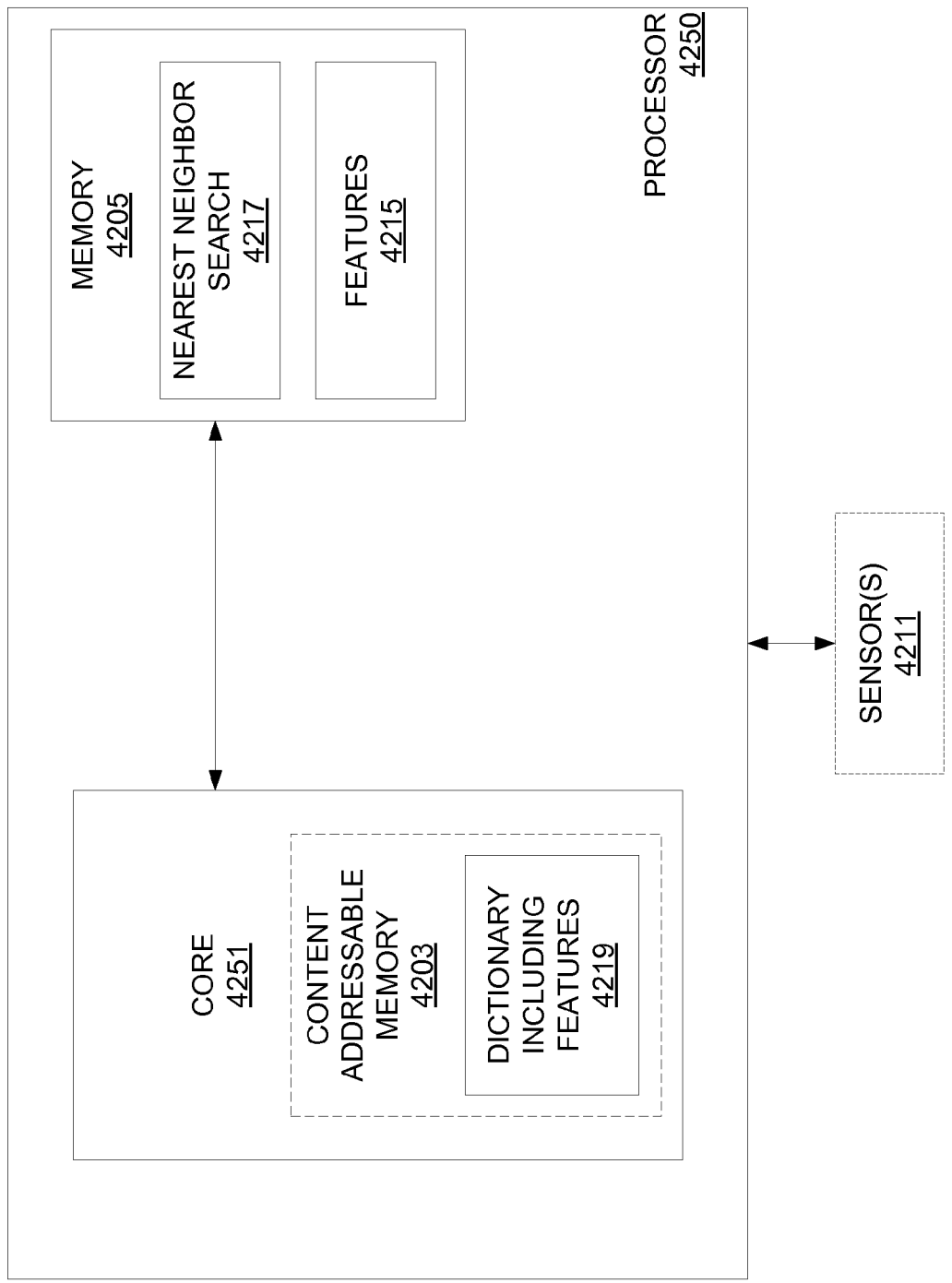

FIG. 42(G) illustrates another embodiment of a processor 4250 that uses iCAM principles. In this example, the iCAM 4203 is internal to the core 4251 and includes a dictionary 4219 with entries as shown in FIG. 41(B) or (C). Again, embedded RAM is used.

Figure 42H:
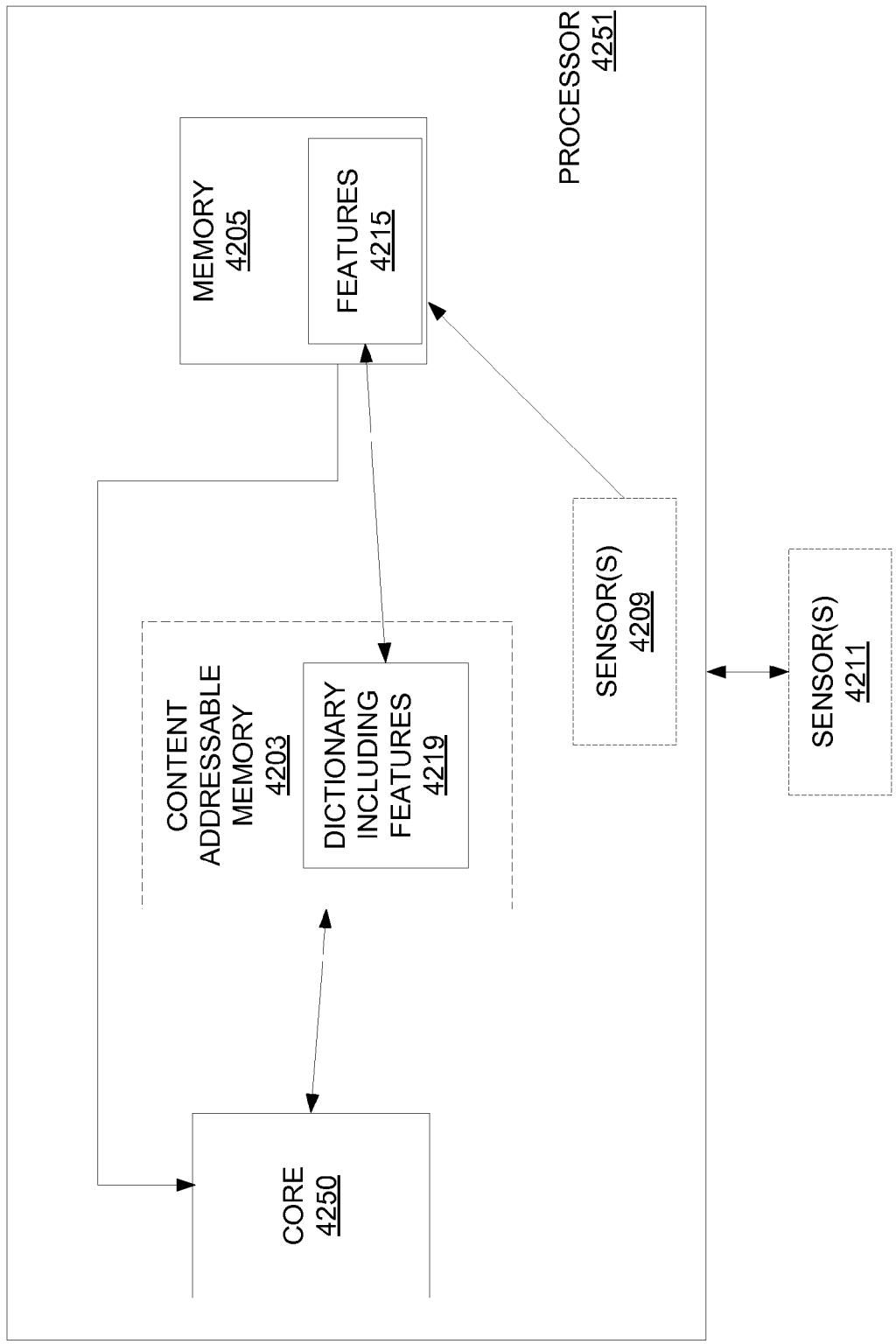

FIG. 42(H) illustrates another embodiment of a processor 4250 that uses iCAM principles. In this example, the iCAM 4203 is external to the core 4251 and includes a dictionary 4219 with entries as shown in FIG. 41(B) or (C). Again, embedded RAM is used.

Exemplary Register Architecture

Figure 43:
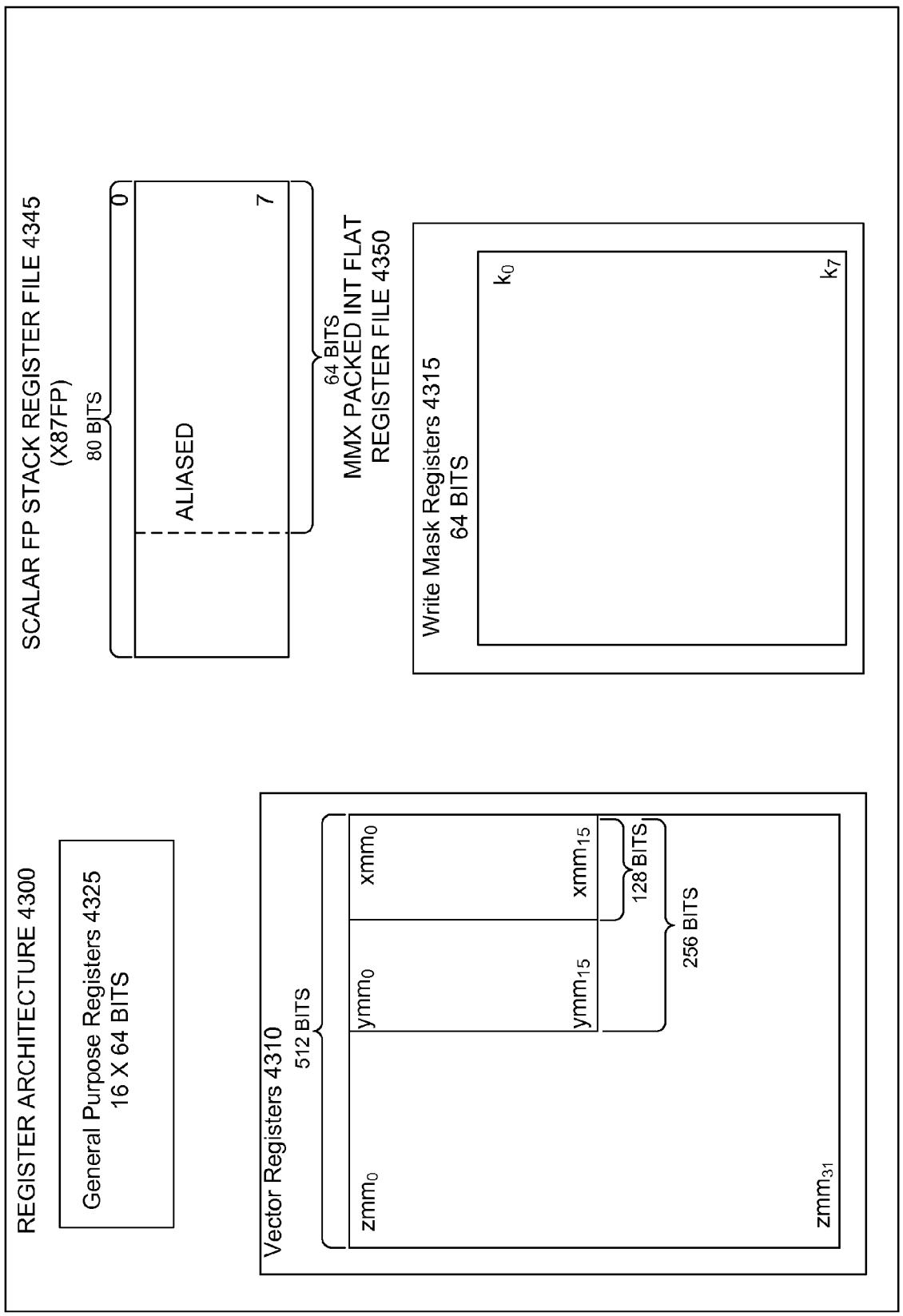
FIG. 43 is a block diagram of a register architecture according to one embodiment of the invention.

FIG. 43 is a block diagram of a register architecture 4300 according to one embodiment of the invention. In the embodiment illustrated, there are 32 vector registers 4310 that are 512 bits wide; these registers are referenced as zmm0 through zmm31. The lower order 256 bits of the lower 16 zmm registers are overlaid on registers ymm0-15. The lower order 128 bits of the lower 16 zmm registers (the lower order 128 bits of the ymm registers) are overlaid on registers xmm0-15

Write mask registers 4315—in the embodiment illustrated, there are 8 write mask registers (k0 through k7), each 64 bits in size. In an alternate embodiment, the write mask registers 4315 are 16 bits in size. As previously described, in one embodiment of the invention, the vector mask register k0 cannot be used as a write mask; when the encoding that would normally indicate k0 is used for a write mask, it selects a hardwired write mask of 0x45F, effectively disabling write masking for that instruction.

General-purpose registers 4325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 4345, on which is aliased the MMX packed integer flat register file 4350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-order and out-of-order core block diagram

FIG. 44A is a block diagram illustrating both an exemplary in-order pipeline and an exemplary register renaming, out-of-order issue/execution pipeline according to embodiments of the invention. FIG. 44B is a block diagram illustrating both an exemplary embodiment of an in-order architecture core and an exemplary register renaming, out-of-order issue/execution architecture core to be included in a processor according to embodiments of the invention. The solid lined boxes in FIGS. 44A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 44A, a processor pipeline 4400 includes a fetch stage 4402, a length decode stage 4404, a decode stage 4406, an allocation stage 4408, a renaming stage 4410, a scheduling (also known as a dispatch or issue) stage 4412, a register read/memory read stage 4414, an execute stage 4416, a write back/memory write stage 4418, an exception handling stage 4422, and a commit stage 4424.

FIG. 44B shows processor core 4490 including a front end unit 4430 coupled to an execution engine unit 4450, and both are coupled to a memory unit 4470. The core 4490 may be a reduced instruction set computing (RISC) core, a complex instruction set computing (CISC) core, a very long instruction word (VLIW) core, or a hybrid or alternative core type. As yet another option, the core 4490 may be a special-purpose core, such as, for example, a network or communication core, compression engine, coprocessor core, general purpose computing graphics processing unit (GPGPU) core, graphics core, or the like.

The front end unit 4430 includes a branch prediction unit 4432 coupled to an instruction cache unit 4434, which is coupled to an instruction translation lookaside buffer (TLB) 4444, which is coupled to an instruction fetch unit 4438, which is coupled to a decode unit 4440. The decode unit 4440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 4440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 4490 includes a microcode ROM or other medium that stores microcode for certain macroinstructions (e.g., in decode unit 4440 or otherwise within the front end unit 4430). The decode unit 4440 is coupled to a rename/allocator unit 4452 in the execution engine unit 4450.

The execution engine unit 4450 includes the rename/allocator unit 4452 coupled to a retirement unit 4454 and a set of one or more scheduler unit(s) 4456. The scheduler unit(s) 4456 represents any number of different schedulers, including reservations stations, central instruction window, etc. The scheduler unit(s) 4456 is coupled to the physical register file(s) unit(s) 4458. Each of the physical register file(s) units 4458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 4458 comprises a vector registers unit, a write mask registers unit, and a scalar registers unit. These register units may provide architectural vector registers, vector mask registers, and general purpose registers. The physical register file(s) unit(s) 4458 is overlapped by the retirement unit 4454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 4454 and the physical register file(s) unit(s) 4458 are coupled to the execution cluster(s) 4460. The execution cluster(s) 4460 includes a set of one or more execution units 4462 and a set of one or more memory access units 4464. The execution units 4462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 4456, physical register file(s) unit(s) 4458, and execution cluster(s) 4460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 4464). It should also be understood that where separate pipelines are used, one or more of these pipelines may be out-of-order issue/execution and the rest in-order.

The set of memory access units 4464 is coupled to the memory unit 4470, which includes a data TLB unit 4472 coupled to a data cache unit 4474 coupled to a level 2 (L2) cache unit 4476. In one exemplary embodiment, the memory access units 4464 may include a load unit, a store address unit, and a store data unit, each of which is coupled to the data TLB unit 4472 in the memory unit 4470. The instruction cache unit 4434 is further coupled to a level 2 (L2) cache unit 4476 in the memory unit 4470. The L2 cache unit 4476 is coupled to one or more other levels of cache and eventually to a main memory.

By way of example, the exemplary register renaming, out-of-order issue/execution core architecture may implement the pipeline 4400 as follows: 1) the instruction fetch 4438 performs the fetch and length decoding stages 4402 and 4404; 2) the decode unit 4440 performs the decode stage 4406; 3) the rename/allocator unit 4452 performs the allocation stage 4408 and renaming stage 4410; 4) the scheduler unit(s) 4456 performs the schedule stage 4412; 5) the physical register file(s) unit(s) 4458 and the memory unit 4470 perform the register read/memory read stage 4414; the execution cluster 4460 perform the execute stage 4416; 6) the memory unit 4470 and the physical register file(s) unit(s) 4458 perform the write back/memory write stage 4418; 7) various units may be involved in the exception handling stage 4422; and 8) the retirement unit 4454 and the physical register file(s) unit(s) 4458 perform the commit stage 4424.

The core 4490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 4490 includes logic to support a packed data instruction set extension (e.g., AVX1, AVX2, and/or some form of the generic vector friendly instruction format (U=0 and/or U=1) previously described), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 4434/4474 and a shared L2 cache unit 4476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 45B:
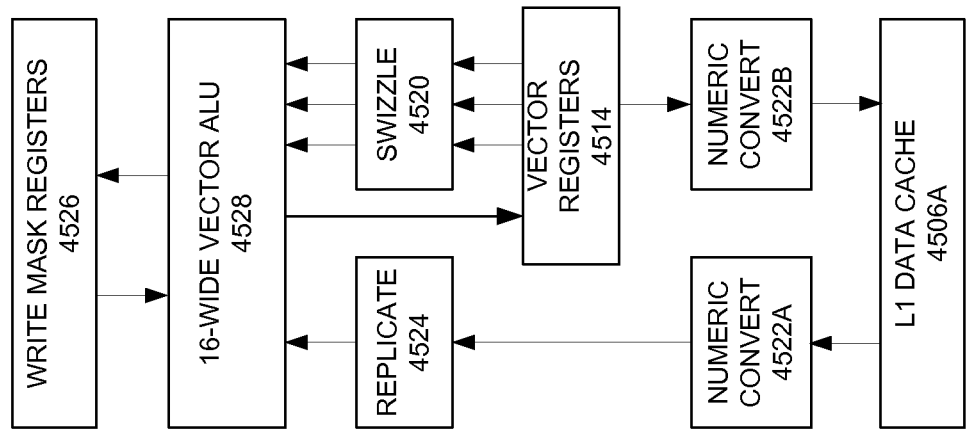
FIGS. 45A-B illustrate a block diagram of a more specific exemplary in-order core architecture, which core would be one of several logic blocks (including other cores of the same type and/or different types) in a chip.
Figure 45A:
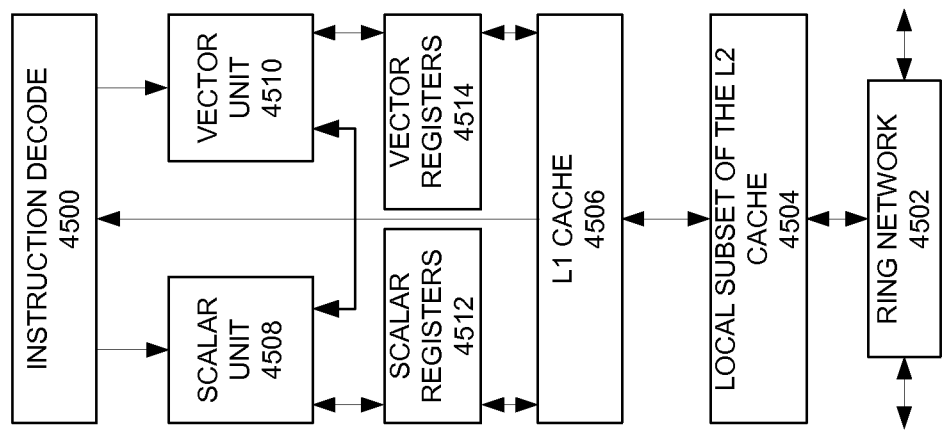

FIGS. 45A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 45A is a block diagram of a single processor core, along with its connection to the on-die interconnect network 4502 and with its local subset of the Level 2 (L2) cache 4504, according to embodiments of the invention. In one embodiment, an instruction decoder 4500 supports the x86 instruction set with a packed data instruction set extension. An L1 cache 4506 allows low-latency accesses to cache memory into the scalar and vector units. While in one embodiment (to simplify the design), a scalar unit 4508 and a vector unit 4510 use separate register sets (respectively, scalar registers 4512 and vector registers 4514) and data transferred between them is written to memory and then read back in from a level 1 (L1) cache 4506, alternative embodiments of the invention may use a different approach (e.g., use a single register set or include a communication path that allow data to be transferred between the two register files without being written and read back).

The local subset of the L2 cache 4504 is part of a global L2 cache that is divided into separate local subsets, one per processor core. Each processor core has a direct access path to its own local subset of the L2 cache 4504. Data read by a processor core is stored in its L2 cache subset 4504 and can be accessed quickly, in parallel with other processor cores accessing their own local L2 cache subsets. Data written by a processor core is stored in its own L2 cache subset 4504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 45B is an expanded view of part of the processor core in FIG. 45A according to embodiments of the invention. FIG. 45B includes an L1 data cache 4506A part of the L1 cache 4504, as well as more detail regarding the vector unit 4510 and the vector registers 4514. Specifically, the vector unit 4510 is a 16-wide vector processing unit (VPU) (see the 16-wide ALU 4528), which executes one or more of integer, single-precision float, and double-precision float instructions. The VPU supports swizzling the register inputs with swizzle unit 4520, numeric conversion with numeric convert units 4522A-B, and replication with replication unit 4524 on the memory input. Write mask registers 4526 allow predicating resulting vector writes.

Processor with integrated memory controller and graphics

Figure 46:
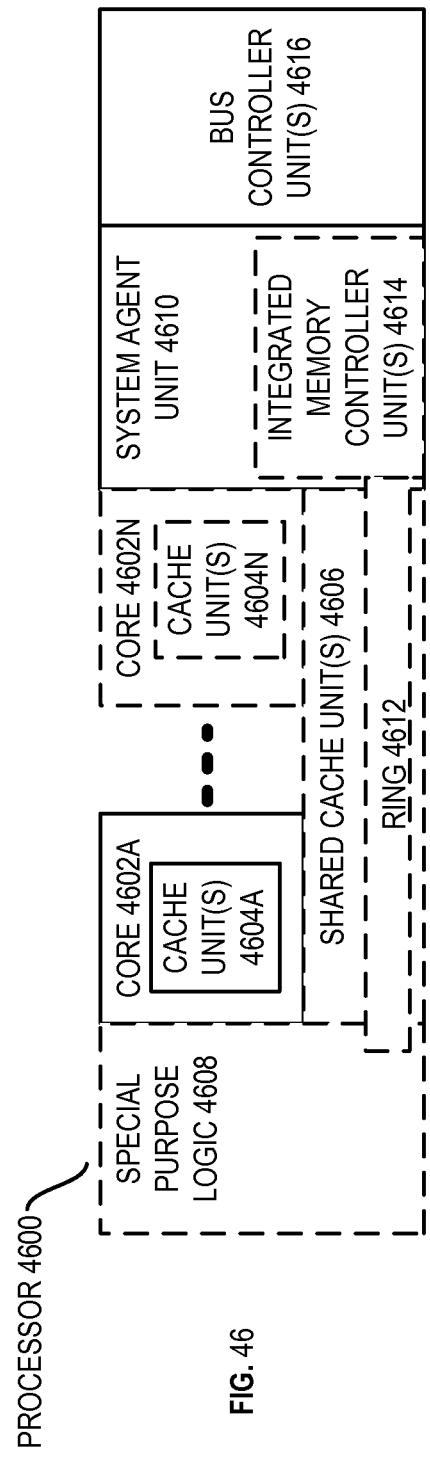
FIG. 46 is a block diagram of a processor that may have more than one core, may have an integrated memory controller, and may have integrated graphics according to embodiments of the invention.

FIG. 46 is a block diagram of a processor 4600 that may have more than one core, may have an integrated memory controller, and may have integrated graphics according to embodiments of the invention. The solid lined boxes in FIG. 46 illustrate a processor 4600 with a single core 4602A, a system agent 4610, a set of one or more bus controller units 4616, while the optional addition of the dashed lined boxes illustrates an alternative processor 4600 with multiple cores 4602A-N, a set of one or more integrated memory controller unit(s) 4614 in the system agent unit 4610, and special purpose logic 4608.

Thus, different implementations of the processor 4600 may include: 1) a CPU with the special purpose logic 4608 being integrated graphics and/or scientific (throughput) logic (which may include one or more cores), and the cores 4602A-N being one or more general purpose cores (e.g., general purpose in-order cores, general purpose out-of-order cores, a combination of the two); 2) a coprocessor with the cores 4602A-N being a large number of special purpose cores intended primarily for graphics and/or scientific (throughput); and 3) a coprocessor with the cores 4602A-N being a large number of general purpose in-order cores. Thus, the processor 4600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 4600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 4606, and external memory (not shown) coupled to the set of integrated memory controller units 4614. The set of shared cache units 4606 may include one or more mid-level caches, such as level 2 (L2), level 3 (L3), level 4 (L4), or other levels of cache, a last level cache (LLC), and/or combinations thereof. While in one embodiment a ring based interconnect unit 4612 interconnects the integrated graphics logic 4608, the set of shared cache units 4606, and the system agent unit 4610/integrated memory controller unit(s) 4614, alternative embodiments may use any number of well-known techniques for interconnecting such units. In one embodiment, coherency is maintained between one or more cache units 4606 and cores 4602-A-N.

In some embodiments, one or more of the cores 4602A-N are capable of multi-threading. The system agent 4610 includes those components coordinating and operating cores 4602A-N. The system agent unit 4610 may include for example a power control unit (PCU) and a display unit. The PCU may be or include logic and components needed for regulating the power state of the cores 4602A-N and the integrated graphics logic 4608. The display unit is for driving one or more externally connected displays.

The cores 4602A-N may be homogenous or heterogeneous in terms of architecture instruction set; that is, two or more of the cores 4602A-N may be capable of execution the same instruction set, while others may be capable of executing only a subset of that instruction set or a different instruction set.

Exemplary Computer Architectures

FIGS. 47-50 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 47:
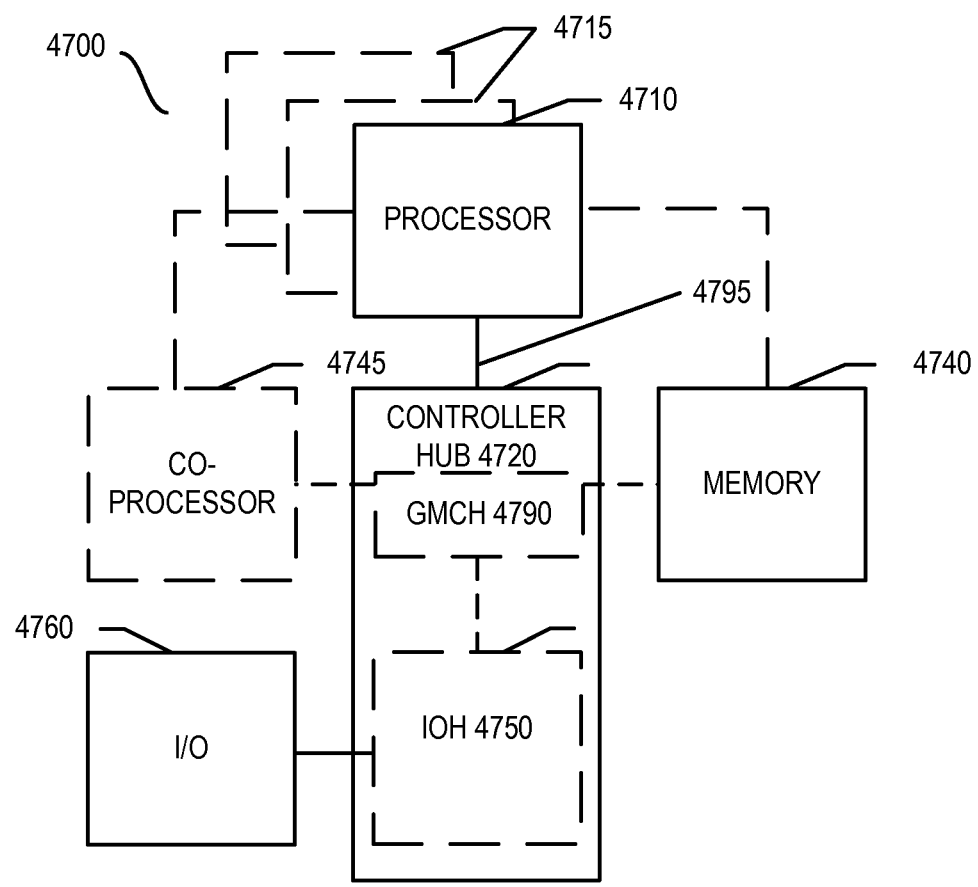
FIGS. 47-50 are block diagrams of exemplary computer architectures.

Referring now to FIG. 47, shown is a block diagram of a system 4700 in accordance with one embodiment of the present invention. The system 4700 may include one or more processors 4710, 4715, which are coupled to a controller hub 4720. In one embodiment the controller hub 4720 includes a graphics memory controller hub (GMCH) 4790 and an Input/Output Hub (IOH) 4750 (which may be on separate chips); the GMCH 4790 includes memory and graphics controllers to which are coupled memory 4740 and a coprocessor 4745; the IOH 4750 is couples input/output (I/O) devices 4760 to the GMCH 4790. Alternatively, one or both of the memory and graphics controllers are integrated within the processor (as described herein), the memory 4740 and the coprocessor 4745 are coupled directly to the processor 4710, and the controller hub 4720 in a single chip with the IOH 4750.

The optional nature of additional processors 4715 is denoted in FIG. 47 with broken lines. Each processor 4710,4715 may include one or more of the processing cores described herein and may be some version of the processor 4600.

The memory 4740 may be, for example, dynamic random access memory (DRAM), phase change memory (PCM), or a combination of the two. For at least one embodiment, the controller hub 4720 communicates with the processor(s) 4710, 4715 via a multi-drop bus, such as a frontside bus (FSB), point-to-point interface such as QuickPath Interconnect (QPI), or similar connection 4795.

In one embodiment, the coprocessor 4745 is a special-purpose processor, such as, for example, a high-throughput MIC processor, a network or communication processor, compression engine, graphics processor, GPGPU, embedded processor, or the like. In one embodiment, controller hub 4720 may include an integrated graphics accelerator.

There can be a variety of differences between the physical resources 4710, 4715 in terms of a spectrum of metrics of merit including architectural, microarchitectural, thermal, power consumption characteristics, and the like.

In one embodiment, the processor 4710 executes instructions that control data processing operations of a general type. Embedded within the instructions may be coprocessor instructions. The processor 4710 recognizes these coprocessor instructions as being of a type that should be executed by the attached coprocessor 4745. Accordingly, the processor 4710 issues these coprocessor instructions (or control signals representing coprocessor instructions) on a coprocessor bus or other interconnect, to coprocessor 4745. Coprocessor(s) 4745 accept and execute the received coprocessor instructions.

Figure 48:
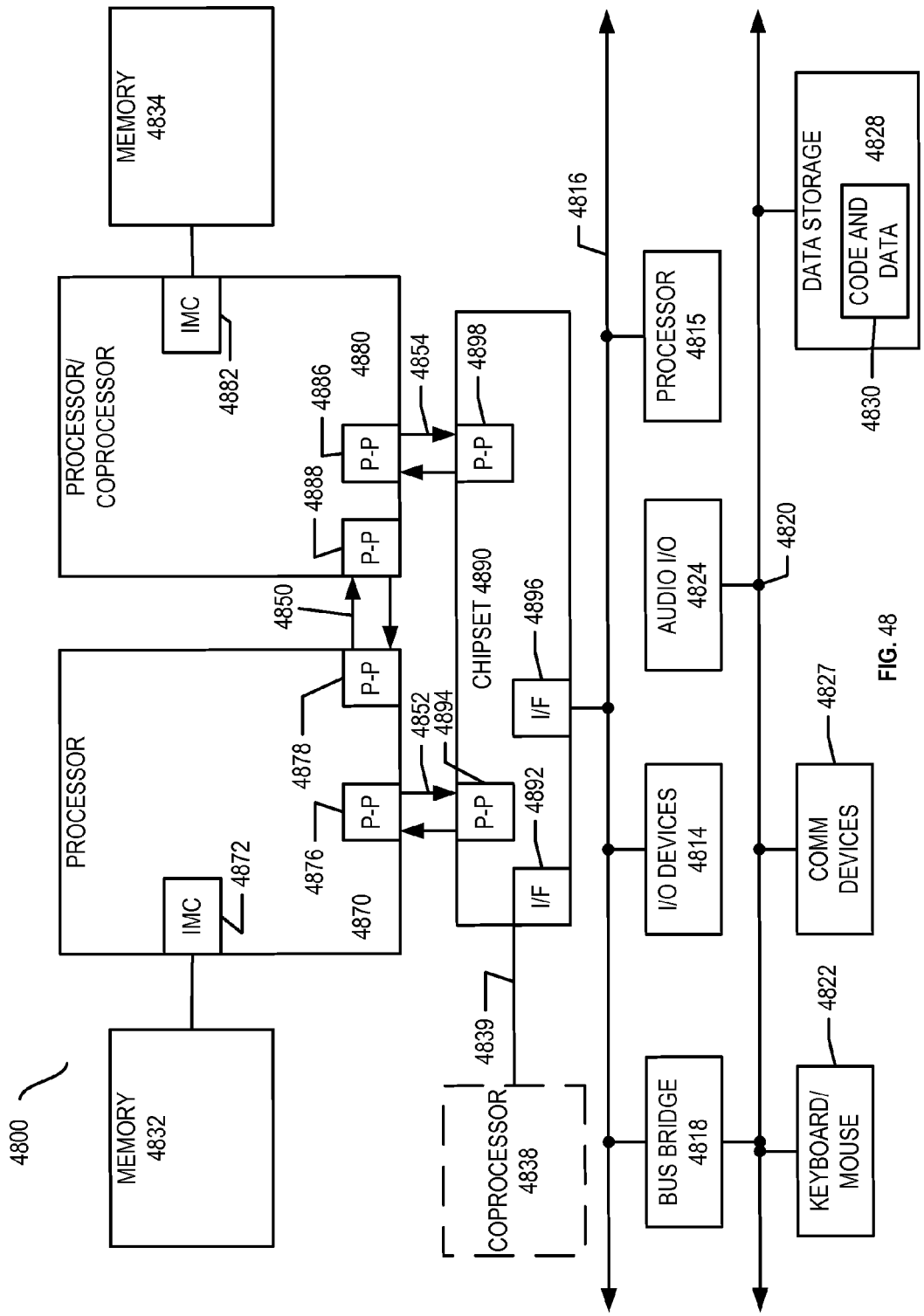

Referring now to FIG. 48, shown is a block diagram of a first more specific exemplary system 4800 in accordance with an embodiment of the present invention. As shown in FIG. 48, multiprocessor system 4800 is a point-to-point interconnect system, and includes a first processor 4870 and a second processor 4880 coupled via a point-to-point interconnect 4850. Each of processors 4870 and 4880 may be some version of the processor 4600. In one embodiment of the invention, processors 4870 and 4880 are respectively processors 4710 and 4715, while coprocessor 4838 is coprocessor 4745. In another embodiment, processors 4870 and 4880 are respectively processor 4710 coprocessor 4745.

Processors 4870 and 4880 are shown including integrated memory controller (IMC) units 4872 and 4882, respectively. Processor 4870 also includes as part of its bus controller units point-to-point (P-P) interfaces 4876 and 4878; similarly, second processor 4880 includes P-P interfaces 4886 and 4888. Processors 4870, 4880 may exchange information via a point-to-point (P-P) interface 4850 using P-P interface circuits 4878, 4888. As shown in FIG. 48, IMCs 4872 and 4882 couple the processors to respective memories, namely a memory 4832 and a memory 4834, which may be portions of main memory locally attached to the respective processors.

Processors 4870, 4880 may each exchange information with a chipset 4890 via individual P-P interfaces 4852, 4854 using point to point interface circuits 4876, 4894, 4886, 4898. Chipset 4890 may optionally exchange information with the coprocessor 4838 via a high-performance interface 4847. In one embodiment, the coprocessor 4838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 4890 may be coupled to a first bus 4816 via an interface 4896. In one embodiment, first bus 4816 may be a Peripheral Component Interconnect (PCI) bus, or a bus such as a PCI Express bus or another third generation I/O interconnect bus, although the scope of the present invention is not so limited.

As shown in FIG. 48, various I/O devices 4814 may be coupled to first bus 4816, along with a bus bridge 4818 which couples first bus 4816 to a second bus 4820. In one embodiment, one or more additional processor(s) 4815, such as coprocessors, high-throughput MIC processors, GPGPU's, accelerators (such as, e.g., graphics accelerators or digital signal processing (DSP) units), field programmable gate arrays, or any other processor, are coupled to first bus 4816. In one embodiment, second bus 4820 may be a low pin count (LPC) bus. Various devices may be coupled to a second bus 4820 including, for example, a keyboard and/or mouse 4822, communication devices 4827 and a storage unit 4828 such as a disk drive or other mass storage device which may include instructions/code and data 4830, in one embodiment. Further, an audio I/O 4824 may be coupled to the second bus 4820. Note that other architectures are possible. For example, instead of the point-to-point architecture of FIG. 48, a system may implement a multi-drop bus or other such architecture.

Figure 49:
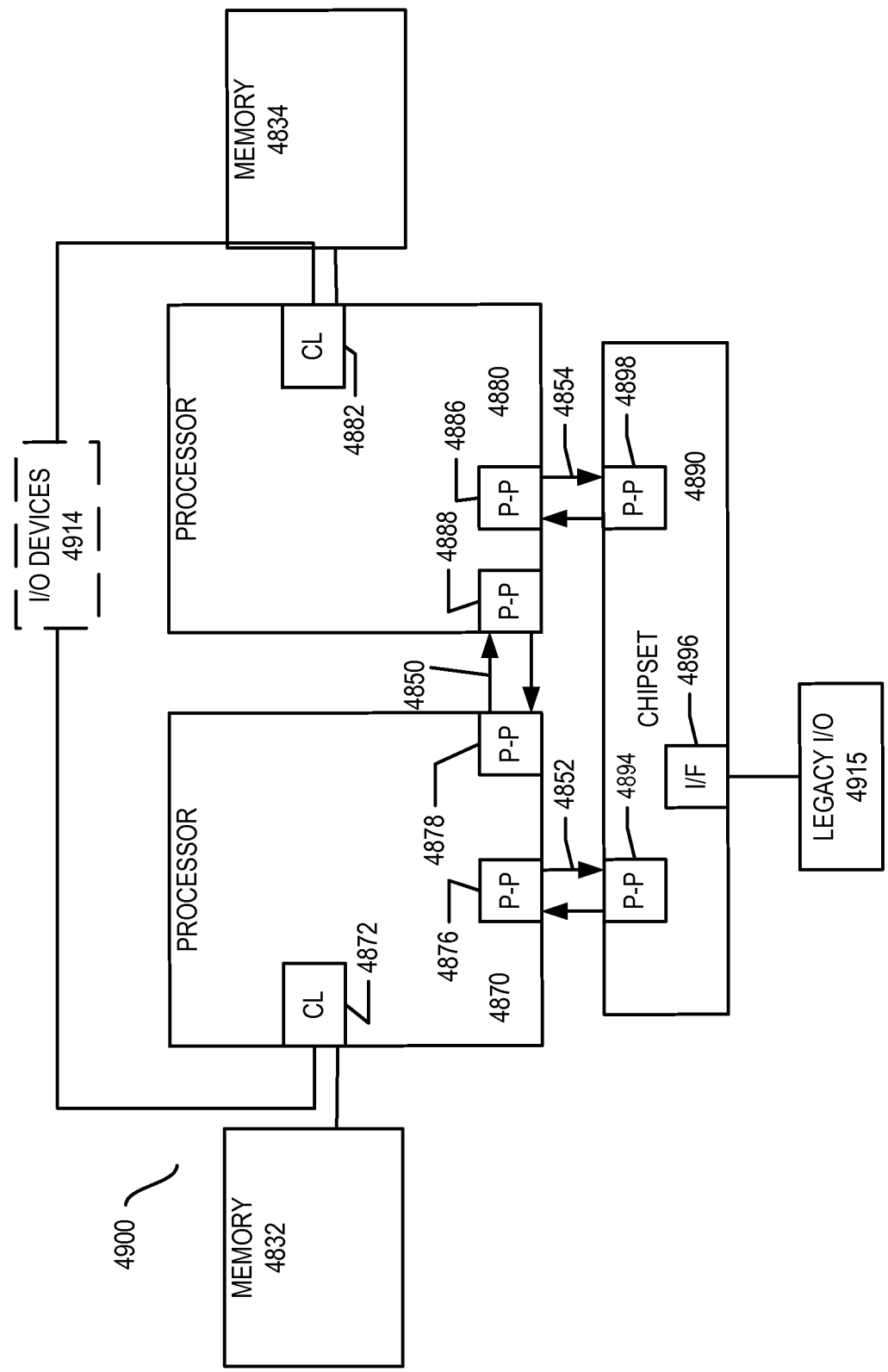

Referring now to FIG. 49, shown is a block diagram of a second more specific exemplary system 4900 in accordance with an embodiment of the present invention. Like elements in FIGS. 48 and 49 bear like reference numerals, and certain aspects of FIG. 48 have been omitted from FIG. 49 in order to avoid obscuring other aspects of FIG. 49.

FIG. 49 illustrates that the processors 4870, 4880 may include integrated memory and I/O control logic ("CL") 4872 and 4882, respectively. Thus, the CL 4872, 4882 include integrated memory controller units and include I/O control logic. FIG. 49 illustrates that not only are the memories 4832, 4834 coupled to the CL 4872, 4882, but also that I/O devices 4914 are also coupled to the control logic 4872, 4882. Legacy I/O devices 4915 are coupled to the chipset 4890.

Figure 50:
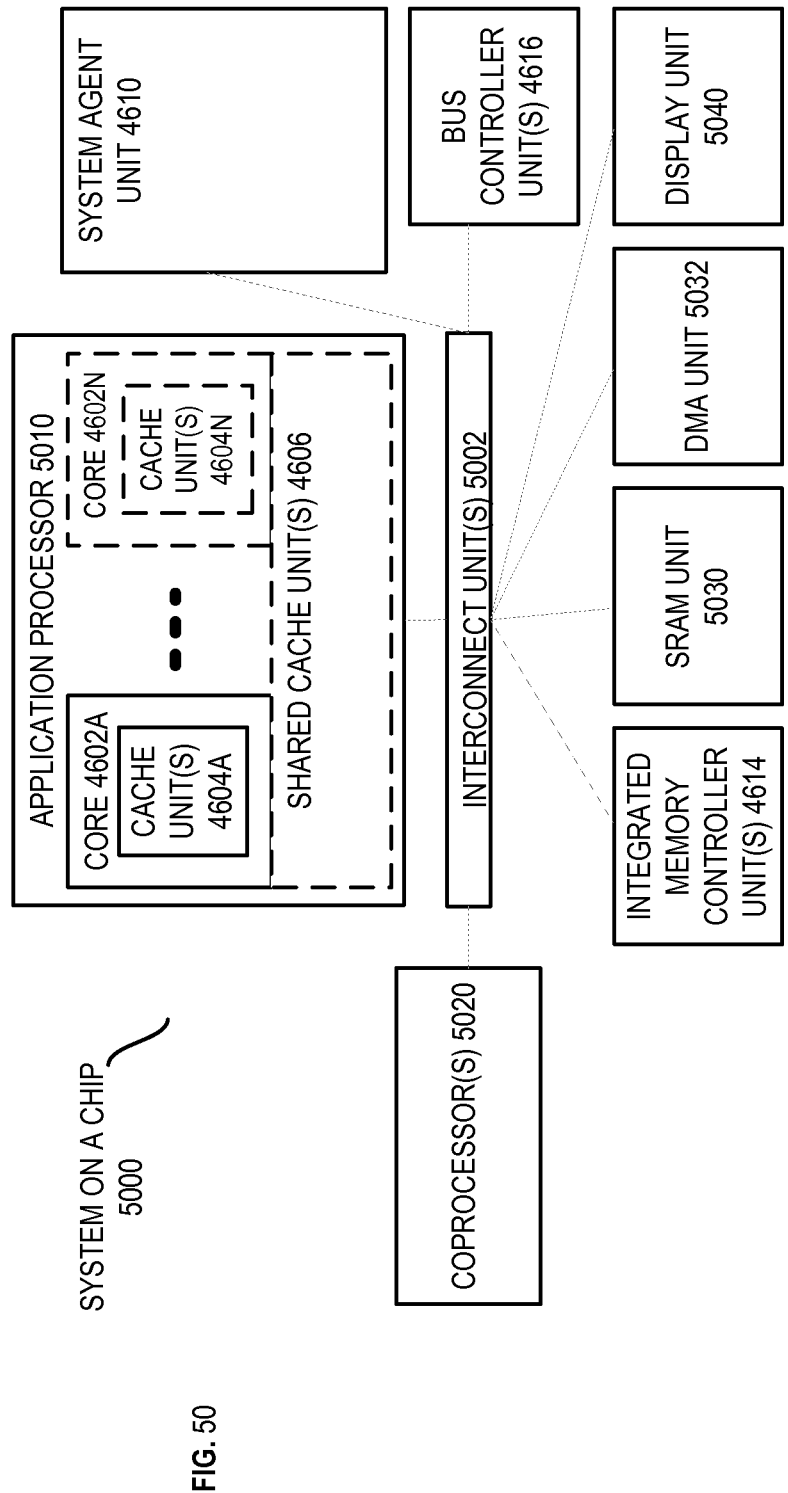

Referring now to FIG. 50, shown is a block diagram of a SoC 5000 in accordance with an embodiment of the present invention. Similar elements in FIG. 38 bear like reference numerals. Also, dashed lined boxes are optional features on more advanced SoCs. In FIG. 50, an interconnect unit(s) 5002 is coupled to: an application processor 5010 which includes a set of one or more cores 202A-N and shared cache unit(s) 3806; a system agent unit 3810; a bus controller unit(s) 3816; an integrated memory controller unit(s) 3814; a set or one or more coprocessors 5020 which may include integrated graphics logic, an image processor, an audio processor, and a video processor; an static random access memory (SRAM) unit 5030; a direct memory access (DMA) unit 5032; and a display unit 5048 for coupling to one or more external displays. In one embodiment, the coprocessor(s) 5020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 4830 illustrated in FIG. 48, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RW5), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 51:
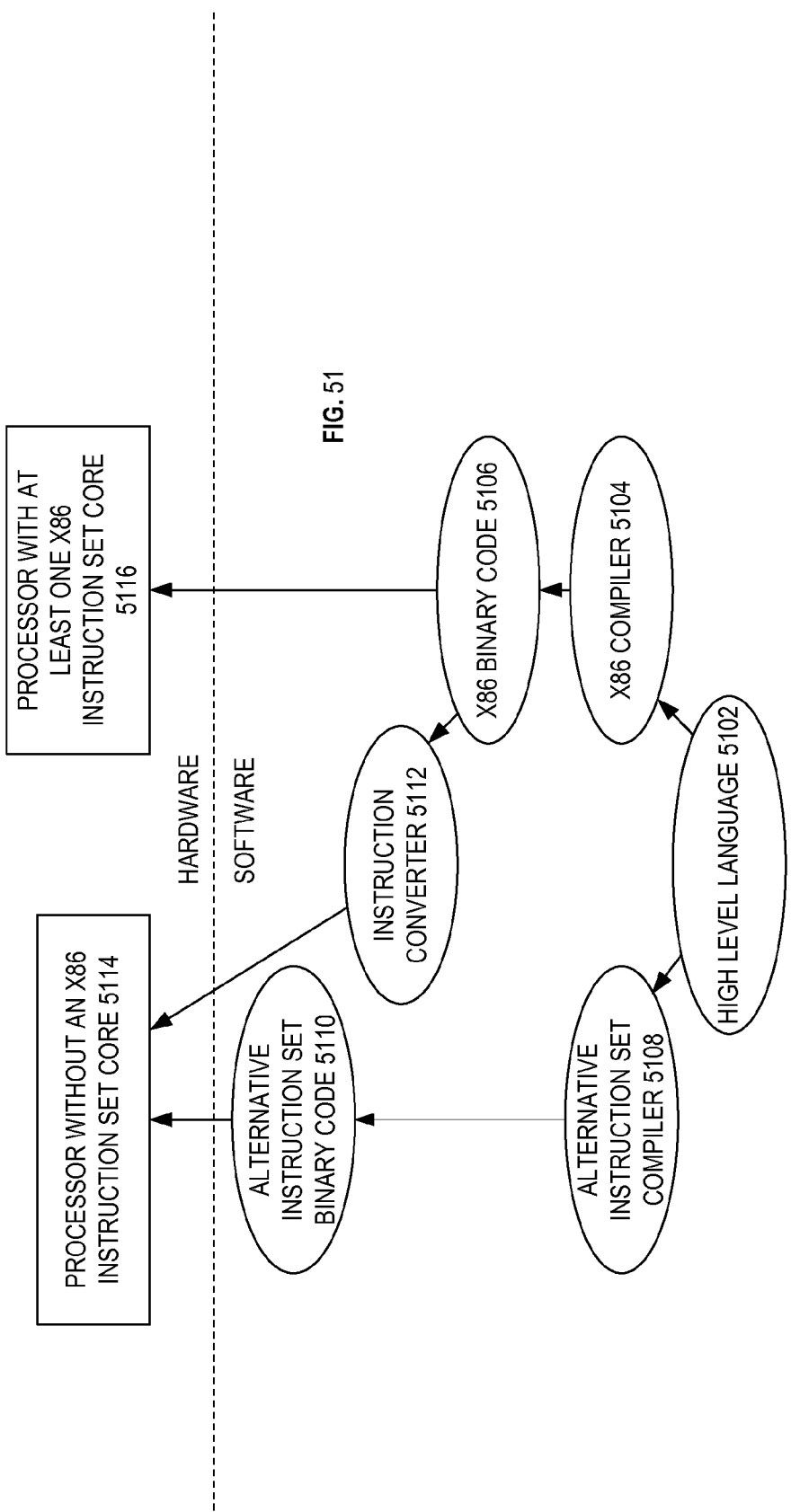
FIG. 51 is a block diagram contrasting the use of a software instruction converter to convert binary instructions in a source instruction set to binary instructions in a target instruction set according to embodiments of the invention.

FIG. 51 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 51 shows a program in a high level language 5102 may be compiled using an x86 compiler 5104 to generate x86 binary code 5106 that may be natively executed by a processor with at least one x86 instruction set core 5116. The processor with at least one x86 instruction set core 5116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 5104 represents a compiler that is operable to generate x86 binary code 5106 (e.g., object code) that can, with or without additional linkage processing, be executed on the processor with at least one x86 instruction set core 5116. Similarly, FIG. 51 shows the program in the high level language 5102 may be compiled using an alternative instruction set compiler 5108 to generate alternative instruction set binary code 5110 that may be natively executed by a processor without at least one x86 instruction set core 5114 (e.g., a processor with cores that execute the MIPS instruction set of MIPS Technologies of Sunnyvale, CA and/or that execute the ARM instruction set of ARM Holdings of Sunnyvale, Calif.). The instruction converter 5112 is used to convert the x86 binary code 5106 into code that may be natively executed by the processor without an x86 instruction set core 5114. This converted code is not likely to be the same as the alternative instruction set binary code 5110 because an instruction converter capable of this is difficult to make; however, the converted code will accomplish the general operation and be made up of instructions from the alternative instruction set. Thus, the instruction converter 5112 represents software, firmware, hardware, or a combination thereof that, through emulation, simulation or any other process, allows a processor or other electronic device that does not have an x86 instruction set processor or core to execute the x86 binary code 5106.

We claim:

1. An apparatus comprising:
   an entry-based search structure to perform a nearest neighbor search of a dictionary of features with entries dependent on features in the dictionary, wherein the entry-based search structure is a content addressable memory (CAM);
   physical storage coupled to the entry-based search structure to store the features; and
   physical logic to access the entry-based search structure to search for an entry for particular feature stored in the dictionary of features based upon a received input instance and to access the physical storage and retrieve the particular feature, wherein the searchable features of the dictionary and the input instance are non-negative and the search to select a feature with a highest correlation to a residual vector, approximate at least one coefficient of the selected feature using non-negative least squares, and compute a revised residual vector by removing the effect of the selected feature from the residual vector.

2. The apparatus of claim 1, wherein the physical storage is a random access memory (RAM).

3. The apparatus of claim 2, wherein the RAM is embedded into a central processing unit of the apparatus.

4. The apparatus of claim 2, wherein the RAM is external to a central processing unit of the apparatus.

5. The apparatus of claim 1, wherein each entry of the entry-based search structure is to store an interval value and a value of a feature.

6. The apparatus of claim 1, wherein the dictionary of features is to describe a plurality of bounding boxes defined by interval values and wherein each bounding box is to contain a single feature.

7. The apparatus of claim 1, wherein the residual vector comprises data elements of an input vector.

8. The apparatus of claim 1, wherein the feature with the highest positive correlation with the residual vector is a vector with a smallest dot product with the residual.

9. A method comprising:
   selecting a first feature with a highest positive correlation with a residual vector from a content addressable memory (CAM), wherein the feature with the highest positive correlation with the residual vector is a vector with a smallest dot product with the residual;
   approximating coefficients of the selected first feature;
   generating a revised residual vector by removing its orthogonal projection on a space spanned by the first feature;
   storing the selected first feature.

10. The method of claim 9, wherein the residual vector comprises only non-negative data.

11. The method of claim 9, wherein the received data vector comprises only non-negative data.

12. The method of claim 9, wherein the selecting comprises a parallel search of features of the dictionary.

13. The method of claim 9, further comprising:
    normalizing the revised residual vector.

14. The method of claim 9, further comprising:
    initializing a residual vector from a received data vector.

15. The method of claim 9, further comprising:
    selecting a second feature with a highest positive correlation with the revised residual vector;
    approximating coefficients of the selected second feature; and
    storing the selected second feature.

* * * * *